US010607298B1

(12) United States Patent
Hanekamp, Jr. et al.

(10) Patent No.: US 10,607,298 B1
(45) Date of Patent: Mar. 31, 2020

(54) SYSTEM AND METHOD FOR INDICATING SECTIONS OF ELECTRONIC TAX FORMS FOR WHICH NARRATIVE EXPLANATIONS CAN BE PRESENTED

(71) Applicant: INTUIT INC., Mountain View, CA (US)

(72) Inventors: David A. Hanekamp, Jr., Carlsbad, CA (US); Kevin M. McCluskey, Carlsbad, CA (US); Ion Niciu-Chiuaru, San Diego, CA (US); Paul A. Parks, Alpine, CA (US); Ganesh Bhat, San Diego, CA (US); Gang Wang, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 1155 days.

(21) Appl. No.: 14/814,361

(22) Filed: Jul. 30, 2015

(51) Int. Cl.
*G06Q 20/00* (2012.01)
*G06Q 40/00* (2012.01)

(52) U.S. Cl.
CPC ................. *G06Q 40/123* (2013.12)

(58) Field of Classification Search
CPC .................................................. G06Q 40/123
USPC ..................................................... 705/31–44
See application file for complete search history.

(56) References Cited

U.S. PATENT DOCUMENTS

| 4,213,251 A | 7/1980 | Foundos |
| 4,809,219 A | 2/1989 | Ashford et al. |
| 5,006,998 A | 4/1991 | Yasunobu |
| 5,495,607 A | 2/1996 | Pisello et al. |
| 5,557,761 A | 9/1996 | Chan et al. |
| 5,673,369 A | 9/1997 | Kim |
| 5,742,836 A | 4/1998 | Turpin et al. |

(Continued)

FOREIGN PATENT DOCUMENTS

| JP | 2002-117121 A | 4/2002 |
| JP | 2005-190425 A | 7/2005 |

(Continued)

OTHER PUBLICATIONS

The Effect of Alternative Regulatory Treatment of Tax Depreciation on Utility Tax Payment :Pollock, Richard; National Tax Journal (pre-1986) (Year: 1973).*

(Continued)

*Primary Examiner* — Bruce I Ebersman
*Assistant Examiner* — John A Anderson
(74) *Attorney, Agent, or Firm* — DLA Piper LLP (US)

(57) ABSTRACT

Computer-implemented method, tax return preparation systems and computer program products for presenting an explanation for a tax calculation or operation performed by a tax return preparation system when the system is in "forms" mode. An electronic version of a tax authority form that has been modified by inclusion of interface elements is displayed to a user. In response to the user selecting an interface element while in forms mode, presentation of an explanation regarding a tax calculation or operation for the associated field is invoked. The user interface controller provides data in response to selection of the interface element to an explanation engine, which determines an explanation based at least in part upon the tax calculation graph. The explanation is provided to the user interface controller for presentation to the user.

26 Claims, 29 Drawing Sheets

(56) References Cited

U.S. PATENT DOCUMENTS

| | | | |
|---|---|---|---|
| 5,819,249 A | 10/1998 | Dohanich | |
| 6,078,898 A | 6/2000 | Davis | |
| 6,535,883 B1 | 3/2003 | Lee et al. | |
| 6,601,055 B1 | 7/2003 | Roberts | |
| 6,631,361 B1 | 10/2003 | O'Flaherty et al. | |
| 6,670,969 B1 | 12/2003 | Halstead et al. | |
| 6,690,854 B2 | 2/2004 | Helbing | |
| 6,697,787 B1 | 2/2004 | Miller | |
| 6,898,573 B1 | 5/2005 | Piehl | |
| 6,912,508 B1 | 6/2005 | McCalden | |
| 7,234,103 B1 | 6/2007 | Regan | |
| 7,295,998 B2 | 11/2007 | Kulkarni | |
| 7,331,045 B2 | 2/2008 | Martin et al. | |
| 7,448,022 B1 | 11/2008 | Ram et al. | |
| 7,539,635 B1 | 5/2009 | Peak | |
| 7,565,312 B1 | 7/2009 | Shaw | |
| 7,603,301 B1 | 10/2009 | Regan | |
| 7,668,763 B1 | 2/2010 | Albrecht | |
| 7,680,756 B2 | 3/2010 | Quinn | |
| 7,685,082 B1 | 3/2010 | Coletta | |
| 7,693,760 B1 | 4/2010 | Fiteni | |
| 7,693,769 B1 | 4/2010 | Burlison | |
| 7,716,094 B1 | 5/2010 | Sutter et al. | |
| 7,742,958 B1 | 6/2010 | Leek | |
| 7,747,484 B2 | 6/2010 | Stanley | |
| 7,761,333 B2 | 7/2010 | Kapp | |
| 7,778,895 B1 | 8/2010 | Baxter | |
| 7,818,222 B2 | 10/2010 | Allanson | |
| 7,849,405 B1 | 12/2010 | Coletta | |
| 7,860,763 B1 | 12/2010 | Quinn et al. | |
| 7,865,829 B1 | 1/2011 | Goldfield | |
| 7,895,102 B1 | 2/2011 | Wilks et al. | |
| 7,899,757 B1 | 3/2011 | Talan | |
| 7,900,298 B1 | 3/2011 | Char et al. | |
| 7,908,190 B2 | 3/2011 | Enenkiel | |
| 7,912,767 B1 | 3/2011 | Cheatham et al. | |
| 7,912,768 B2 | 3/2011 | Abeles | |
| 7,925,553 B2 | 4/2011 | Banks | |
| 8,001,006 B1 | 8/2011 | Yu | |
| 8,019,664 B1 | 9/2011 | Tifford et al. | |
| 8,082,144 B1 | 12/2011 | Brown | |
| 8,086,970 B2 | 12/2011 | Achtermann et al. | |
| 8,108,258 B1 | 1/2012 | Slattery | |
| 8,126,820 B1 | 2/2012 | Talan | |
| 8,190,499 B1 | 5/2012 | McVickar | |
| 8,204,805 B2 | 6/2012 | Eftekhari | |
| 8,224,726 B2 | 7/2012 | Murray | |
| 8,234,562 B1 | 7/2012 | Evans | |
| 8,244,607 B1 | 8/2012 | Quinn | |
| 8,346,635 B1 | 1/2013 | Olim | |
| 8,346,680 B2 | 1/2013 | Castleman | |
| 8,370,795 B1 | 2/2013 | Sage | |
| 8,386,344 B2 | 2/2013 | Christina | |
| 8,407,113 B1 | 3/2013 | Eftekhari | |
| 8,417,596 B1 | 4/2013 | Dunbar et al. | |
| 8,417,597 B1 | 4/2013 | McVickar | |
| 8,447,667 B1 | 5/2013 | Dinamani et al. | |
| 8,452,676 B1 | 5/2013 | Talan | |
| 8,473,880 B1 | 6/2013 | Bennett et al. | |
| 8,478,671 B1 | 7/2013 | Tifford | |
| 8,510,187 B1 | 8/2013 | Dinamani | |
| 8,527,375 B1 | 9/2013 | Ohm | |
| 8,560,409 B2 | 10/2013 | Abeles | |
| 8,583,516 B1 | 11/2013 | Pitt | |
| 8,589,262 B1 | 11/2013 | Gang | |
| 8,607,353 B2 | 12/2013 | Rippert et al. | |
| 8,635,127 B1 | 1/2014 | Shaw | |
| 8,639,616 B1 | 1/2014 | Rolenaitis | |
| 8,682,756 B1 * | 3/2014 | Tifford | G06F 17/243 705/31 |
| 8,682,829 B2 | 3/2014 | Barthel | |
| 8,694,395 B2 | 4/2014 | Houseworth | |
| 8,706,580 B2 | 4/2014 | Houseworth | |
| 8,788,412 B1 | 7/2014 | Hamm | |
| 8,812,380 B2 | 8/2014 | Murray | |
| 8,813,178 B1 | 8/2014 | Khanna | |
| 8,838,492 B1 | 9/2014 | Baker | |
| 8,892,467 B1 | 11/2014 | Ball | |
| 8,949,270 B2 | 2/2015 | Newton et al. | |
| 9,372,687 B1 | 6/2016 | Pai | |
| 9,690,854 B2 | 6/2017 | Stent et al. | |
| 9,760,953 B1 | 9/2017 | Wang et al. | |
| 9,916,628 B1 | 3/2018 | Wang et al. | |
| 9,922,376 B1 | 3/2018 | Wang et al. | |
| 9,990,678 B1 | 6/2018 | Cabrera et al. | |
| 2002/0065831 A1 | 5/2002 | DePaolo | |
| 2002/0107698 A1 | 8/2002 | Brown et al. | |
| 2002/0111888 A1 | 8/2002 | Stanley | |
| 2002/0174017 A1 | 11/2002 | Singh | |
| 2002/0198832 A1 | 12/2002 | Agee | |
| 2003/0101070 A1 | 5/2003 | Mahosky et al. | |
| 2003/0126054 A1 | 7/2003 | Purcell | |
| 2003/0139827 A1 | 7/2003 | Phelps | |
| 2003/0174157 A1 | 9/2003 | Hellman | |
| 2003/0182102 A1 | 9/2003 | Corston-Oliver et al. | |
| 2004/0002906 A1 | 1/2004 | Von Drehnen et al. | |
| 2004/0019540 A1 | 1/2004 | William | |
| 2004/0019541 A1 | 1/2004 | William | |
| 2004/0021678 A1 | 2/2004 | Ullah et al. | |
| 2004/0078271 A1 | 4/2004 | Morano | |
| 2004/0083164 A1 | 4/2004 | Schwartz et al. | |
| 2004/0088233 A1 | 5/2004 | Brady | |
| 2004/0117395 A1 | 6/2004 | Gong | |
| 2004/0172347 A1 | 9/2004 | Barthel | |
| 2004/0181543 A1 | 9/2004 | Wu et al. | |
| 2004/0205008 A1 | 10/2004 | Haynie et al. | |
| 2005/0171822 A1 | 8/2005 | Cagan | |
| 2005/0216379 A1 | 9/2005 | Ozaki | |
| 2005/0262191 A1 | 11/2005 | Mamou et al. | |
| 2006/0112114 A1 | 5/2006 | Yu | |
| 2006/0155618 A1 | 7/2006 | Wyle | |
| 2006/0155632 A1 | 7/2006 | Cherkas et al. | |
| 2006/0178961 A1 | 8/2006 | Stanley et al. | |
| 2006/0282354 A1 | 12/2006 | Varghese | |
| 2006/0293990 A1 | 12/2006 | Schaub | |
| 2007/0033116 A1 | 2/2007 | Murray | |
| 2007/0033117 A1 | 2/2007 | Murray | |
| 2007/0033130 A1 | 2/2007 | Murray | |
| 2007/0055571 A1 | 3/2007 | Fox et al. | |
| 2007/0094207 A1 | 4/2007 | Yu | |
| 2007/0136157 A1 | 6/2007 | Neher et al. | |
| 2007/0150387 A1 | 6/2007 | Seubert et al. | |
| 2007/0156564 A1 | 7/2007 | Humphrey et al. | |
| 2007/0179841 A1 | 8/2007 | Agassi | |
| 2007/0192166 A1 | 8/2007 | Van Luchene | |
| 2007/0250418 A1 | 10/2007 | Banks et al. | |
| 2008/0017722 A1 * | 1/2008 | Snyder | G06Q 10/00 235/494 |
| 2008/0059900 A1 | 3/2008 | Murray | |
| 2008/0097878 A1 | 4/2008 | Abeles | |
| 2008/0126170 A1 | 5/2008 | Leck et al. | |
| 2008/0147494 A1 | 6/2008 | Larson | |
| 2008/0154873 A1 * | 6/2008 | Redlich | G06F 16/951 |
| 2008/0162310 A1 | 7/2008 | Quinn | |
| 2008/0177631 A1 | 7/2008 | William | |
| 2008/0215392 A1 | 9/2008 | Rajan | |
| 2008/0243531 A1 | 10/2008 | Hyder et al. | |
| 2009/0024694 A1 | 1/2009 | Fong | |
| 2009/0037305 A1 | 2/2009 | Sander | |
| 2009/0037847 A1 | 2/2009 | Achtermann et al. | |
| 2009/0048957 A1 | 2/2009 | Celano | |
| 2009/0064851 A1 | 3/2009 | Morris et al. | |
| 2009/0117529 A1 | 5/2009 | Goldstein | |
| 2009/0125618 A1 | 5/2009 | Huff | |
| 2009/0138389 A1 | 5/2009 | Barthel | |
| 2009/0150169 A1 | 6/2009 | Kirkwood | |
| 2009/0157572 A1 | 6/2009 | Chidlovskii | |
| 2009/0193389 A1 | 7/2009 | Miller | |
| 2009/0204881 A1 | 8/2009 | Murthy | |
| 2009/0239650 A1 | 9/2009 | Alderucci et al. | |
| 2009/0248594 A1 | 10/2009 | Castleman | |
| 2009/0248603 A1 | 10/2009 | Kiersky | |
| 2010/0036760 A1 | 2/2010 | Abeles | |
| 2010/0088124 A1 | 4/2010 | Diefendorf et al. | |

(56) References Cited

U.S. PATENT DOCUMENTS

| | | |
|---|---|---|
| 2010/0131394 A1 | 5/2010 | Rutsch |
| 2010/0153138 A1 | 6/2010 | Evans |
| 2011/0004537 A1 | 1/2011 | Allanson et al. |
| 2011/0078062 A1 | 3/2011 | Kleyman |
| 2011/0145112 A1 | 6/2011 | Abeles |
| 2011/0173222 A1 | 7/2011 | Sayal et al. |
| 2011/0225220 A1 | 9/2011 | Huang et al. |
| 2011/0258195 A1 | 10/2011 | Welling |
| 2011/0258610 A1 | 10/2011 | Aaraj et al. |
| 2011/0264569 A1 | 10/2011 | Houseworth |
| 2012/0016817 A1 | 1/2012 | Smith et al. |
| 2012/0027246 A1 | 2/2012 | Tifford |
| 2012/0030076 A1 | 2/2012 | Checco et al. |
| 2012/0030577 A1 | 2/2012 | Akolkar et al. |
| 2012/0072321 A1 | 3/2012 | Christian et al. |
| 2012/0109792 A1 | 5/2012 | Eftekhari |
| 2012/0109793 A1 | 5/2012 | Abeles |
| 2012/0136764 A1 | 5/2012 | Miller |
| 2012/0278365 A1 | 11/2012 | Labat et al. |
| 2013/0036347 A1 | 2/2013 | Eftekhari |
| 2013/0080302 A1 | 3/2013 | Allanson |
| 2013/0097262 A1 | 4/2013 | Dandison |
| 2013/0111032 A1 | 5/2013 | Alapati et al. |
| 2013/0138586 A1 | 5/2013 | Jung et al. |
| 2013/0185347 A1 | 7/2013 | Romano |
| 2013/0187926 A1 | 7/2013 | Silverstein et al. |
| 2013/0198047 A1 | 8/2013 | Houseworth |
| 2013/0218735 A1 | 8/2013 | Murray |
| 2013/0262279 A1 | 10/2013 | Finley et al. |
| 2013/0282539 A1 | 10/2013 | Murray |
| 2013/0290169 A1 | 10/2013 | Bathula |
| 2014/0108213 A1 | 4/2014 | Houseworth |
| 2014/0172656 A1 | 6/2014 | Shaw |
| 2014/0201045 A1 | 7/2014 | Pai et al. |
| 2014/0207633 A1 | 7/2014 | Aldrich et al. |
| 2014/0241631 A1 | 8/2014 | Huang |
| 2014/0244455 A1 | 8/2014 | Huang |
| 2014/0244457 A1 | 8/2014 | Howell et al. |
| 2014/0337189 A1 | 11/2014 | Barsade |
| 2015/0142703 A1 | 5/2015 | Rajesh |
| 2015/0237205 A1 | 8/2015 | Waller et al. |
| 2015/0254623 A1 | 9/2015 | Velez et al. |
| 2015/0269491 A1 | 9/2015 | Tripathi et al. |
| 2016/0027127 A1 | 1/2016 | Chavarria et al. |
| 2016/0063645 A1 | 3/2016 | Houseworth et al. |
| 2016/0071112 A1 | 3/2016 | Unser |
| 2016/0078567 A1 | 3/2016 | Goldman |
| 2016/0092993 A1 | 3/2016 | Ciaramitaro |
| 2016/0092994 A1* | 3/2016 | Roebuck ............ G06Q 40/123 705/31 |
| 2016/0098804 A1 | 4/2016 | Mascaro et al. |
| 2016/0148321 A1 | 5/2016 | Ciaramitaro et al. |
| 2016/0275627 A1 | 9/2016 | Wang |
| 2017/0004583 A1 | 1/2017 | Wang |
| 2017/0004584 A1 | 1/2017 | Wang |
| 2017/0032468 A1 | 2/2017 | Wang |
| 2018/0032855 A1 | 2/2018 | Wang et al. |

FOREIGN PATENT DOCUMENTS

| | | |
|---|---|---|
| JP | 2014-206960 A | 10/2014 |
| KR | 10-2012-0011987 A | 2/2012 |
| WO | 2017/004094 A1 | 1/2017 |
| WO | 2017004095 A1 | 1/2017 |
| WO | 2017019233 A1 | 2/2017 |
| WO | 2017116496 A1 | 7/2017 |
| WO | 2017116497 A1 | 7/2017 |
| WO | 2018022023 A1 | 2/2018 |
| WO | 2018022128 A1 | 2/2018 |
| WO | 2018/080562 A1 | 5/2018 |
| WO | 2018/080563 A1 | 5/2018 |

OTHER PUBLICATIONS

Office Action dated Nov. 17, 2016 in U.S. Appl. No. 14/448,922, filed Jul. 31, 2014, inventor: Gang Wang.
Amendment dated Feb. 17, 2016 in U.S. Appl. No. 14/448,922, filed Jul. 31, 2014, inventor: Gang Wang.
Office Action dated Apr. 6, 2017 in U.S. Appl. No. 14/448,922, filed Jul. 31, 2014, inventor: Gang Wang.
Office Action dated Aug. 11, 2016 in U.S. Appl. No. 14/448,962, filed Jul. 31, 2014, inventor: Gang Wang.
Amendment dated Nov. 11, 2016 in U.S. Appl. No. 14/448,962, filed Jul. 31, 2014, inventor: Gang Wang.
Office Action dated Jan. 13, 2017 in U.S. Appl. No. 14/448,962, filed Jul. 31, 2014, inventor: Gang Wang.
Office Action dated Aug. 23, 2016 in U.S. Appl. No. 14/448,986, filed Jul. 31, 2014, inventor: Gang Wang.
Response dated Jan. 23, 2017 in U.S. Appl. No. 14/448,986, filed Jul. 31, 2014, inventor: Gang Wang.
Office Action dated Feb. 17, 2017 in U.S. Appl. No. 14/448,986, filed Jul. 31, 2014, inventor: Gang Wang.
Office Action dated Jan. 12, 2017 in U.S. Appl. No. 14/462,411, filed Aug. 18, 2014, inventor: Gang Wang.
Office Action dated Feb. 7, 2017 in U.S. Appl. No. 14/555,543, filed Nov. 26, 2014, inventor: Gang Wang.
PCT International Search Report for PCT/US2016/039919, Applicant: Intuit Inc., Form PCT/ISA/210 and 220, dated Oct. 11, 2016.
PCT Written Opinion of the International Search Authority for PCT/US2016/039919, Applicant: Intuit Inc., Form PCT/ISA/237, dated Oct. 11, 2016.
PCT International Search Report for PCT/US2016/039917, Applicant: Intuit Inc., Form PCT/ISA/210 and 220, dated Oct. 11, 2016.
PCT Written Opinion of the International Search Authority for PCT/US2016/039917, Applicant: Intuit Inc., Form PCT/ISA/237, dated Oct. 11, 2016.
PCT International Search Report for PCT/US2016/039918, Applicant: Intuit Inc., Form PCT/ISA/210 and 220, dated Oct. 11, 2016.
PCT Written Opinion of the International Search Authority for PCT/US2016/039918, Applicant: Intuit Inc., Form PCT/ISA/237, dated Oct. 11, 2016.
PCT International Search Report for PCT/US2016/039913, Applicant: Intuit Inc., Form PCT/ISA/210 and 220, dated Oct. 21, 2016.
PCT Written Opinion of the International Search Authority for PCT/US2016/039913, Applicant: Intuit Inc., Form PCT/ISA/237, dated Oct. 21, 2016.
PCT International Search Report for PCT/US2016/039916, Applicant: Intuit Inc., Form PCT/ISA/210 and 220, dated Oct. 11, 2016.
PCT Written Opinion of the International Search Authority for PCT/US2016/039916, Applicant: Intuit Inc., Form PCT/ISA/237, dated Oct. 11, 2016.
http://en.wikipedia.org/wiki/Dependency_grammar#Semantic_dependencies, printed Mar. 11, 2014.
http://www.webopedia.com/TERM/L/loose_coupling.html, printed Mar. 11, 2014.
http://en.wikipedia.org/wiki/Loose_coupling, printed Mar. 11, 2014.
www.turbotax.com, printed Mar. 11, 2014.
https://turbotax.intuit.com/snaptax/mobile/, printed Mar. 11, 2014.
http://www.jboss.org/drools/drools-expert.html, printed Mar. 11, 2014.
http://en.wikipedia.org/wiki/Drools, printed Mar. 11, 2014.
http://en.wikipedia.org/wiki/Declarative_programming, printed Mar. 11, 2014.
http://www.wisegeek.com/what-is-declarative-programming.htm, printed Mar. 11, 2014.
http://docs.jboss.org/drools/release/5.3.0.Final/drools-expert-docs/html/ch01.html, printed Mar. 11, 2014.
http://quicken.intuit.com/support/help/tax-savings/simplify-tax-time/INF24047.html, updated Jul. 25, 2013, printed Jun. 24, 2014 (11 pages).
http://quicken.intuit.com/support/help/income-and-expenses/how-to-assign-tax-form-line-items-to-a-category/GEN82142_html, updated Aug. 11, 2011, printed Jun. 24, 2014 (2 pages).
http://quicken.intuit.com/support/help/reports--graphs-and-snapshots/track-the-earnings-taxes--deductions--or-deposits-from-paychecks/GEN82101.html, updated May 14, 2012, printed Jun. 24, 2014 (2 pages).

(56) References Cited

OTHER PUBLICATIONS

NY State Dep of Taxation, NY State Personal Income Tax MeF Guide for Software Developers, 2012, NY State.
Restriction Requirement dated May 22, 2015 in U.S. Appl. No. 14/097,057, filed Dec. 4, 2013, inventor: Gang Wang.
Response dated Jun. 30, 2015 in U.S. Appl. No. 14/097,057, filed Dec. 4, 2013, inventor: Gang Wang.
Office Action dated Oct. 2, 2015 in U.S. Appl. No. 14/097,057, filed Dec. 4, 2013, inventor: Gang Wang.
Response dated Feb. 29, 2016 in U.S. Appl. No. 14/097,057, filed Dec. 4, 2013, inventor: Gang Wang.
Final Office Action dated Apr. 8, 2016 in U.S. Appl. No. 14/097,057, filed Dec. 4, 2013, inventor: Gang Wang.
Pre-Appeal Brief dated Jun. 24, 2016 in U.S. Appl. No. 14/097,057, filed Dec. 4, 2013, inventor: Gang Wang.
Pre-Appeal Brief Conference Decision dated Aug. 15, 2016 in U.S. Appl. No. 14/097,057, filed Dec. 4, 2013, inventor: Gang Wang.
Amendment dated Sep. 13, 2016 in U.S. Appl. No. 14/097,057, filed Dec. 4, 2013, inventor: Gang Wang.
Office Action dated Nov. 4, 2016 in U.S. Appl. No. 14/097,057, filed Dec. 4, 2013, inventor: Gang Wang.
Amendment dated Feb. 6, 2017 in U.S. Appl. No. 14/097,057, filed Dec. 4, 2013, inventor: Gang Wang.
Final Rejection dated Mar. 9, 2017 in U.S. Appl. No. 14/097,057, filed Dec. 4, 2013, inventor: Gang Wang.
Office Action dated Dec. 23, 2016 in U.S. Appl. No. 14/462,345, filed Aug. 18, 2014, inventor: Gang Wang.
Amendment dated Mar. 23, 2017 in U.S. Appl. No. 14/462,345, filed Aug. 18, 2014, inventor: Gang Wang.
Office Action dated Mar. 10, 2017 in U.S. Appl. No. 14/448,678, filed Jul. 31, 2014, inventor: Gang Wang.
Office Action dated Jul. 8, 2015 in U.S. Appl. No. 14/206,682, filed Mar. 12, 2015, inventor: Gang Wang.
Response dated Aug. 31, 2015 in U.S. Appl. No. 14/206,682, filed Mar. 12, 2015, inventor: Gang Wang.
Office Action dated Mar. 9, 2016 in U.S. Appl. No. 14/206,682, filed Mar. 12, 2015, inventor: Gang Wang.
Amendment dated Jul. 11, 2016 in U.S. Appl. No. 14/206,682, filed Mar. 12, 2015, inventor: Gang Wang.
Office Action dated Sep. 16, 2016 in U.S. Appl. No. 14/206,682, filed Mar. 12, 2015, inventor: Gang Wang.
Amendment dated Jan. 13, 2017 in U.S. Appl. No. 14/206,682, filed Mar. 12, 2015, inventor: Gang Wang.
Office Action dated Dec. 31, 2015 in U.S. Appl. No. 14/206,834, filed Mar. 12, 2015, inventor: Gang Wang.
Amendment dated May 31, 2016 in U.S. Appl. No. 14/206,834, filed Mar. 12, 2015, inventor: Gang Wang.
Office Action dated Sep. 6, 2016 in U.S. Appl. No. 14/206,834, filed Mar. 12, 2015, inventor: Gang Wang.
Amendment dated Jan. 6, 2017 in U.S. Appl. No. 14/206,834, filed Mar. 12, 2015, inventor: Gang Wang.
Office Action dated Apr. 30, 2015 in U.S. Appl. No. 14/207,121, filed Mar. 12, 2015, inventor: Gang Wang.
Response dated Apr. 30, 2015 in U.S. Appl. No. 14/207,121, filed Mar. 12, 2015, inventor: Gang Wang.
Office Action dated Jul. 30, 2015 in U.S. Appl. No. 14/207,121, filed Mar. 12, 2015, inventor: Gang Wang.
Response dated Nov. 30, 2015 in U.S. Appl. No. 14/207,121, filed Mar. 12, 2015, inventor: Gang Wang.
Office Action dated Apr. 29, 2016 in U.S. Appl. No. 14/207,121, filed Mar. 12, 2015, inventor: Gang Wang.
Amendment dated Aug. 29, 2016 in U.S. Appl. No. 14/207,121, filed Mar. 12, 2015, inventor: Gang Wang.
Office Action dated Dec. 14, 2016 in U.S. Appl. No. 14/462,315, filed Aug. 18, 2014, inventor: Gang Wang.
Response dated Mar. 14, 2017 in U.S. Appl. No. 14/462,315, filed Aug. 18, 2014, inventor: Gang Wang.
Office Action dated Mar. 21, 2017 in U.S. Appl. No. 14/448,481, filed Jul. 31, 2014, inventor: Gang Wang.

Office Action dated Nov. 29, 2016 in U.S. Appl. No. 14/448,886, filed Jul. 31, 2014, inventor: Gang Wang.
Amendment dated Feb. 28, 2017 in U.S. Appl. No. 14/448,886, filed Jul. 31, 2014, inventor: Gang Wang.
Office Action dated Apr. 20, 2017 in U.S. Appl. No. 14/448,886, filed Jul. 31, 2014, inventor: Gang Wang.
PCT International Search Report for PCT/US2017/062777, Applicant: Intuit Inc., Form PCT/ISA/210 and 220, dated Feb. 21, 2018 (5pages).
PCT Written Opinion of the International Search Authority for PCT/US2017/062777, Applicant: The Regents of the University of California, Form PCT/ISA/237, dated Feb. 21, 2018 (8pages).
Office Action dated Feb. 22, 2018 in U.S. Appl. No. 14/673,261, filed Mar. 30, 2015, (46pages).
Wikipedia, https://en.wikipedia.org/wiki/Data_structure, "Data Structures", Jan. 12, 2012, entire page (Year:2012) (1page).
Wikipedia, https://en.wikipedia.org/wiki/Tree_(data_structure), "Tree (data structure)", May 15, 2005, entire page (Year:2005) (1page).
Response to Rule 161 Communication dated Jan. 5, 2018 in European Patent Application No. 16843282.1, (16pages).
Communication pursuant to Rules 161(2) and 162 EPC dated Jul. 26, 2017 in European Patent Application No. 16843282.1, (2pages).
Notice of Allowance and Fee(s) Due dated May 5, 2017 in U.S. Appl. No. 14/206,682, (30pages).
PCT International Search Report for PCT/US2016/044094, Applicant: Intuit Inc., Form PCT/ISA/210 and 220, dated Apr. 24, 2017 (5pages).
PCT Written Opinion of the International Search Authority for PCT/US2016/044094, Applicant: Intuit Inc., Form PCT/ISA/237, dated Apr. 24, 2017 (5pages).
PCT International Search Report for PCT/US2016/067839, Applicant: Intuit Inc., Form PCT/ISA/210 and 220, dated Apr. 25, 2017 (5pages).
PCT Written Opinion of the International Search Authority for PCT/US2016/067839, Applicant: Intuit Inc., Form PCT/ISA/237, dated Apr. 26, 2017 (12pages).
Amendment dated May 3, 2017 in U.S. Appl. No. 14/462,411, filed Aug. 18, 2014, (5pages).
Response dated May 15, 2017 in U.S. Appl. No. 14/448,962, filed Jul. 31, 2014, (30pages).
Office Action dated May 15, 2017 in U.S. Appl. No. 14/462,345, filed Aug. 18, 2014, (57pages).
Office Action dated May 15, 2017 in U.S. Appl. No. 14/555,902, filed Nov. 28, 2014, (8pages).
Office Action dated May 2, 2017 in U.S. Appl. No. 14/698,733, filed Apr. 28, 2015, (31pages).
Office Communication dated Apr. 4, 2018 in Canadian Patent Application No. 2,959,230, (6pages).
Supplementary Search Report dated Mar. 26, 2018 in European Patent Application No. 16843282.1-1217, (6pages).
Amendment and Response to Office Action for U.S. Appl. No. 14/462,345 dated Apr. 12, 2018, (15pages).
Response to Office Action for U.S. Appl. No. 14/553,347 dated Mar. 30, 2018, (26pages).
Advisory Action for U.S. Appl. No. 14/553,347 dated Apr. 13, 2018, (7pages).
Response and Request for Continued Examination for U.S. Appl. No. 14/553,347 dated Mar. 30, 2018, (41pages).
Amendment and Response to Office Action for U.S. Appl. No. 14/673,261 dated Apr. 23, 2018, (39pages).
Advisory Action for U.S. Appl. No. 14/673,261 dated May 14, 2018, (9pages).
Amendment and Response to Office Action for U.S. Appl. No. 14/698,733 dated Mar. 30, 2018, (39pages).
Office Action for U.S. Appl. No. 14/462,058 dated Apr. 27, 2018, (47pages).
Amendment and Response to Final and Advisory Actions and Request for Continued Examination for U.S. Appl. No. 14/448,678 dated Mar. 5, 2018, (25pages).
Amendment and Response for U.S. Appl. No. 14/555,553 dated Apr. 12, 2018, (24pages).
Advisory Action for U.S. Appl. No. 14/555,553 dated Apr. 24, 2018, (3pages).

(56) References Cited

OTHER PUBLICATIONS

Amendment and Response to Final Office Action and Request for Continued Examination for U.S. Appl. No. 14/555,553 dated May 11, 2018, (25pages).
Amendment and Response for U.S. Appl. No. 14/529,798 dated Mar. 28, 2018, (23pages).
Response for U.S. Appl. No. 14/755,684 dated Mar. 12, 2018, (23pages).
Advisory Action for U.S. Appl. No. 141755,684 dated Mar. 30, 2018, (2pages).
Response for U.S. Appl. No. 14/755,684 dated Apr. 4, 2018, (23pages).
Office Action for U.S. Appl. No. 14/555,902 dated May 17, 2018, (23pages).
Response for U.S. Appl. No. 14/207,121 dated Mar. 19, 2018, (34pages).
Advisory Action for U.S. Appl. No. 14/207,121 dated Apr. 6, 2018 (3pages).
Response for U.S. Appl. No. 14/462,315 dated May 9, 2018, (33pages).
Office Action for U.S. Appl. No. 14/698,746 dated Feb. 28, 2018, (14pages).
Response for U.S. Appl. No. 14/698,746 dated Apr. 30, 2018, (18pages).
Advisory Action for U.S. Appl. No. 14/698,746 dated May 15, 2018, (3pages).
Response for U.S. Appl. No. 14/462,397 dated Feb. 20, 2018, (33pages).
Response for U.S. Appl. No. 14/462,373 dated Feb. 28, 2018, (25pages).
Office Action for U.S. Appl. No. 14/755,859 dated Mar. 21, 2018, (57pages).
Response for U.S. Appl. No. 14/755,859 dated May 21, 2018, (8pages).
Response for U.S. Appl. No. 14/448,886 dated Feb. 28, 2018, (31pages).
Amendment for U.S. Appl. No. 14/448,922 dated Feb. 28, 2018, (27pages).
Office Action for U.S. Appl. No. 14/448,922 dated May 16, 2018, (41pages).
Office Action for U.S. Appl. No. 14/448,962 dated Apr. 13, 2018, (17pages).
Office Action for U.S. Appl. No. 14/448,986 dated May 11, 2018, (15pages).
Response for U.S. Appl. No. 14/462,411 dated May 8, 2018, (27pages).
Response for U.S. Appl. No. 14/555,334 dated Apr. 4, 2018, (14pages).
Advisory Action for U.S. Appl. No. 14/555,334 dated Apr. 17, 2018, (2pages).
Response for U.S. Appl. No. 14/555,334 dated May 7, 2018, (41pages).
Office Action for U.S. Appl. No. 14/673,646 dated Feb. 28, 2018, (19pages).
Response for U.S. Appl. No. 14/673,646 dated Mar. 30, 2018, (22pages).
Response for U.S. Appl. No. 14/701,087 dated Apr. 2, 2018, (41pages).
Amendment After Allowance for U.S. Appl. No. 14/675,166, (5pages).
Supplemental Notice of Allowability for U.S. Appl. No. 14/675,166, (3pages).
Response for U.S. Appl. No. 14/555,296, (23pages).
Response for U.S. Appl. No. 14/555,222, (8pages).
Office Action for U.S. Appl. No. 14/700,981, (28pages).
Office Action for U.S. Appl. No. 14/673,555, (43pages).
H.R. Gregg; Decision Tables for Documentation and System Analysis; Oct. 3, 1967; Union Carbide Corporation, Nuclear Division, Computing Technology Center: pp. 5, 6, 18, 19, & 21 (Year: 1967).
Solomon L. Pollack; Analysis of the Decision Rules in Decision Tables, May 1963; The Rand Corooration; pp. iii, iv, 1, 20, & 24 (Year: 1963).
Communication pursuant to Rules 70(2) and 70a(2) EPC dated Apr. 25, 2018 in European Patent Application No. 16843282.1-1217, (1page).
Final Office Action dated Jun. 6, 2017 in U.S. Appl. No. 14/462,411, (20pges).
Amendment After Final Office Action dated Jun. 6, 2017 in U.S. Appl. No. 14/448,922, (8pages).
Interview Summary dated Jun. 7, 2017 in U.S. Appl. No. 14/448,922, (2pages).
Advisory Action dated Jun. 14, 2017 in U.S. Appl. No. 14/448,922, (4pages).
Amendment After Final Office Action dated Jun. 20, 2017 in U.S. Appl. No. 14/448,922, (14pages)
Office Action dated May 26, 2017 in U.S. Appl. No. 14/553,347, (43pages).
Office Action dated Jun. 2, 2017 in U.S. Appl. No. 14/673,261, (65pages).
Office Action dated May 25, 2017 in U.S. Appl. No. 14/529,736, (42pages).
Office Action dated Jun. 6, 2017 in U.S. Appl. No. 14/462,315, (54pages).
Amendment and Response dated Jun. 2, 2017 in U.S. Appl. No. 14/448,986, (12pages).
Interview Summary dated Jun. 2, 2017 in U.S. Appl. No. 14/448,986, (3pages).
Office Action dated Jun. 7, 2017 in U.S. Appl. No. 14/555,334, (54pages).
Office Action dated Jun. 7, 2017 in U.S. Appl. No. 14/555,296, (7pages).
Response dated Jun. 7, 2017 in U.S. Appl. No. 14/555,543, (21pages).
Amendment dated Jun. 9, 2017 in U.S. Appl. No. 14/097,057, (26pages).
Office Action dated Jun. 22, 2017 in U.S. Appl. No. 14/698,746, (50pages).
Response to Restriction Requirement dated Jul. 5, 2017 in U.S. Appl. No. 14/555,902, (12pages).
PCT International Search Report for PCT/US2016/067866 Applicant: Intuit Inc., Form PCT/ISA/210 and 220, dated Jul. 26, 2017 (5pages).
PCT Written Opinion of the International Search Authority for PCT/US2016/067866, Applicant: Intuit Inc., Form PCT/ISA/237, dated Jul. 26, 2017 (4pages).
PCT International Search Report for PCT/US2016/067867 Applicant: Intuit Inc., Form PCT/ISA/210 and 220, dated Jul. 26, 2017 (5pages).
PCT Written Opinion of the International Search Authority for PCT/US2016/067867, Applicant: Intuit Inc., Form PCT/ISA/237, dated Jul. 26, 2017 (9pages).
Response to Office Action dated Jul. 17, 2017 in U.S. Appl. No. 14/462,345, (17pages).
Advisory Action dated Jul. 31, 2017 in U.S. Appl. No. 14/462,345, (3pages).
Request for Continued Examination and Response dated Aug. 14, 2017 in U.S. Appl. No. 14/462,345, (17pages).
Office Action dated Aug. 9, 2017 in U.S. Appl. No. 14/097,057, (47pages).
Interview Summary dated Sep. 6, 2017 in U.S. Appl. No. 14/553,347, (2pages).
Response dated Aug. 15, 2017 in U.S. Appl. No. 14/698,733, (24pages).
Response dated Aug. 10, 2017 in U.S. Appl. No. 14/448,678, (41pages).
Office Action dated Jul. 28, 2017 in U.S. Appl. No. 14/555,553, (52pages).
Office Action dated Aug. 21, 2017 in U.S. Appl. No. 14/755,684, (43pages).
Response dated Jul. 5, 2017 in U.S. Appl. No. 14/555,902, (12pages).
Office Action dated Sep. 8, 2017 in U.S. Appl. No. 14/555,939, (92pages).

(56) References Cited

OTHER PUBLICATIONS

Office Action dated Jun. 28, 2017 in U.S. Appl. No. 14/207,121, (29pages).
Office Action dated Sep. 14, 2017 in U.S. Appl. No. 14/557,335, (57pages).
Response dated Aug. 7, 2017 in U.S. Appl. No. 14/462,315, (10pages).
Advisory Action dated Aug. 24, 2017 in U.S. Appl. No. 14/462,315, (3pages).
Request for Examination and Response dated Sep. 6, 2017 in U.S. Appl. No. 14/462,315, (43pages).
Office Action dated Jun. 27, 2017 in U.S. Appl. No. 14/755,859, (174pages).
Advisory Action dated Jul. 5, 2017 in U.S. Appl. No. 14/448,922, (4pages).
Request for Continued Examination and Amendment dated Aug. 21, 2017 in U.S. Appl. No. 14/448,922, (37pages).
Request for Continued Examination and Amendment dated Sep. 6, 2017 in U.S. Appl. No. 14/448,922, (36pages).
Request for Continued Examination and Amendment dated Sep. 6, 2017 in U.S. Appl. No. 14/462,411, (24pages).
Office Action dated Aug. 25, 2017 in U.S. Appl. No. 14/673,646, (65pages).
Office Action dated Jun. 27, 2017 in U.S. Appl. No. 14/675,166, (46pages).
Response dated Jun. 23, 2017 in U.S. Appl. No. 14/555,293, (7pages).
Office Action dated Jul. 10, 2017 in U.S. Appl. No. 14/555,222, (63pages).
Office Action dated Aug. 18, 2017 in U.S. Appl. No. 14/555,543, (42pages).
Office Action dated Aug. 25, 2017 in U.S. Appl. No. 14/673,555, (71pages).
Response dated Sep. 21, 2017 in U.S. Appl. No. 14/448,481, (44pages).
Office Action dated Sep. 14, 2017 in U.S. Appl. No. 14/530,159, (41pages).
Amendment and Response dated Nov. 9, 2017 in U.S. Appl. No. 14/097,057, (31pgs.).
Amendment and Response dated Oct. 26, 2017 in U.S. Appl. No. 14/553,347, (25pgs.).
Amendment and Response dated Nov. 2, 2017 in U.S. Appl. No. 14/673,261, (30pgs.).
Office Action dated Oct. 30, 2017 in U.S. Appl. No. 14/448,678, (39pgs.).
Amendment and Response dated Oct. 30, 2017 in U.S. Appl. No. 14/555,553, (17pgs.).
Notice of Allowance dated Nov. 3, 2017 in U.S. Appl. No. 14/529,736, (13pgs.).
Interview Summary dated Sep. 28, 2017 in U.S. Appl. No. 14/529,736, (3pgs.).
Office Action dated Sep. 14, 2017 in U.S. Appl. No. 14/530,159, (41pgs.).
Amendment and Response dated Nov. 21, 2017 in U.S. Appl. No. 14/755,684, (23pgs.).
Office Action dated Nov. 15, 2017 in U.S. Appl. No. 14/206,834, (100pgs.).
Office Action dated Sep. 8, 2017 in U.S. Appl. No. 14/555,939, (92pgs.).
Amendment and Response dated Sep. 28, 2017 in U.S. Appl. No. 14/207,121, (38pgs.).
Office Action dated Sep. 14, 2017 in U.S. Appl. No. 14/557,335, (57pgs.).
Amendment and Response dated Aug. 7, 2017 in U.S. Appl. No. 14/462,315, (10pgs.).
Advisory Action dated Aug. 24, 2017 in U.S. Appl. No. 14/462,315, (3pgs.).
Amendment and Response and Request for Continued Examination dated Sep. 6, 2017 in U.S. Appl. No. 14/462,315, (43pgs.).
Amendment and Response dated Sep. 21, 2017 in U.S. Appl. No. 14/448,481, (44pgs.).
Office Action dated Jun. 22, 2017 in U.S. Appl. No. 14/698,746, (50pgs.).
Amendment and Response dated Sep. 22, 2017 in U.S. Appl. No. 14/698,746, (26pgs.).
Office Action dated Oct. 13, 2017 in U.S. Appl. No. 14/462,397, (72pgs.).
Office Action dated Nov. 30, 2017 in U.S. Appl. No. 14/462,373, (72pgs.).
Office Action dated Jun. 27, 2017 in U.S. Appl. No. 14/755,859, (174pgs.).
Amendment and Response dated Nov. 27, 2017 in U.S. Appl. No. 14/755,859, (53pgs.).
Amendment and Response dated Jun. 20, 2017 in U.S. Appl. No. 14/448,886, (14pgs.).
Advisory Action dated Jul. 5, 2017 in U.S. Appl. No. 14/448,886, (4pgs.).
Amendment and Response dated Aug. 21, 2017 in U.S. Appl. No. 14/448,886, (37pgs.).
Office Action dated Nov. 28, 2017 in U.S. Appl. No. 14/448,886, (65pgs.).
Amendment and Response and Request for Continued Examination dated Sep. 6, 2017 in U.S. Appl. No. 14/448,922, (36pgs.).
Office Action dated Nov. 28, 2017 in U.S. Appl. No. 14/448,922, (65pgs.).
Office Action dated Oct. 10, 2017 in U.S. Appl. No. 14/448,962, (27pgs.).
Office Action dated Oct. 16, 2017 in U.S. Appl. No. 14/448,986, (30pgs.).
OpenRules, Preparing a Tax Return Using OpenRules Dialog, Aug. 2011 (Year: 2011) (25pgs.).
Amendment and Response and Request for Continued Examination dated Sep. 6, 2017 in U.S. Appl. No. 14/462,411, (24pgs.).
Amendment and Response dated Nov. 7, 2017 in U.S. Appl. No. 14/555,334, (26pgs.).
Advisory Action dated Nov. 22, 2017 in U.S. Appl. No. 14/555,334, (2pgs.).
Office Action dated Oct. 11, 2017 in U.S. Appl. No. 14/701,030, (53pgs.).
Office Action dated Aug. 25, 2017 in U.S. Appl. No. 14/673,646, (65pgs.).
Office Action dated Jul. 10, 2017 in U.S. Appl. No. 14/555,222, (63pgs.).
Amendment and Response dated Nov. 10, 2017 in U.S. Appl. No. 14/555,222, (25pgs.).
Office Action dated Nov. 3, 2017 in U.S. Appl. No. 14/701,087, (103pgs.).
Office Action dated Jun. 27, 2017 in U.S. Appl. No. 14/675,166, (46pgs.).
Amendment and Response dated Oct. 27, 2017 in U.S. Appl. No. 14/675,166, (25pgs.).
Response dated Jun. 23, 2017 in U.S. Appl. No. 14/555,296, (7pgs.).
Office Action dated Oct. 20, 2017 in U.S. Appl. No. 14/555,296, (50pgs.).
Office Action dated Aug. 18, 2017 in U.S. Appl. No. 14/555,543, (42pgs.).
Interview Summary dated Oct. 25, 2017 in U.S. Appl. No. 14/555,543, (3pgs.).
Office Action dated Sep. 25, 2017 in U.S. Appl. No. 14/700,981, (52pgs.).
Office Action dated Aug. 25, 2017 in U.S. Appl. No. 14/673,555, (65pgs.).
Office Action dated Sep. 28, 2017 in U.S. Appl. No. 14/701,149, (71pgs.).
Vanderbilt University, "Free tax prep help available for Vanderbilt employees", Feb. 6, 2014, Vanderbilt University, p. 1-3 [NPL-1].
Office Action dated Dec. 28, 2017 in U.S. Appl. No. 14/097,057, filed Dec. 4, 2013, (10pages).
Office Action dated Jan. 12, 2018 in U.S. Appl. No. 14/462,345, filed Aug. 18, 2014, (9pages).
Office Action dated Jan. 30, 2018 in U.S. Appl. No. 14/553,347, filed Nov. 25, 2014, (40pages).

(56) References Cited

OTHER PUBLICATIONS

Office Action dated Dec. 12, 2017 in U.S. Appl. No. 14/698,733, filed Apr. 28, 2015, (90pages).
Response dated Feb. 12, 2018 in U.S. Appl. No. 14/698,733, filed Apr. 28, 2015, (36pages).
Advisory Action dated Feb. 16, 2018 in U.S. Appl. No. 14/698,733, filed Apr. 28, 2015, (3pages).
Response dated Jan. 3, 2018 in U.S. Appl. No. 14/448,678, filed Jul. 31, 2014, (37pages).
Advisory Action dated Feb. 5, 2018 in U.S. Appl. No. 14/448,678, filed Jul. 31, 2014, (7pages).
Office Action dated Feb. 12, 2018 in U.S. Appl. No. 14/555,553, filed Nov. 26, 2014, (40pages).
Notice of Allowability dated Dec. 22, 2017 in U.S. Appl. No. 14/529,736, filed Oct. 31, 2014, (13pages).
Office Action dated Dec. 28, 2017 in U.S. Appl. No. 14/529,798, filed Oct. 31, 2014, (61pages).
Response dated Jan. 16, 2018 in U.S. Appl. No. 14/530,159, filed Oct. 31, 2014, (13pages).
Interview Summary dated Feb. 5, 2018 in U.S. Appl. No. 14/530,159, filed Oct. 31, 2014, (3pages).
Office Action dated Jan. 12, 2018 in U.S. Appl. No. 14/755,684, filed Jun. 30, 2015, (31pages).
PCT International Preliminary Report on Patentability (Chapter I of the Patent Cooperation Treaty) for PCT/US2016/039919, Applicant: Intuit Inc., Form PCT/IB/326 and 373, dated Jan. 11, 2018, (11pages).
Response dated Feb. 15, 2018 in U.S. Appl. No. 14/206,834, filed Mar. 12, 2014, (36pages).
Interview Summary dated Feb. 15, 2018 in U.S. Appl. No. 14/206,834, filed Mar. 12, 2014, (3pages).
Response dated Jan. 5, 2018 in U.S. Appl. No. 14/555,902, filed Nov. 28, 2014, (14pages).
Response dated Dec. 8, 2017 in U.S. Appl. No. 14/555,939, filed Nov. 28, 2014, (52pages).
Office Action dated Jan. 18, 2018 in U.S. Appl. No. 14/207,121, filed Mar. 12, 2014, (22pages).
Response dated Jan. 31, 2018 in U.S. Appl. No. 14/557,335, filed Dec. 1, 2014, (26pages).
Office Action dated Feb. 9, 2018 in U.S. Appl. No. 14/462,315, filed Aug. 18, 2014, (38pages).
Notice of Allowance and Fee(s) Due dated Jan. 25, 2018 in U.S. Appl. No. 14/448,481, filed Jul. 31, 2014, (62pages).
Interview Summary dated Feb. 9, 2018 in U.S. Appl. No. 14/448,481, filed Jul. 31, 2014, (8pages).
Response dated Dec. 22, 2017 in U.S. Appl. No. 14/698,746, filed Apr. 28, 2015, (15pages).
Office Action dated Jan. 26, 2018 in U.S. Appl. No. 14/461,982, filed Aug. 18, 2014, (94pages).
Interview Summary dated Dec. 15, 2017 in U.S. Appl. No. 14/755,859, filed Jun. 30, 2015, (4pages).
PCT International Preliminary Report on Patentability (Chapter I of the Patent Cooperation Treaty) for PCT/US2016/039918, Applicant: Intuit Inc., Form PCT/IB/326 and 373, dated Jan. 11, 2018, (11pages).
Response dated Jan. 10, 2018 in U.S. Appl. No. 14/448,962, filed Jul. 31, 2014, (27pages).
Interview Summary dated Feb. 20, 2018 in U.S. Appl. No. 14/448,962, filed Jul. 31, 2014, (3pages).
Response dated Feb. 16, 2018 in U.S. Appl. No. 14/448,986, filed Jul. 31, 2014, (16pages).
Office Action dated Feb. 8, 2018 in U.S. Appl. No. 14/462,411, filed Aug. 18, 2014, (76pages).
Office Action dated Feb. 5, 2018 in U.S. Appl. No. 14/555,334, filed Nov. 26, 2014, (52pages).
Response dated Jan. 11, 2018 in U.S. Appl. No. 14/701,030, filed Apr. 30, 2015, (35pages).
Response dated Dec. 22, 2017 in U.S. Appl. No. 14/673,646, filed Mar. 30, 2015, (22pages).
Interview Summary dated Dec. 28, 2017 in U.S. Appl. No. 14/673,646, filed Mar. 30, 2015, (3pages).
Response dated Feb. 13, 2018 in U.S. Appl. No. 14/462,397, filed Aug. 18, 2014, (33pages).
Cronin, Julie-Anne et al., Distributing the Corporate Income Tax: Revised U.S. Treasury Methodology, May 2012, Department of Treasury, web, 2-31 (Year:2012) (34pages).
Notice of Allowance and Fee(s) Due dated Feb. 20, 2018 in U.S. Appl. No. 14/675,166, filed Mar. 31, 2015, (52pages).
Interview Summary dated Dec. 21, 2017 in U.S. Appl. No. 14/555,222, filed Nov. 26, 2014, (2pages).
Office Action dated Feb. 5, 2018 in U.S. Appl. No. 14/555,222, filed Nov. 26, 2014, (4pages).
Response dated Dec. 18, 2017 in U.S. Appl. No. 14/555,543, filed Nov. 26, 2014, (20pages).
Advisory Action dated Jan. 17, 2018 in U.S. Appl. No. 14/555,543, filed Nov. 26, 2014, (3pages).
Response dated Jan. 18, 2018 in U.S. Appl. No. 14/555,543, filed Nov. 26, 2014, (20pages).
Office Action dated Feb. 14, 2018 in U.S. Appl. No. 14/555,543, filed Nov. 26, 2014, (18pages).
Response dated Jan. 25, 2018 in U.S. Appl. No. 141700,981, filed Apr. 30, 2015, (30pages).
Response dated Dec. 26, 2017 in U.S. Appl. No. 14/673,555, filed Mar. 30, 2015, (22pages).
Interview Summary dated Jan. 19, 2018 in U.S. Appl. No. 14/673,555, filed Mar. 30, 2015, (3pages).
Response dated Dec. 28, 2017 in U.S. Appl. No. 14/701,149, filed Apr. 30, 2015, (46pages).
PCT International Preliminary Report on Patentability (Chapter I of the Patent Cooperation Treaty) for PCT/US2016/039917, Applicant: Intuit, Inc., Form PCT/IB/326 and 373, dated Feb. 8, 2018 (13pages).

* cited by examiner

| | $Q_A$ | $Q_B$ | $Q_C$ | $Q_D$ | $Q_E$ | $Q_F$ | $Q_G$ | Goal |
|---|---|---|---|---|---|---|---|---|
| Rule₁ | Y | ? | N | ? | ? | ? | ? | Yes |
| Rule₂ | Y | ? | Y | ? | ? | ? | Y | Yes |
| Rule₃ | N | Y | ? | ? | Y | ? | Y | Yes |
| Rule₄ | N | Y | ? | ? | N | N | ? | Yes |
| Rule₅ | N | N | ? | N | ? | N | ? | Yes |

ACA Topic
ZIP Code
92129
AGI
50,000
Tax Exempt Interest
500
Exemption?
NO
Coverage?
NO PLAN ⊕ Shared Responsibility Penalty is $405 because Deficit in Coverage caused ACA Penalty to apply and then was no exemption.

FIG. 10B

ACA Topic
ZIP Code
92129
AGI
50,000
Tax Exempt Interest
500
Exemption?
NO
Coverage?
NO PLAN ⊖ Shared Responsibility Penalty is $405 because Deficit in Coverage caused ACA Penalty to apply and then was no exemption.

• Deficit in Coverage was present because you did not enroll in qualified insurance plan

FIG. 11A

ACA Topic
ZIP Code: 92129
AGI: 50,000
Tax Exempt Interest: 500
Exemption? NO
Coverage? NO PLAN ⊖ Shared Responsibility Penalty is $405 because Deficit in Coverage caused ACA Penalty to apply and then was no exemption.

⊕ Calculated ACA Penalty ($405) is $310 above minimum penalty and $394 below maximum penalty

FIG. 11B

ACA Topic
ZIP Code: 92129
AGI: 50,000
Tax Exempt Interest: 500
Exemption? NO
Coverage? NO PLAN ⊖ Shared Responsibility Penalty is $405 because Deficit in Coverage caused ACA Penalty to apply and then was no exemption.

⊖ Calculated ACA Penalty ($405) is $310 above minimum penalty and $394 below maximum penalty ⊕ Calculated ACA Penalty ($405) is 1% of taxable income ($40,500.00)

FIG. 12A

119 — ACA Topic
ZIP Code: 92129
AGI: 50,000
118 — Tax Exempt Interest: 500
Exemption?: NO
Coverage?: NO PLAN ⊖ Shared Responsibility Penalty is $405 because Deficit in Coverage caused ACA Penalty to apply and then was no exemption.

⊕ No exemption because you do not qualify for any of specified exemptions including affordability exemption because the lowest cost plan is less than 8% of household income. — 116d 116, 104

FIG. 12B

119 — ACA Topic
ZIP Code: 92129
AGI: 50,000
118 — Tax Exempt Interest: 500
Exemption?: NO
Coverage?: NO PLAN ⊖ Shared Responsibility Penalty is $405 because Deficit in Coverage caused ACA Penalty to apply and then was no exemption.

⊖ No Exemption
 • Lowest cost bronze plan through state Marketplace is $250/mo. — 116e 116, 104

Shared Responsibility Payment Worksheet

If you or another member of your tax household had neither minimum essential coverage nor a coverage exemption for any month during 2014, use the Shared Responsibility Payment Worksheet, below, to figure your shared responsibility payment. You will enter the amount from line 14 of the worksheet on Form 1040, line 61; Form 1040A, line 38; or Form 1040EZ, line 11.

Complete the monthly columns by placing "X"s in each month in which you or another member of your tax household had neither minimum essential coverage nor a coverage exemption.

| Name | Jan | Feb | Mar | Apr | May | Jun | Jul | Aug | Sep | Oct | Nov | Dec |
|---|---|---|---|---|---|---|---|---|---|---|---|---|
| | | | | | | | | | | | | |
| | | | | | | | | | | | | |
| | | | | | | | | | | | | |
| | | | | | | | | | | | | |
| | | | | | | | | | | | | |

1. Total number of X's in a month, if 5 or more, enter 5 ................
2. Total number of X's in a month for individuals 18 or over* ................
3. One-half the number of X's in a month for individuals under 18* ................
4. Add lines 2 and 3 for each month ................
5. Multiply line 4 by $95 for each month. If $285 or more, enter $285 ................
6. Sum of the monthly amounts entered on line 1 ................
7. Enter your household income (see *Household Income*, earlier) ................
8. Enter your filing threshold (see *Filing Thresholds For Most People*, later) ................
9. Subtract line 8 from line 7 ................
10. Multiply line 9 by 1% (.01) ................
11. Is line 10 more than $285?
    ☐ Yes. Multiply line 10 by the number of months for which line 1 is more than zero
    ☐ No. Enter the amount from line 14 of the *Flat Dollar Amount Worksheet*
12. Divide line 11 by 12.0 ................
13. Multiply line 6 by $204** ................
14. Enter the smaller of line 12 or line 13 here and on Form 1040, line 61; Form 1040A, line 38; or Form 1040EZ, line 11. This is your shared responsibility payment ................

* For purposes of figuring the shared responsibility payment, an individual is considered under 18 for an entire month if he or she did not turn 18 before the first day of the month. An individual turns 18 on the anniversary of the day the individual was born. For example, someone born on March 1, 1999, is considered age 18 on March 1, 2017, and, therefore, is not considered age 18 for purposes of the shared responsibility payment until April 2017.

** $204 is the 2014 national average premium for a bronze level health plan available through the Marketplace for one individual and should not be changed.

SYSTEM AND METHOD FOR INDICATING SECTIONS OF ELECTRONIC TAX FORMS FOR WHICH NARRATIVE EXPLANATIONS CAN BE PRESENTED

CROSS-REFERENCE TO RELATED APPLICATION

This application is related to U.S. application Ser. No. 14/530,159, filed Oct. 31, 2014, entitled SYSTEM AND METHOD FOR GENERATING EXPLANATIONS FOR TAX CALCULATIONS, the contents of which are hereby incorporated by reference as though set forth in full.

SUMMARY

Embodiments are related to generating explanations regarding data within an electronic tax return during presentation of an electronic version of a tax form, or in "forms mode" presentation mode of a multi-mode tax return preparation system. For example, presentation modes of such systems may include an "interview" mode involving interview screens of or that are unique to a particular tax return preparation system, "forms" mode that involve an electronic version or rendering of a tax authority form, and data mode, which involves a list or table of tax data, such as a tax summary. Embodiments are also related to modifying electronic versions of tax forms. Embodiments are also related to indicating fields of an electronic version of a tax form for which explanations can be generated, and which fields for which explanations cannot be generated. Embodiments are also related to providing explanations regarding numerical data as well as non-numerical data (e.g., data concerning whether a certain box is checked, or data of a table or chart. Embodiments are also related to how explanations are initiated or requested, presented to a user. Embodiments are also related to providing users with the capability to access and/or modify data upon which an explanation is generated from within an explanation itself. Embodiments are further related to providing explanation capabilities during preparation of an electronic tax return as well as thereafter (e.g., when an accountant prepares an electronic tax return for a taxpayer and provides the taxpayer with a copy of the electronic tax return incorporating embodiments of the invention). Embodiments also relate to providing the ability to initiate an explanation from within an electronic version of a tax form and independently of an electronic tax return, e.g., as part of an electronic tax calculator involving electronic versions of tax forms and/or other electronic tax documents.

One embodiment involves a computer-implemented method for presenting an explanation for a tax calculation or operation performed by a tax return preparation system operable in multiple presentation modes. A tax calculation engine operates on a tax calculation graph to perform a tax calculation. In the tax calculation graph, tax calculations or operations are associated with respective explanations in the tax calculation graph. The method further comprises a user interface controller, while operating in forms mode of the multiple presentation modes, presenting to the user an electronic version of a tax form of a tax authority that has been modified by inclusion of interface elements associated with respective fields of the electronic version of the tax form and receiving, through the screen, user input regarding selection of an interface element to invoke presentation of an explanation regarding a tax calculation or operation for the associated field. In response to the user input, the user interface controller provides data in response to selection of the interface element to an explanation engine, which determines a narrative explanation based at least in part upon the tax calculation graph in response to data received from the user interface controller and providing the narrative explanation to the user interface controller. The user interface controller then presents the narrative explanation to the user.

A further embodiment involves a computer-implemented method for presenting explanations for a tax calculation or tax operation and includes a tax return preparation system, executed by at least one processor of at least one computing device, receiving an electronic version of a tax form of a tax authority, wherein the electronic version substantially corresponds to the tax form, and modifying the electronic version of the tax form. The electronic version of the tax form is modified by integrating respective interface elements into the electronic rendering such that respective interface elements are associated with respective fields the electronic rendering. While in forms mode, the tax return preparation system presents the modified electronic version of the tax form to a user of the tax preparation system, receives user input based on selection or activation of an interface element, presents an explanation for the tax calculation or tax operation of the field of the modified electronic version of the tax form associated with the selected interface element in response to the user input.

Yet other embodiments involve computerized systems for modifying electronic tax return forms and/or presenting an explanation for a tax calculation or operation performed by a tax return preparation system operable in multiple presentation modes. One embodiment of a system includes a directed tax calculation graph, a tax calculation engine and a user interface controller. Tax calculations or operations are associated with respective explanations in the tax calculation graph. The tax calculation engine is operable on the directed tax calculation graph to perform a tax calculation. The user interface controller, when operating in forms mode of the multiple presentation modes, is operable or configured to present to the user an electronic version of a tax form of a tax authority that has been modified by inclusion of interface elements associated with respective fields of the electronic version of the tax form and to receive user input regarding selection of an interface element to invoke presentation of an explanation regarding a tax calculation or operation for the associated field, and in response to the user input. The explanation engine is operable or configured to determine a narrative explanation based at least in part upon the tax calculation graph in response to data received from the user interface controller and provide the narrative explanation to the user interface controller, which is operable or configured to present the narrative explanation to the user in response to selection of the interface element.

Embodiments are also electronic tax return documents that allow users to initiate narrative explanations during, and independently of, preparation of an electronic tax return.

In a single or multiple embodiments, electronic versions of tax authority forms are modified by changing fields thereof to include certain emphasis or differentiation of fields for which explanations are available and for which explanations are not, e.g., by use of pre-determined colors, attributes of a font of data within a field or identifying a field, such as font type, font size, font color, bolding, italics, and underlining, or by adding a mouseover function that, for example, involves a mouseover of the field or of a separate interface element adjacent to the field.

In a single or multiple embodiments, a narrative explanation is generated or determined and presented in response to user selection of an interface element associated with a field populated with a calculation result or data input by a user, by importation from an electronic source, or from another source such as an electronic tax return.

In a single or multiple embodiments, a narrative explanation is determined and presented in response to user selection of an interface element associated with (e.g., within or adjacent to) an unpopulated field. For example, electronic versions of tax forms may include a table or chart, e.g., for the Affordable Care Act (ACA), which shows which months a taxpayer had insurance (with an "X") and which months the taxpayer was without insurance (such field being "blank"). Thus, narrative explanations can be generated for fields that include non-numerical data and fields populated with non-numerical indicators (e.g., Y/N or similar binary indicators), or not populated at all. For example, in connection with determinations regarding whether a user is subject to a penalty under ACA, a user may mouseover sections of a table or chart with indicators of whether the taxpayer had insurance for certain months.

Given the manner in which embodiments utilize a directed calculation graph, embodiments are able to present the same narrative in response to user requests made through different modified electronic versions of tax forms that involve the same data or field. For example, a field for "gross income" may be included in various modified versions of electronic tax forms, and the same narrative explanation can be presented when the user initiates an explanation from within the different modified electronic forms.

In a single or multiple embodiments, the tax calculation graph semantically describes data dependent tax operations comprising functional nodes connected to input nodes by one of a plurality of functions, wherein tax calculations or operations are associated with respective explanations in the tax calculation graph. A narrative explanation or "gist" or segment thereof, can be determined by the explanation engine recursively traversing at least a portion of the tax calculation graph in response to receiving the selected field data from the user interface controller. Natural language processing can be applied to segments, a result of which is presented to the user.

In a single or multiple embodiments, a narrative explanation can be determined in real-time or may be pre-determined. For example, a narrative explanation can be determined in response to initiation of presentation of a narrative explanation by selection of an interface element such that the explanation engine recursively traverses a directed calculation graph on response to a user request, whereas in other embodiments, a directed calculation graph can be traversed at before a user request, or as runtime data is received or updated, such that when a user selects an interface element to initiate a narrative explanation, the pre-determined narrative explanation is provided in response.

In a single or multiple embodiments, a narrative explanation includes a hyperlink that can be selected by the user such that the user is then directed to a source of the data and allow the user to change or delete the data. For example, if an explanation indicates that a user does not qualify for a deduction due to an age of the user being 65, but upon seeing this, the user realizes this is an error and the user's age should have been entered as 64, the age in the explanation can be a hyperlink to the form or field in which age was input to allow the user to change age data from 65 to 64. Thus, embodiments provide for data modification initiated from within a narrative explanation that was presented in response to selection of an interface element within a modified electronic tax form.

In a single or multipole embodiments, given the manner in which narrative explanations are generated and displayed, e.g., with nested hyperlinks to data entry fields and/or to present further and/or more detailed explanations, the explanations that are presented in response to various user inputs can be presented in a cascading tabbed or indented form, and can be collapsed or closed to a higher level, e.g., root narrative explanation, in response to user input.

Given various aspects of embodiments and how embodiments may be implemented, embodiments provide improvements to various technical fields and aspects, utilization and/or efficiencies thereof including improvements to computerized tax return preparation systems, electronic tax returns and documents and forms thereof, preparation of electronic tax returns, understanding of electronic tax returns and tax laws, personalization of tax return preparation experiences, user interfaces, user engagement and interactions with tax preparation applications, which involve, for example, modification or transformation of static electronic versions of tax authority forms into active components with which the user can interact and that can be utilized during preparation of an electronic tax return or at different times and in different applications such as tax calculators. Moreover, given the modular nature of system embodiments in which tax logic based on completeness graphs is separate from user interface controller functions and interview screens, in contrast to prior "hard-wired" approaches in which tax logic is an integral part of or encoded within interview screens, the efficiency of the tax preparation software and computers executing same are improved, and such systems provide for more flexibility by being configurable in various system and networked configurations, while allowing programmers to more easily adapt to changes in the ever-evolving tax code and to more easily update tax preparation applications and modular components thereof

BRIEF DESCRIPTION OF THE DRAWINGS

FIG. 4 illustrates a decision table based on or derived from the completeness graph of FIG. 3.

FIGS. 10A and 10B illustrate a display of a computing device along with a narrative explanation that was generated by the explanation engine according to one embodiment. The narrative explanation contains multiple phrases that are linked that can be selected to provide additional detailed explanations.

FIGS. 11A and 11B illustrate a display of a computing device along with a narrative explanation that was generated by the explanation engine according to one embodiment. The narrative explanation contains multiple phrases that are linked that can be selected to provide additional detailed explanations.

FIGS. 12A and 12B illustrate a display of a computing device along with a narrative explanation that was generated by the explanation engine according to one embodiment. The narrative explanation contains multiple phrases that are linked that can be selected to provide additional detailed explanations.

FIG. 14 illustrates an example of a tax form of a tax authority that can be presented to a user of a tax return preparation system operating in forms mode;

FIG. 15 illustrates how an electronic version of tax authority form may be modified according to embodiments for use in indicating which sections of an electronic form are associated with explanations;

FIG. 17 illustrates a modified electronic version of a tax authority form and attributes of an interface element associated with a field and that has been selected by a user during forms mode operation of the tax return preparation application.

FIG. 18A illustrates a screen generated in response to selection of an interface element of a modified electronic version of a tax authority form during forms mode and including an explanation and hyperlinks.

FIG. 21 illustrates how an interface element may be utilize to generate the same explanation when the same data populates fields of different forms that are associated with respective interface elements that can be selected during forms mode operation;

DETAILED DESCRIPTION OF ILLUSTRATED EMBODIMENTS

Figure 1:
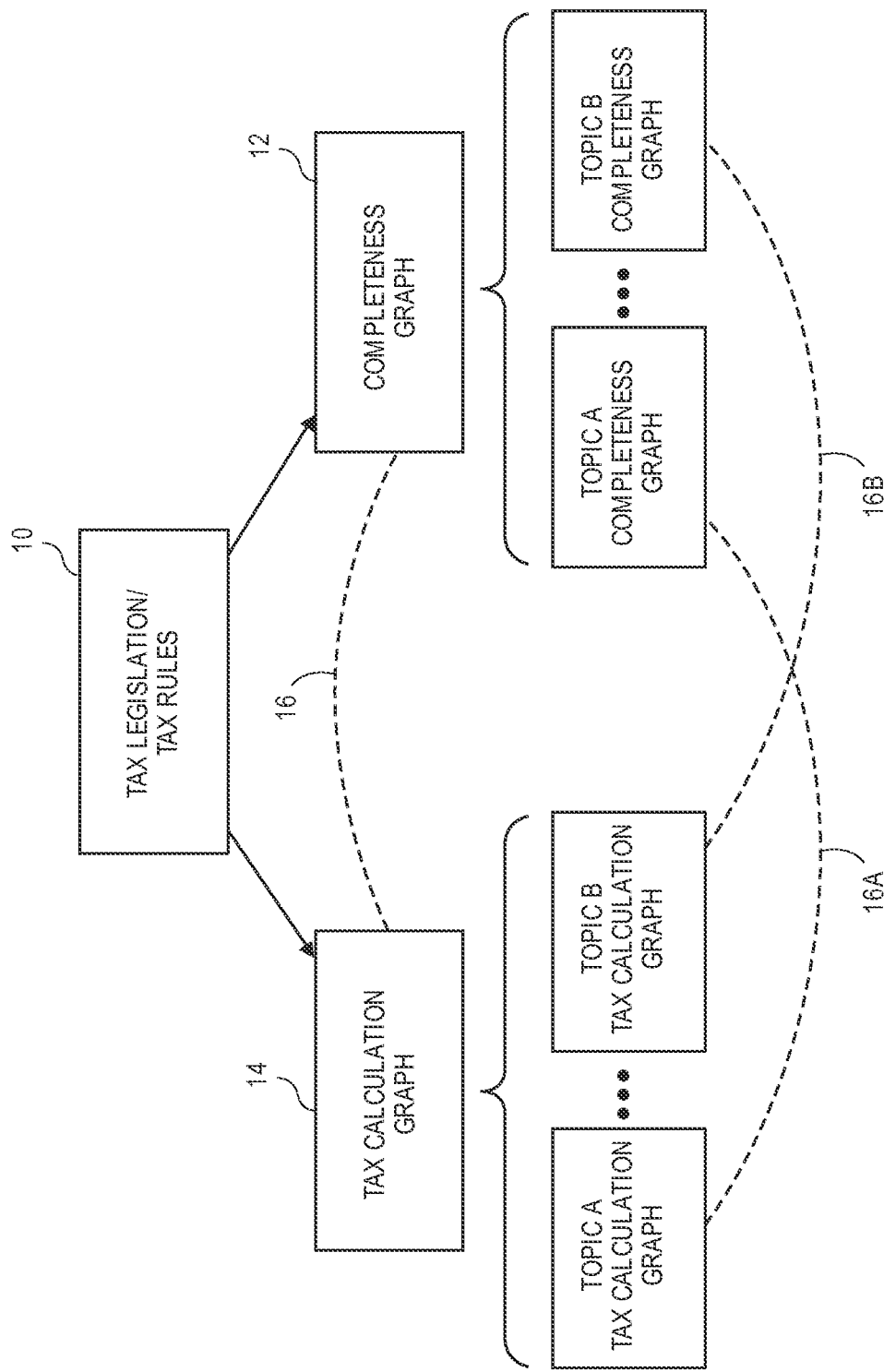
FIG. 1 schematically illustrates according to one embodiment how tax legislation and tax rules are parsed and represented by a completeness graph and a tax calculation graph.

Tax preparation is a time-consuming and laborious process. It is estimated that individuals and businesses spend around 6.1 billion hours per year complying with the filing requirements of the Internal Revenue Code. Tax preparation software has been commercially available to assist taxpayers in preparing their tax returns. Traditionally, a user has walked through a set of rigidly defined user interface interview screens that selectively ask questions that are relevant to a particular tax topic or data field needed to calculate a taxpayer's tax liability.

In contrast to the rigidly defined user interface screens used in prior iterations of tax preparation software that runs on computing devices, embodiments operate on a new construct in which tax rules and the calculations based thereon are established in declarative data-structures, namely, one or more completeness graphs 12 and one or more tax calculation graphs 14, and tax logic is separate from user interface screens, whereas in known systems, tax logic is integrated into or interview screens.

Completeness graphs 12 and tax calculation graphs 14 are data structures in the form of trees having nodes and interconnecting arcs in which arcs are directed from one node to another. Completion graphs 12 identify when all conditions have been satisfied to complete a particular tax topic or, collectively, produce a fileable tax return. The tax calculation graph 14 semantically describes data depending tax operations that perform a tax calculation or operation in accordance with tax code or tax rules. Examples of these data structures may be found in U.S. patent application Ser. Nos. 14/097,057 and 14/448,886, both of which are incorporated by reference as if set forth fully herein. Use of these data-structures permits the user experience to be loosely connected or even divorced from the tax calculation engine and the data used in the tax calculations. Tax calculations are dynamically calculated based on tax data derived from sourced data, estimates, user input, or even intermediate tax calculations that are then utilized for additional tax calculations. A smart tax logic agent running on a set of rules can review current run time data and evaluate missing data fields and propose suggested questions to be asked to a user to fill in missing blanks. This process can be continued until completeness of all tax topics has occurred. An electronic return can then be prepared and filed with respect to the relevant taxing jurisdictions.

With computer-implemented methods, explanations for tax calculations or tax operations performed by tax preparation software are generated. The explanations that are generated by the computer may be automatically generated as data is input or otherwise loaded into the tax preparation software. Explanations may also be generated or presented after a request by a user. The explanations are in easy to understand and may be presented in a narrative form. The explanations may be generated with varying levels of complexity depending on the user type, product type, or user credentials. The explanations are generated based on explanations associated with tax operations contained in the tax calculation graphs.

Further, with embodiments provide for different ways to initiate presentation of an explanation while the tax preparation application is operating in forms mode, or in a mode in which an electronic version or rendering of a tax authority form is displayed. An electronic version of a tax authority form is substantially similar to the tax authority form in terms of having the same or substantially similar layout, or look and feel, content, and fields for inputs and calculations or results. With embodiments, an electronic version of a tax authority form is modified with one or more interface elements, and during operation in forms mode, an interface element of a modified electronic version can be selected in order to initiate an explanation regarding an associated field, which may be a field for numerical data (e.g., an input or calculation), or a field for non-numerical data (e.g. whether a box is checked or whether a field is populated with specified non-numerical indicators, as well as for fields that are empty or unpopulated.

Embodiments and aspects thereof are described in further detail with reference to FIGS. 1-23. System and methods for generating explanations are described, and embodiments involving indicating which fields of an electronic form presented in forms mode (versus interview mode) are associated with explanations about the fields or data thereof are described.

FIG. 1 illustrates graphically how tax legislation/tax rules 10 are broken down into a completeness graph 12 and a tax calculation graph 14 utilized in embodiments. In one aspect of the invention, tax legislation or rules 10 are parsed or broken into various topics. For example, there may be nearly one hundred topics that need to be covered for completing a federal tax return. When one considers both federal and state tax returns, there can be well over one hundred tax topics that need to be covered. When tax legislation or tax rules 10 are broken into various topics or sub-topics, in one embodiment of the invention, each particular topic (e.g., topics A, B) may each have their own dedicated completeness graph 12A, 12B and their own dedicated tax calculation graph 14A, 14B as seen in FIG. 1.

Note that in FIG. 1, the completeness graph 12 and the tax calculation graph 14 are interdependent as illustrated by dashed line 16. That is to say, some elements contained within the completeness graph 12 are needed to perform actual tax calculations using the tax calculation graph 14. Likewise, aspects within the tax calculation graph 14 may be needed as part of the completion graph 12. Taken collectively, the completeness graph 12 and the tax calculation graph 14 represent data structures that capture all the conditions necessary to complete the computations that are required to complete a tax return that can be filed. The completeness graph 12, for example, determines when all conditions have been satisfied such that a "fileable" tax return can be prepared with the existing data. The completeness graph 12 is used to determine, for example, that no additional data input is needed to prepare and ultimately print or file a tax return. The completeness graph 12 is used to determine when a particular schema contains sufficient information such a tax return can be prepared and filed. Individual combinations of completeness graphs 12 and tax calculation graphs 14 that relate to one or more topics can be used complete the computations required for some sub-calculation. In the context of a tax setting, for example, a sub-selection of topical completeness graphs 12 and tax calculation graphs 14 can be used for intermediate tax results such as Adjusted Gross Income (AGI), Taxable Income (TI), itemized deductions, tax credits, and the like.

Figure 2:
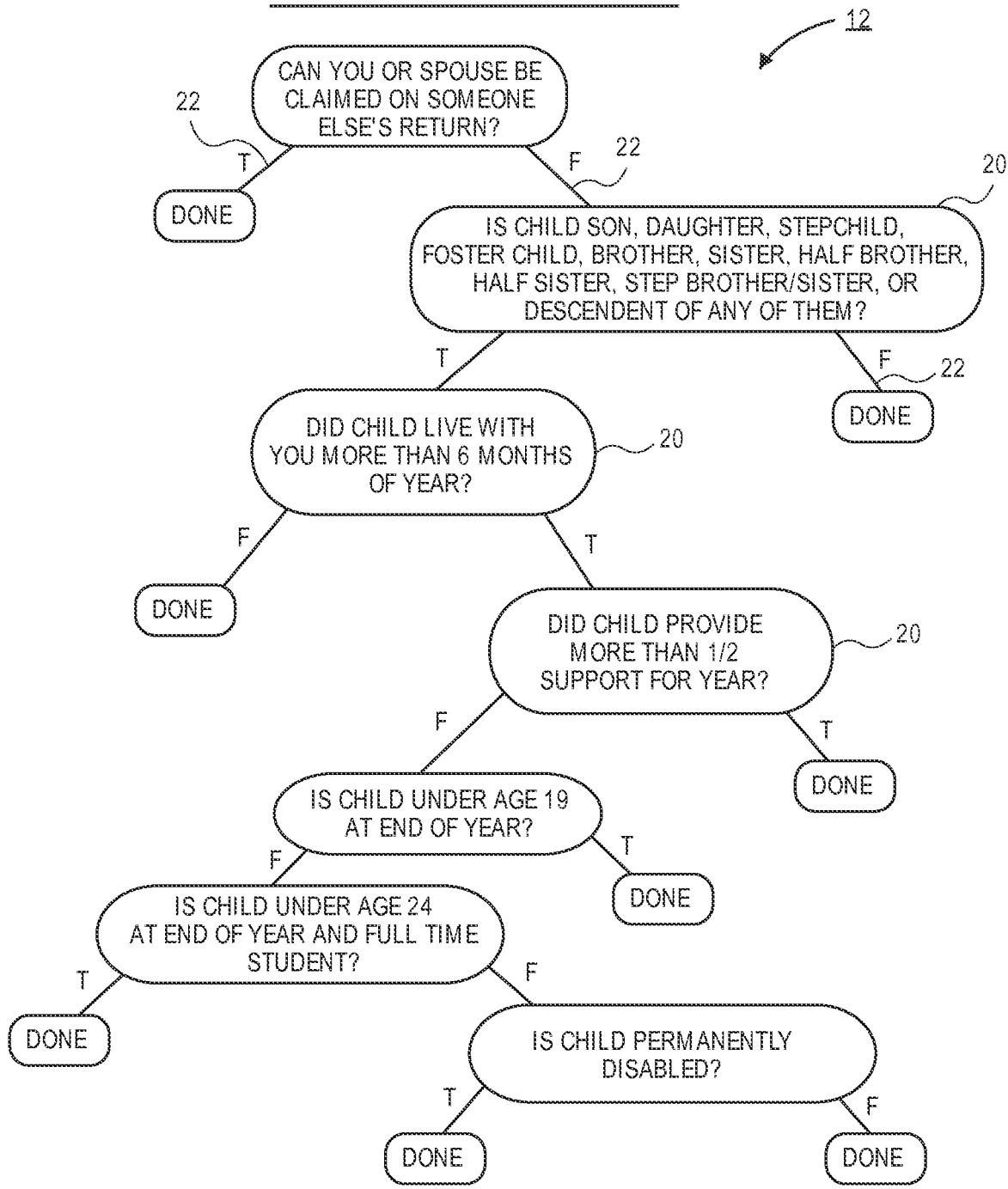
FIG. 2 illustrates an example of a simplified version of a completeness graph according to one embodiment related to a qualifying child for purposes of determining deductions for federal income tax purposes.

The completeness graph 12 and the tax calculation graph 14 represent data structures that can be constructed in the form of tree. FIG. 2 illustrates a completeness graph 12 in the form of a tree with nodes 20 and arcs 22 representing a basic or general version of a completeness graph 12 for the topic of determining, for example, whether a child qualifies as a dependent for federal income tax purposes. A more complete flow chart-based representation of questions related to determining a "qualified child" may be found in U.S. patent application Ser. No. 14/097,057, which is incorporated by reference herein. Each node 20 contains a condition that in this example is expressed as a Boolean expression that can be answered in the affirmative or negative. The arcs 22 that connect each node 20 illustrate the dependencies between nodes 20. The combination of arcs 22 in the completeness graph 12 illustrates the various pathways to completion. A single arc 22 or combination of arcs 22 that result in a determination of "Done" represent a pathway to completion. As seen in FIG. 2, there are several pathways to completion. For example, one pathway to completion is where an affirmative (True) answer is given to the question of whether you or a spouse can be claimed on someone else's tax return. If such a condition is true, your child is not a qualifying dependent because under IRS rules you cannot claim any dependents if someone else can claim you as a dependent. In another example, if you had a child and that child did not live with you for more than six months of the year, then your child is not a qualifying dependent. Again, this is a separate IRS requirement for a qualified dependent.

As one can imagine given the complexities and nuances of the tax code, many tax topics may contain completeness graphs 12 that have many nodes with a large number of pathways to completion. However, by many branches or lines within the completeness graph 12 can be ignored, for example, when certain questions internal to the completeness graph 12 are answered that eliminate other nodes 20 and arcs 22 within the completeness graph 12. The dependent logic expressed by the completeness graph 12 allows one to minimize subsequent questions based on answers given to prior questions. This allows a minimum question set that can be generated that can be presented to a user as explained herein.

Figure 3:
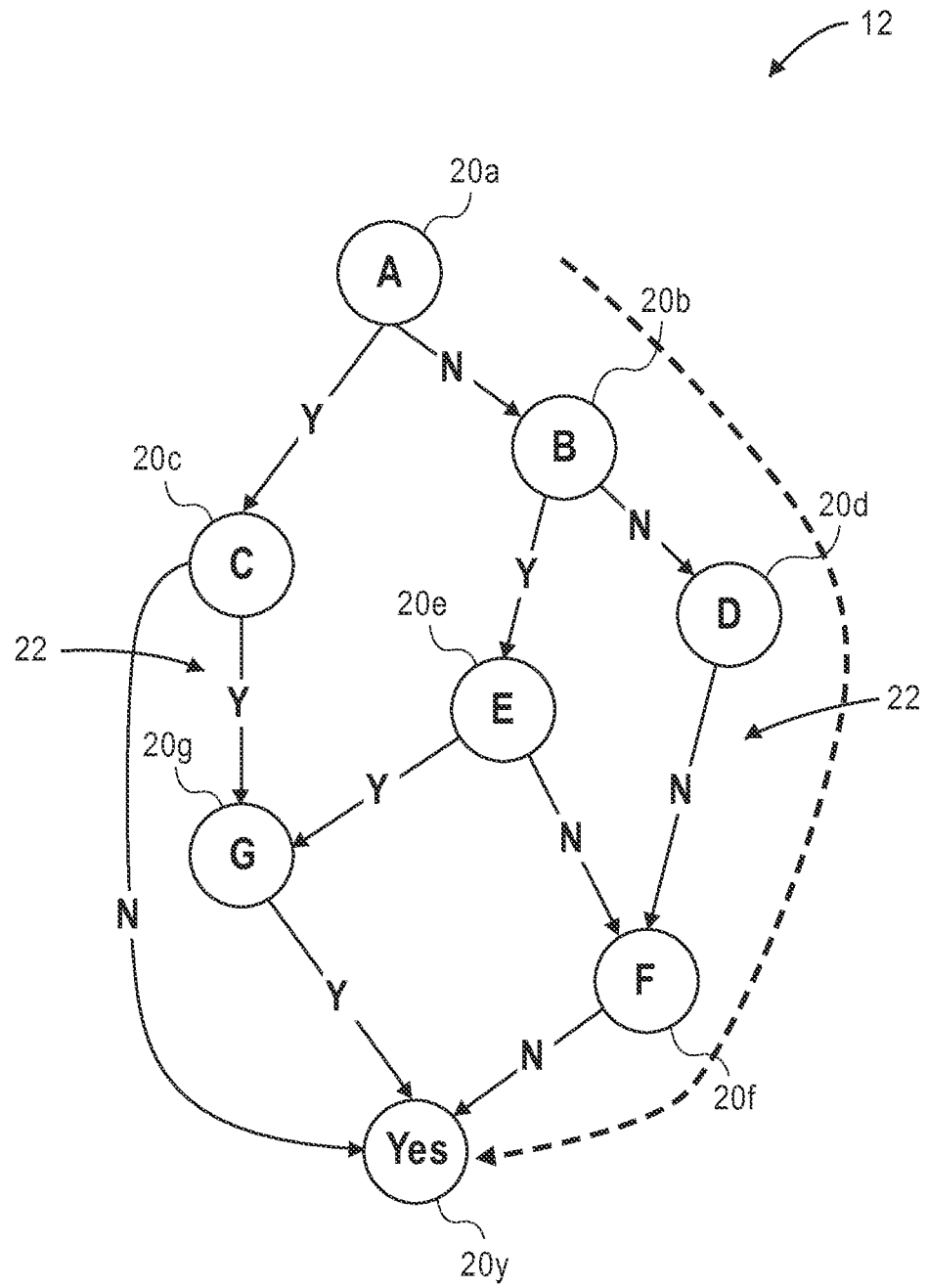
FIG. 3 illustrates another illustration of a completeness graph according to one embodiment.

FIG. 3 illustrates another example of a completeness graph 12 that includes a beginning node 20a (Node A), intermediate nodes 20b-g (Nodes B-G) and a termination node 20y (Node "Yes" or "Done"). Each of the beginning node 20a and intermediate nodes 20a-g represents a question. Inter-node connections or arcs 22 represent response options. In the illustrated embodiment, each inter-node connection 22 represents an answer or response option in binary form (Y/N), for instance, a response to a Boolean expression. It will be understood, however, that embodiments are not so limited, and that a binary response form is provided as a non-limiting example. In the illustrated example, certain nodes, such as nodes A, B and E, have two response options 22, whereas other nodes, such as nodes D, G and F, have one response option 22.

As explained herein, the directed graph or completion graph 12 that is illustrated in FIG. 3 can be traversed through all possible paths from the start node 20a to the termination node 20y. By navigating various paths through the completion graph 12 in a recursive manner one can determine each path from the beginning node 20a to the termination node 20y. The completion graph 12 along with the pathways to completion through the graph can be converted into a different data structure or format. In the illustrated embodiment shown in FIG. 4, this different data structure or format is in the form of a decision table 30. In the illustrated example, the decision table 30 includes rows 32 (five rows 32a-e are illustrated) based on the paths through the completion graph 12. In the illustrated embodiment, the columns 34a-g of the completion graph represent expressions for each of the questions (represented as nodes A-G in FIG. 3) and answers derived from completion paths through the completion graph 12 and column 34h indicates a conclusion, determination, result or goal 34h concerning a tax topic or situation, e.g., "Yes—your child is a qualifying child" or "No—your child is not a qualifying child."

Referring to FIG. 4, each row 32 of the decision table 30 represents a tax rule. The decision table 30, for example, may be associated with a federal tax rule or a state tax rule. In some instances, for example, a state tax rule may include the same decision table 30 as the federal tax rule. The decision table 30 can be used, as explained herein, to drive a personalized interview process for the user of tax preparation software. In particular, the decision table 30 is used to select a question or questions to present to a user during an interview process. In this particular example, in the context of the completion graph from FIG. 3 converted into the decision table 30 of FIG. 4, if the first question presented to the user during an interview process is question "A" and the user answers "Yes" rows 32c-e may be eliminated from consideration given that no pathway to completion is possible. The tax rule associated with these columns cannot be satisfied given the input of "Yes" in question "A." Note that those cell entries denoted by "?" represent those answers to a particular question in a node that is irrelevant to the particular pathway to completion. Thus, for example, referring to row 34a, when an answer to $Q_A$ is "Y" and a path is completed through the completion graph 12 by answering Question C as "N" then answers to the other questions in Nodes B and D-F are "?" since they are not needed to be answered given that particular path.

After in initial question has been presented and rows are eliminated as a result of the selection, next, a collection of candidate questions from the remaining available rows 32a and 32b is determined. From this universe of candidate questions from the remaining rows, a candidate question is selected. In this case, the candidate questions are questions $Q_C$ and $Q_G$ in columns 34c, 34g, respectively. One of these questions is selected and the process repeats until either the goal 34h is reached or there is an empty candidate list.

Figure 5:
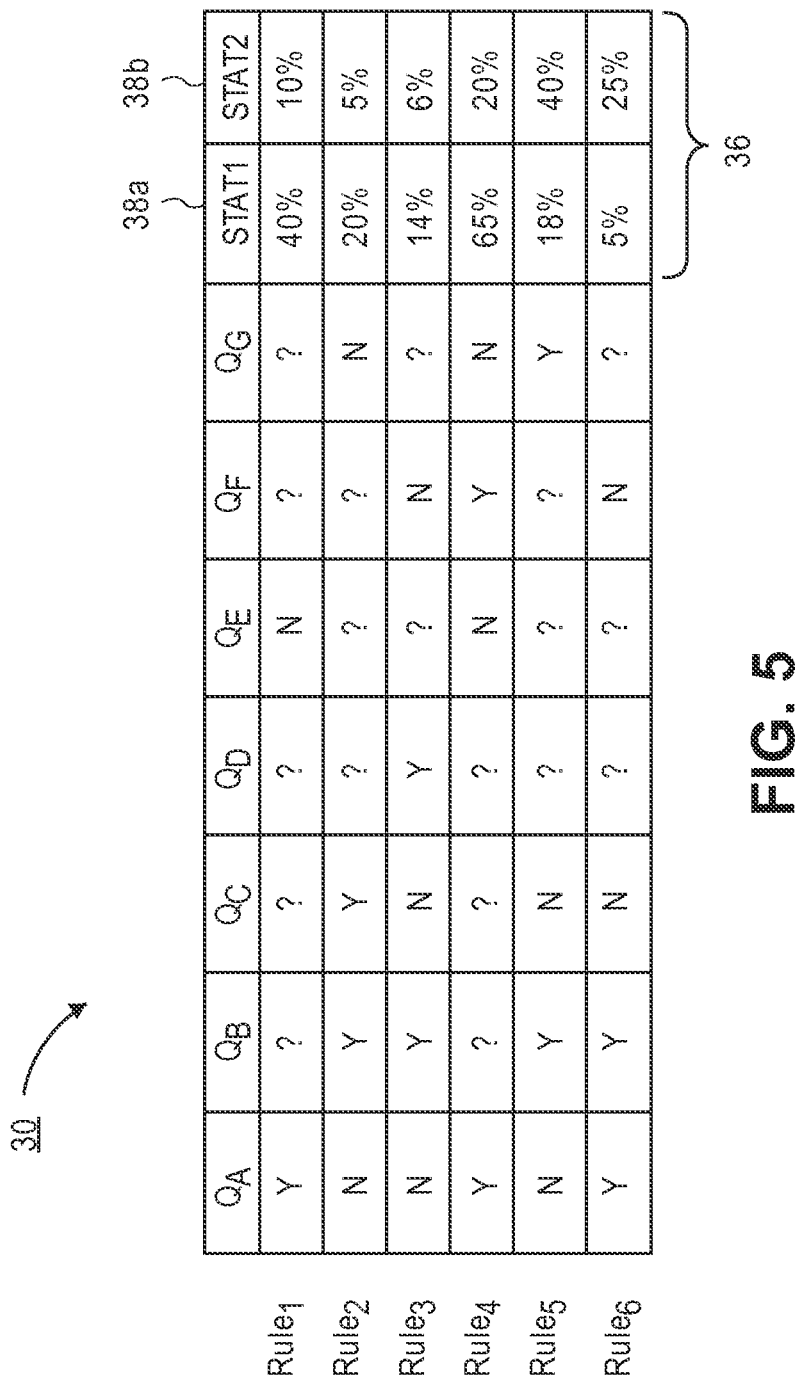
FIG. 5 illustrates another embodiment of a decision table that incorporates statistical data.

FIG. 5 illustrates another embodiment of a decision table 30. In this embodiment, the decision table 30 includes additional statistical data 36 associated with each rule (e.g., rules $R_1$-$R_6$). For example, the statistical data 36 may represent a percentage or the like in which a particular demographic or category of user(s) satisfies this particular path to completion. The statistical data 36 may be mined from existing or current year tax filings. The statistical data 36 may be obtained from a proprietary source of data such as tax filing data owned by Intuit, Inc. The statistical data 36 may be third party data that can be purchased or leased for use. For example, the statistical data 36 may be obtained from a government taxing authority or the like (e.g., IRS). In one aspect, the statistical data 36 does not necessarily relate specifically to the individual or individuals preparing the particular tax return. For example, the statistical data 36 may be obtained based on a number of tax filers which is then classified one or more classifications. For example, statistical data 36 can be organized with respect to age, type of tax filing (e.g., joint, separate, married filing separately), income range (gross, AGI, or TI), deduction type, geographic location, and the like).

FIG. 5 illustrates two such columns 38a, 38b in the decision table 30 that contain statistical data 36 in the form of percentages. For example, column 38a (STAT1) may contain a percentage value that indicates taxpayers under the age of thirty-five where $Rule_1$ is satisfied. Column 38b (STAT2) may contain a percentage value that indicates taxpayers over the age of thirty-five where $Rule_1$ is satisfied. Any number of additional columns 38 could be added to the decision table 30 and the statistics do not have to relate to an age threshold or grouping. The statistical data 36 may be used, as explained in more detail below, by the tax preparation software 100 to determine which of the candidate questions ($Q_A$-$Q_G$) should be asked to a taxpayer. The statistical data 36 may be compared to one or more known taxpayer data fields (e.g., age, income level, tax filing status, geographic location, or the like) such that the question that is presented to the user is most likely to lead to a path to completion. Candidate questions may also be excluded or grouped together and then presented to the user to efficiently minimize tax interview questions during the data acquisition process. For example, questions that are likely to be answered in the negative can be grouped together and presented to the user in a grouping and asked in the negative—for example, "we think these question do not apply to you, please confirm that this is correct." This enables the elimination of many pathways to completion that can optimize additional data requests of the taxpayer. Predictive models based on the statistical data 36 may be used to determine candidate questions.

Figure 6A:
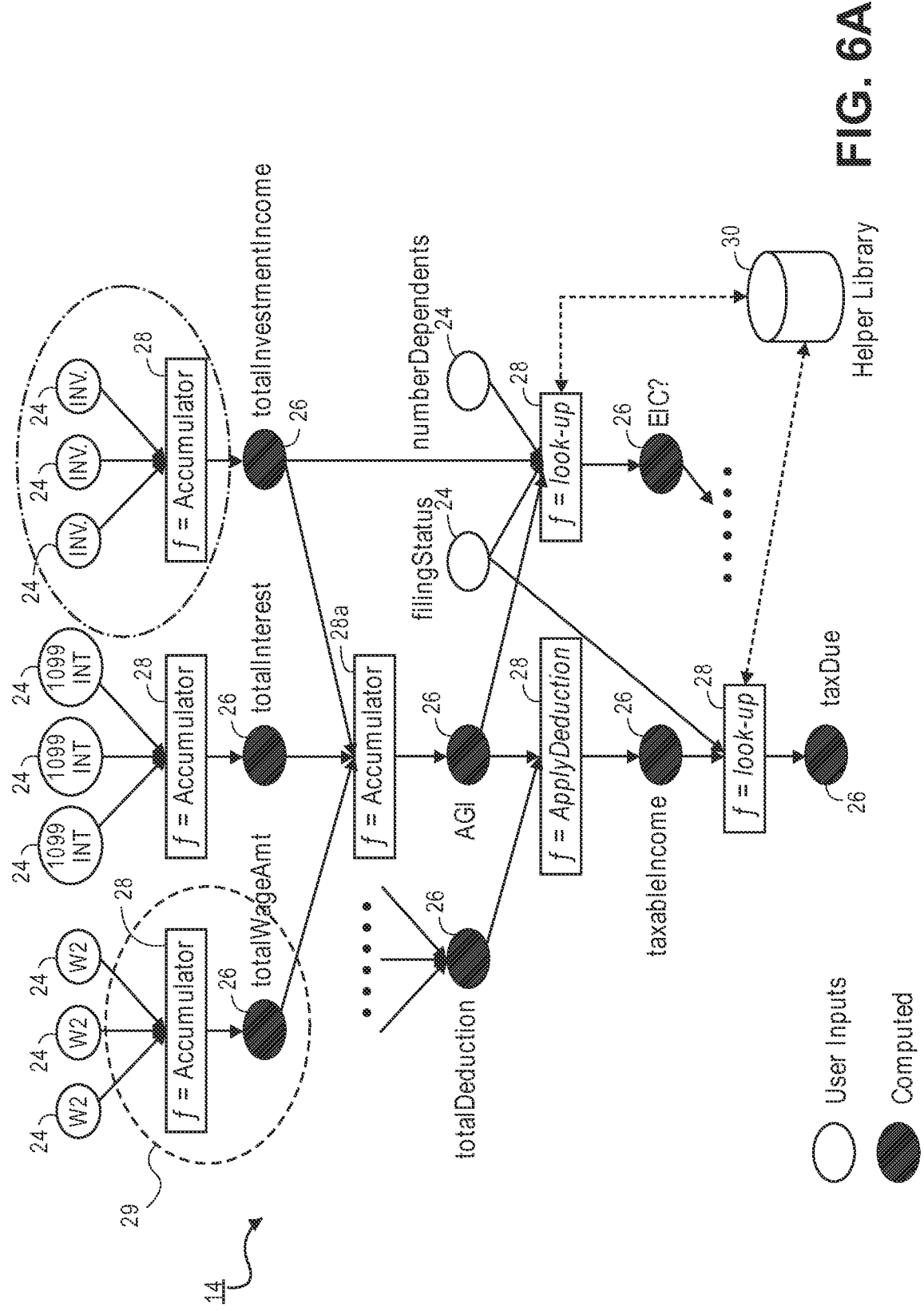
FIG. 6A illustrates an example of a calculation graph according to one embodiment.

FIG. 6A illustrates one example of a tax calculation graph 14. The tax calculation graph 14 semantically describes data dependent tax operations that used perform a tax calculation in accordance with the tax code or tax rules 10. The tax calculation graph 14 in FIG. 6A is a simplified view of data dependent tax operations that are used to determine the taxes Due (taxDue) based on various sources of income, deductions, exemptions, and credits. The tax calculation graph 14 is a type of directed graph and, in most situations relevant to tax calculations, is a directed acyclic graph that encodes the data dependencies amongst tax concepts or topics.

In FIG. 6A, various nodes 24 are leaf or input nodes. Examples of leaf nodes 24 in this particular example include data obtained from W-2 forms, data obtained from 1099-INT forms, data obtained from other investment income (INV), filing status, and number of dependents. Typically, though not exclusively, leaf nodes 24 are populated with user inputs. That is to say the user taxpayer will enter this information from a user interface as described herein. In other embodiments, however, the leaf nodes 24 may be populated with information that is automatically obtained by the tax preparation software 100. For example, in some embodiments, tax documents may be imaged or scanned with relevant data being automatically extracted using Object Character Recognition (OCR) techniques. In other embodiments, prior tax returns may be used by the tax preparation software 100 to extract information (e.g., name, potential dependents, address, and social security number) which can then be used to populate the leaf nodes 24. Online resources such as financial services websites or other user-specific websites can be crawled and scanned to scrape or otherwise download tax related information that can be automatically populated into leaf nodes 24. Additional third party information sources such as credit bureaus, government databases, and the like can also be used by the tax preparation software 100 to obtain information that can then be populated in to respective leaf nodes 24.

In still other embodiments, values for leaf nodes 24 may be derived or otherwise calculated. For example, while the number of dependents may be manually entered by a taxpayer, those dependent may not all be "qualifying" dependents for tax purposes. In such instances, the actual number of "qualified" dependents may be derived or calculated by the tax preparation software 100. In still other embodiments, values for leaf nodes 24 may be estimated as described herein.

Still other internal nodes referred to as functional nodes 26 semantically represent a tax concept and may be calculated or otherwise determined using a function 28. The functional node 26 and the associated function 28 define a particular tax operation 29. For example, as seen in FIG. 6A, operation 29 refers to total wage income and is the result of the accumulator function 28 summing all W-2 income from leaf nodes 24. The functional node 26 may include a number in some instances. In other instances, the functional node 26 may include a response to a Boolean expression such as "true" or "false." The functional nodes 26 may also be constant values in some instances. Some or all of these functional nodes 26 may be labelled as "tax concepts" or "tax topics." The combination of a functional node 26 and its associated function 28 relate to a specific tax operation as part of the tax topic.

Interconnected function nodes 26 containing data dependent tax concepts or topics are associated with a discrete set of functions 28 that are used to capture domain specific patterns and semantic abstractions used in the tax calculation. The discrete set of functions 28 that are associated with any particular function node 26 are commonly reoccurring operations for functions that are used throughout the process of calculating tax liability. For example, examples of such commonly reoccurring functions 28 include copy, capping, thresholding (e.g., above or below a fixed amount), accumulation or adding, look-up operations (e.g., look-up tax tables), percentage of calculation, phase out calculations, comparison calculations, exemptions, exclusions, and the like.

In one embodiment, the entire set of functions 28 that is used to compute or calculate a tax liability is stored within a data store 30 which in some instances may be a database. The various functions 28 that are used to semantically describe data connections between function nodes 26 can be called upon by the tax preparation software 100 for performing tax calculations. Utilizing these common functions 28 greatly improves the efficiency of the tax preparation software 100 can be used by programmer to more easily track and follow the complex nature of the ever-evolving tax code. The common functions 28 also enables easier updating of the tax preparation software 100 because as tax laws and regulations change, fewer changes need to be made to the software code as compared to prior hard-wired approaches.

Importantly, the tax calculation graph 14 and the associated function nodes 26 and functions 28 can be tagged and later be used or called upon to intelligently explain to the user the reasoning behind why a particular result was calculated or determined by the tax preparation software 100 program as explained in more detail below. The functions 28 can be de-coupled from a specific narrow definition and instead be associated with one or more explanations. Examples of common functions 28 found in tax legislation and tax rules include the concepts of "caps" or "exemptions" that are found in various portions of the tax code. One example of a "cap" is the portion of the U.S. tax code that limits the ability of a joint filer to deduct more than $3,000 of net capital losses in any single tax year. There are many other instances of such caps. An example of an "exemption" is one that relates to early distributions from retirement plants. For most retirement plans, early distributions from qualified retirement plans prior to reaching the age of fifty nine and one-half (59½) require a 10% penalty. This penalty can be avoided, however, if an exemption applies such as the total and permanent disability of the participant. Other exemptions also apply. Such exemptions are found throughout various aspects of the tax code and tax regulations.

In some embodiments, the function 28 may also include any number of mathematical or other operations. Examples of functions 28 include summation, subtraction, multiplication, division, and comparisons, greater of, lesser of, at least one of, calling of look-ups of tables or values from a database 30 or library as is illustrated in FIG. 6A. It should be understood that the function nodes 26 in the tax calculation graph 14 may be shared in some instances. For example, AGI is a reoccurring tax concept that occurs in many places in the tax code. AGI is used not only for the mathematical computation of taxes is also used, for example, to determine eligibility of certain tax deductions and credits. The AGI function node 26 may be found in multiple locations within the tax calculation graph 14. Taxable income is another example of such a function node 26.

Figure 6B:
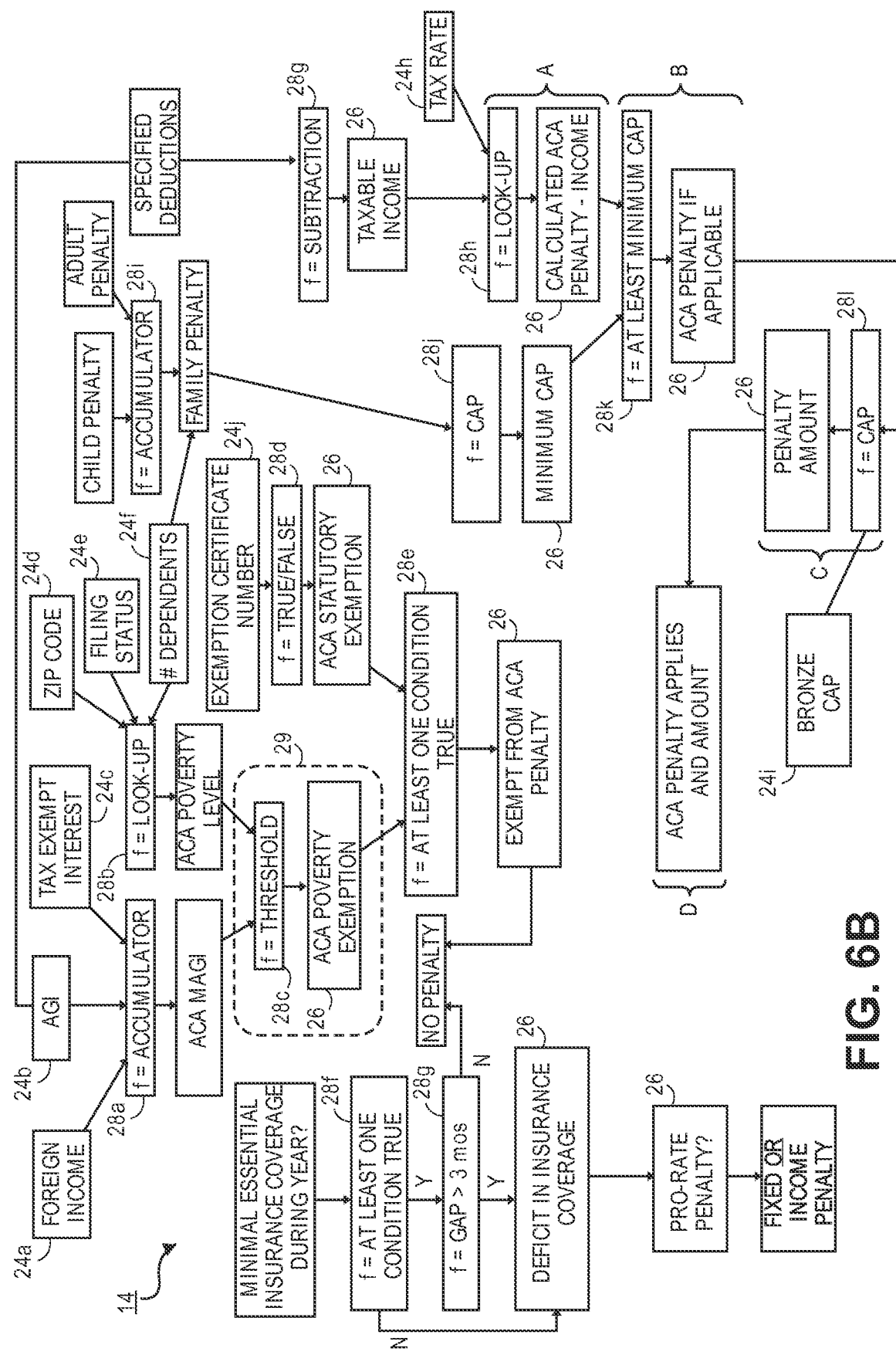
FIG. 6B illustrates an example of a calculation graph that relates to the determination and calculation of a shared responsibility penalty under the Affordable Care Act according to one embodiment.

FIG. 6B illustrates an example of a tax calculation graph 14 that is used to calculate the amount of penalty under the Affordable Care Act (ACA). Under the ACA, taxpayers are required to have minimum essential health coverage for each month of the year, qualify for an exemption, or make a shared responsibility penalty payment when filing his or her federal tax return. FIG. 6B illustrates a flowchart illustration of a process used to calculate a taxpayer's shared responsibility payment under the ACA (referred to herein as an ACA penalty). FIG. 6B illustrates, for example, various leaf nodes 24a-24j used as part of this calculation to determine the ACA penalty. Leaf nodes 24a-24f are used to calculate the modified adjusted gross income (ACA MAGI) as well as the applicable ACA poverty level. One can see how the accumulator function 28a is used to generate the ACA MAGI in this example by adding foreign income 14a, AGI 24b, and tax exempt interest 24c. Likewise, a look-up function 28b can be used to determine the applicable ACA poverty level based on the taxpayer's zip code 24d, filing status 24e, and number of dependents 24f. The ACA MAGI and the ACA poverty level are then subject to a thresholding function 28c to determine whether the ACA poverty level exemption applies. Under the ACA, if a taxpayer cannot afford basic coverage because the minimum amount one must pay for the premiums exceeds a percentage of household income (i.e., 8%), one is exempt from obtaining minimum essential coverage.

Still referring to FIG. 6B, a taxpayer may be exempt from the requirement to obtain minimum essential coverage by obtaining a different statutory exemption. These exemptions include: religious conscience, health care sharing ministry, a member of Indian tribe, short coverage gap (less than 3 consecutive months), hardship, affordability (already mentioned above), incarceration, and not lawfully present. A true/false Boolean function 28d may be used to determine whether an Exemption Certificate Number (ECN) has been obtained from the taxpayer certifying that one of the statutory exemptions has been satisfied. Another threshold function 28e is applied to determine whether one of the statutory exemptions is satisfied (e.g., affordability or others). If at least one of these statutory conditions is met then the taxpayer is exempt from the ACA shared responsibility payment penalty.

As seen in FIG. 6B, if a taxpayer has obtained minimal essential coverage during the year, there is still the possibility that a penalty may be owed because under the ACA, if there is a gap in coverage for a covered member of the family of more than three (3) months, at least some penalty amount is owed. Function 28f (at least one condition true) is used to determine if there was minimum essential coverage during the year for any period. Function 28g (gap>3 months) is used to determine the gap in coverage in order to gaps in coverage that exceed the 3 month statutory requirement. The gap in coverage penalty, however, may be pro-rated based on the length of the gap in coverage as indicated in FIG. 6B.

In the event there is a penalty, the ACA requires that the penalty be the greater of a percentage of income, net of specified deductions, or a specified penalty that is applied per individual or family. For example, for the 2015 year, the percentage is 2.0 percent and increases to 2.5 percent in subsequent years. FIG. 6B illustrates the use of a subtraction function 28g that utilizes the AGI node 24b to arrive at a taxable income value. A look-up function 28h is used to obtain the applicable tax rate (e.g., 2.0% for 2015) and is used to calculate the income-based ACA penalty.

In order to determine the non-income or "fixed" penalty, an accumulator function 28i is used to determine the penalty. In this example, the calculation pertains to a family wherein the penalty includes a fixed amount for a child ($162.50 per child in 2015) and a fixed amount per adult ($325.00 per adult). Under the ACA, there is a maximum cap of this fixed penalty. For example, in 2015, the maximum family penalty is $975. As seen in FIG. 6B, a cap function 28j is used to determine the minimum cap. Another function 28k that is referred to as "at least minimum cap" is used to determine the greater of the fixed penalty or the income-based penalty. If the income-based penalty is higher than the fixed amount then that value is used, otherwise the fixed penalty amount is used. Still referring to FIG. 6B, another cap function 28l is used to determine whether the penalty has exceeded another cap that is part of the ACA law. Under the ACA, the overall penalty is capped at the national average premium for a bronze level insurance plan. The cap function 28l is used to ensure that the calculated penalty (i.e., the income based penalty) does not exceed this amount. After application of the cap function 28l, the ACA penalty amount is determined.

As seen in FIG. 6B, there are a variety of different functions 28 that are employed as part of the process used to calculate any applicable penalty under the ACA. In some instances, a common function (e.g., cap functions 28j and 28l) is found in multiple locations within the tax calculation graph 14. It should be understood that the functions 28 illustrated in FIG. 6B are illustrative as other functions may be used beyond those specifically illustrated in the drawings.

Figure 7:
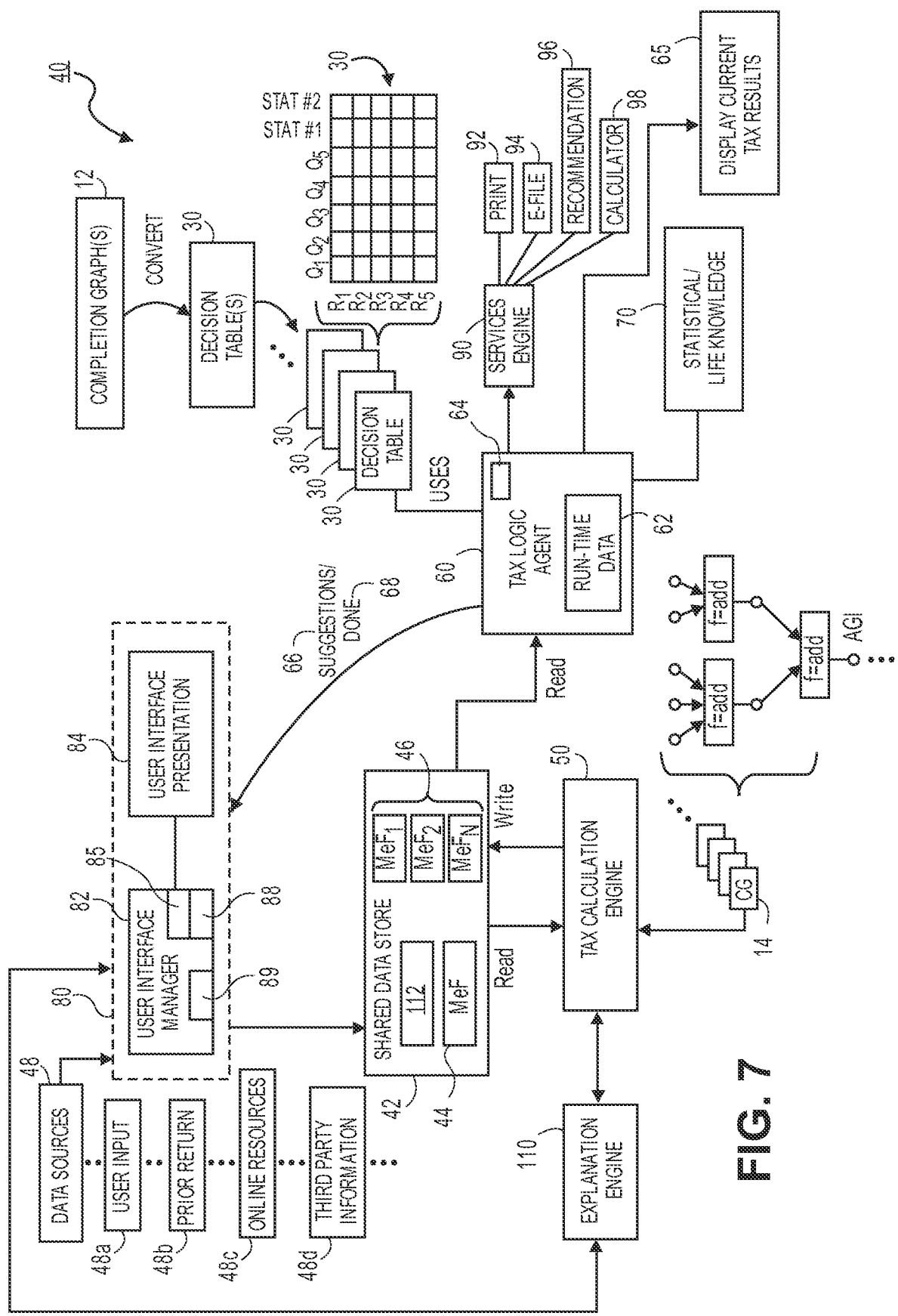
FIG. 7 schematically illustrates a system for calculating taxes using rules and calculations based on a declarative data structures according to one embodiment.

FIG. 7 schematically illustrates a system 40 for calculating taxes using rules and calculations based on a declarative data structures according to one embodiment. The system 40 include a shared data store 42 that contains therein a schema 44 or canonical model representative to the data fields utilized or otherwise required to complete a tax return. The shared data store 42 may be a repository, file, or database that is used to contain the tax-related data fields. The shared data store 42 is accessible by a computing device 102, 103 as described herein (e.g., FIG. 13). The shared data store 42 may be located on the computing device 102, 103 running the tax preparation software 100 or it may be located remotely, for example, in cloud environment on another, remotely located computer. The schema 44 may include, for example, a schema based on the Modernized e-File (MeF) system developed by the Internal Revenue Service. The MeF is a web-based system that allows electronic filing of tax returns through the Internet. MeF uses extensible markup language (XML) format that is used when identifying, storing, and transmitting data. For example, each line or data element on a tax return is given an XML name tag as well as every instance of supporting data. Tax preparation software 100 uses XML schemas and business rules to electronically prepare and transmit tax returns to tax reporting agencies. Transmitters use the Internet to transmit electronic tax return data to the IRS MeF system. The IRS validates the transmitted files against the XML schemas and Business Rules in the MeF schema 44.

The schema 44 may be a modified version of the MeF schema used by the IRS. For example, the schema 44 may be an extended or expanded version of the MeF model established by government authorities that utilizes additional fields. While the particular MeF schema 44 is discussed herein the invention is not so limited. There may be many different schemas 44 depending on the different tax jurisdiction. For example, Country A may have a tax schema 44 that varies from Country B. Different regions or states within a single country may even have different schemas 44. The systems and methods described herein are not limited to a particular schema 44 implementation. The schema 44 may contain all the data fields required to prepare and file a tax return with a government taxing authority. This may include, for example, all fields required for any tax forms, schedules, and the like. Data may include text, numbers, and a response to a Boolean expression (e.g., True/False or Yes/No). As explained in more detail, the shared data store 42 may, at any one time, have a particular instance 46 of the MeF schema 44 stored therein at any particular time. For example, FIG. 7 illustrates several instances 46 of the MeF schema 44 (labeled as $MeF_1$, $MeF_2$, $MeF_N$). These instances 46 may be updated as additional data is input into the shared data store 42.

As seen in FIG. 7, the shared data store 42 may import data from one or more data sources 48. A number of data sources 48 may be used to import or otherwise transfer tax related data to the shared data store 42. This may occur through a user interface control 80 as described herein or, alternatively, data importation may occur directly to the shared data store 42 (not illustrated in FIG. 7). The tax related data may include personal identification data such as a name, address, or taxpayer ID. Tax data may also relate to, for example, details regarding a taxpayer's employer(s) during a preceding tax year. This may include, employer name, employer federal ID, dates of employment, and the like. Tax related day may include residential history data (e.g., location of residence(s) in tax reporting period (state, county, city, etc.) as well as type of housing (e.g., rental unit or purchased home). Tax related information may also include dependent-related information such as the number of family members in a household including children. Tax related information may pertain to sources of income, including both earned and unearned income as well. Tax related information also include information that pertains to tax deductions or tax credits. Tax related information may also pertain to medical insurance information. For example, under the new ACA many taxpayers may obtain health insurance through a state or federal marketplace. Such a marketplace may have information stored or accessible that is used in connection with preparing a tax return. Tax information related to premiums paid, coverage information, subsidy amounts (if any), and enrolled individuals can be automatically imported into the shared data store 42.

User input 48*a* is also one type of data source 48. User input 48*a* may take a number of different forms. For example, user input 48*a* may be generated by a user using, for example, a input device such as keyboard, mouse, touchscreen display, voice input (e.g., voice to text feature), photograph or image, or the like to enter information manually into the tax preparation software 100. For example, as illustrated in FIG. 7, user interface manager 82 contains an import module 89 that may be used to select what data sources 48 are automatically searched for tax related data. Import module 89 may be used as a permission manager that includes, for example, user account numbers and related passwords. The UI control 80 enables what sources 48 of data are searched or otherwise analyzed for tax related data. For example, a user may select prior year tax returns 48*b* to be searched but not online resources 48*c*. The tax data may flow through the UI control 80 directly as illustrated in FIG. 7 or, alternatively, the tax data may be routed directly to the shared data store 42. The import module 89 may also present prompts or questions to the user via a user interface presentation 84 generated by the user interface manager 82. For example, a question or prompt may ask the user to confirm the accuracy of the data. For instance, the user may be asked to click a button, graphic, icon, box or the like to confirm the accuracy of the data prior to or after the data being directed to the shared data store 42. Conversely, the interface manager 82 may assume the accuracy of the data and ask the user to click a button, graphic, icon, box or the like for data that is not accurate. The user may also be given the option of whether or not to import the data from the data sources 48.

User input 48*a* may also include some form of automatic data gathering. For example, a user may scan or take a photographic image of a tax document (e.g., W-2 or 1099) that is then processed by the tax preparation software 100 to extract relevant data fields that are then automatically transferred and stored within the data store 42. OCR techniques along with pre-stored templates of tax reporting forms may be called upon to extract relevant data from the scanned or photographic images whereupon the data is then transferred to the shared data store 42.

Another example of a data source 48 is a prior year tax return 48*b*. A prior year tax return 48*b* that is stored electronically can be searched and data is copied and transferred to the shared data store 42. The prior year tax return 48*b* may be in a proprietary format (e.g., .txf, .pdf) or an open source format. The prior year tax return 48*b* may also be in a paper or hardcopy format that can be scanned or imaged whereby data is extracted and transferred to the shared data store 42. In another embodiment, a prior year tax return 48*b* may be obtained by accessing a government database (e.g., IRS records).

An additional example of a data source 48 is an online resource 48*c*. An online resource 48*c* may include, for example, websites for the taxpayer(s) that contain tax-related information. For example, financial service providers such as banks, credit unions, brokerages, investment advisors typically provide online access for their customers to view holdings, balances, transactions. Financial service providers also typically provide year-end tax documents to their customers such as, for instance, 1099-INT (interest income), 1099-DIV (dividend income), 1099-B (brokerage proceeds), 1098 (mortgage interest) forms. The data contained on these tax forms may be captured and transferred electronically to the shared data store 42.

Of course, there are additional examples of online resources 48*c* beyond financial service providers. For example, many taxpayers may have social media or similar accounts. These include, by way of illustration and not limitation, Facebook, Linked-In, Twitter, and the like. User's may post or store personal information on these properties that may have tax implications. For example, a user's Linked-In account may indicate that a person changed jobs during a tax year. Likewise, a posting on Facebook about a new home may suggest that a person has purchased a home, moved to a new location, changed jobs; all of which may have possible tax ramifications. This information is then acquired and transferred to the shared data store 42, which can be used to drive or shape the interview process described herein. For instance, using the example above, a person may be asked a question whether or not she changed jobs during the year (e.g., "It looks like you changed jobs during the past year, is this correct?"). Additional follow-up questions can then be presented to the user.

Still referring to FIG. 7, another data source 48 includes sources of third party information 48*d* that may be accessed and retrieved. For example, credit reporting bureaus contain a rich source of data that may implicate one or more tax items. For example, credit reporting bureaus may show that a taxpayer has taken out a student loan or home mortgage loan that may be the source of possible tax deductions for the taxpayer. Other examples of sources of third party information 48*d* include government databases. For example, the state department of motor vehicles may contain information relevant to tax portion of vehicle registration fees which can be deductible in some instances. Other government databases that may be accessed include the IRS (e.g., IRS tax return transcripts), and state taxing authorities. Third party resources 48*d* may also include one of the state-based health insurance exchanges or the federal health insurance exchange (e.g., www.healthcare.gov).

Figure 22:
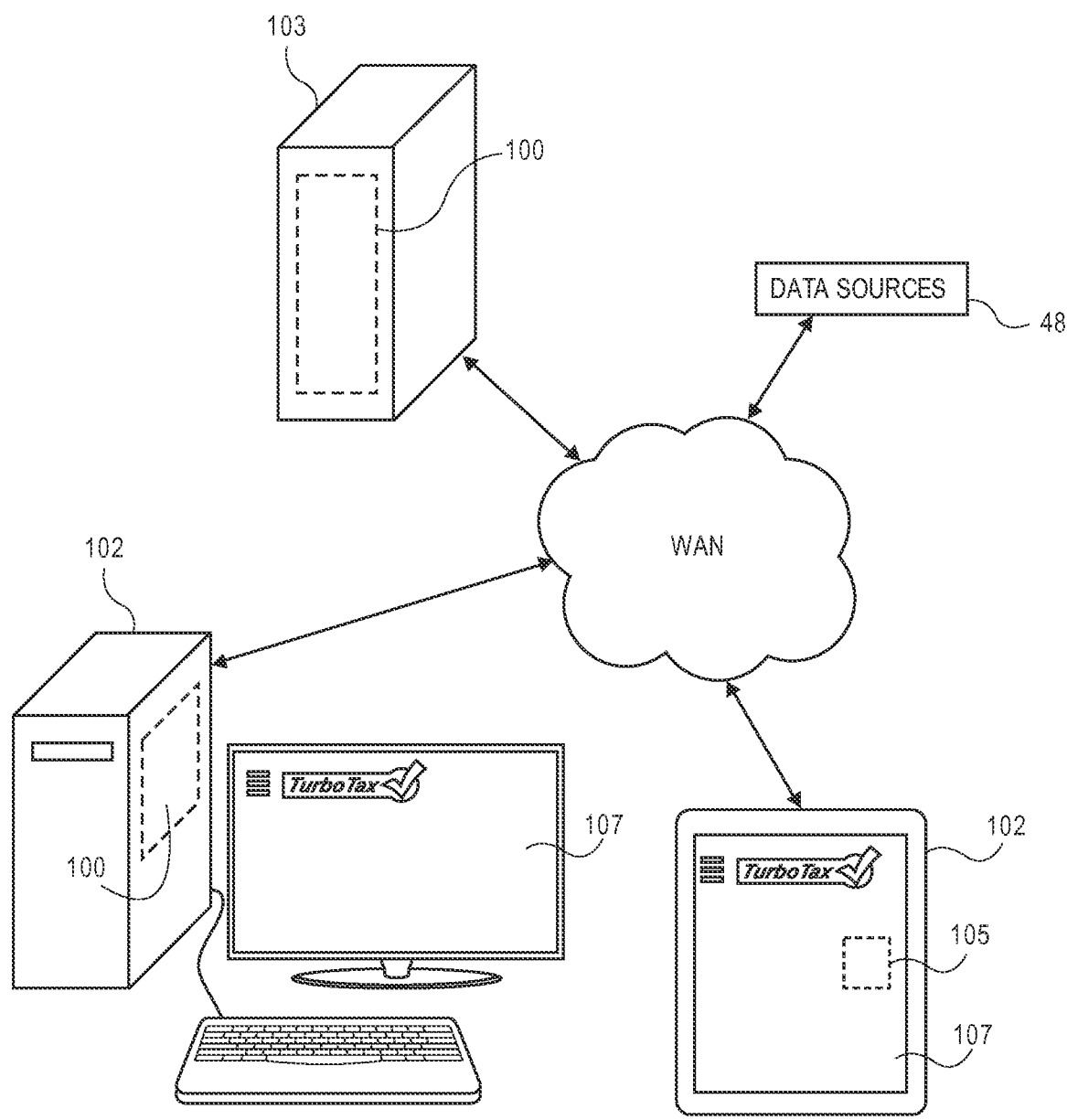
FIG. 22 illustrates the implementation of tax preparation software on various computing devices according to one embodiment.

Referring briefly to FIG. 22, the tax preparation software 100 including the system 40 of FIG. 7 is executed by the computing device 102, 103. Referring back to FIG. 7, the tax preparation software 100 includes a tax calculation engine 50 that performs one or more tax calculations or tax operations based on the available data at any given instance within the schema 44 in the shared data store 42. The tax calculation engine 50 may calculate a final tax due amount, a final refund amount, or one or more intermediary calculations (e.g., taxable income, AGI, earned income, un-earned income, total deductions, total credits, alternative minimum tax (AMT) and the like). The tax calculation engine 50 utilizes the one or more calculation graphs 14 as described previously in the context of FIGS. 1, 6A, and 6B. In one embodiment, a series of different calculation graphs 14 are used for respective tax topics. These different calculation graphs 14 may be glued together or otherwise compiled as a composite calculation graph 14 to obtain an amount of taxes due or a refund amount based on the information contained in the shared data store 42. The tax calculation engine 50 reads the most current or up to date information contained within the shared data store 42 and then performs tax calculations. Updated tax calculation values are then written back to the shared data store 42. As the updated tax calculation values are written back, new instances 46 of the canonical model 46 are created. The tax calculations performed by the tax calculation engine 50 may include the calculation of an overall tax liability or refund due. The tax calculations may also include intermediate calculations used to determine an overall tax liability or refund due (e.g., AGI calculation). Tax calculations include, for example, the ACA penalty that is described in FIG. 6B as one illustrative example.

While certain system configurations are described above, given the modular nature of system components, components may be incorporated into a tax return preparation application or be executed as a distributed system on two or more different computing systems through respective networks. Tax logic agent 60 determinations can be determined separately of UI controller 80 functions, which can be performed separately of calculation engine 50 processing, and one or more or all of which may be managed by respective independent computers through respective networks such that communications between components described herein may be performed through respective networks between respective computing devices. Thus, embodiments may provide for a flexible, modular and distributed tax return preparation system, capable of different system configurations, in which UI determinations and interview screen presentment are independent of tax logic and tax calculations, and one or more components may be remote relative to other components and communications are conducted through respective networks.

Still referring to FIG. 7, the system 40 includes a tax logic agent (TLA) 60. The TLA 60 operates in conjunction with the shared data store 42 whereby updated tax data represented by instances 46 are read to the TLA 60. The TLA 60 contains run time data 62 that is read from the shared data store 42. The run time data 62 represents the instantiated representation of the canonical tax schema 44 at runtime. The TLA 60 may contain therein a rule engine 64 that utilizes a fact cache to generate either non-binding suggestions 66 for additional question(s) to present to a user or "Done" instructions 68 which indicate that completeness has occurred and additional input is not needed. The rule engine 64 may operate in the form a Drools expert engine. Other declarative rules engines 64 may be utilized and a Drools expert rule engine 64 is provided as one example of how embodiments may be implemented. The TLA 60 may be implemented as a dedicated module contained within or executed in connection with the tax preparation software 100.

As seen in FIG. 7, The TLA 60 uses the decision tables 30 to analyze the run time data 62 and determine whether a tax return is complete. Each decision table 30 created for each topic or sub-topic is scanned or otherwise analyzed to determine completeness for each particular topic or sub-topic. In the event that completeness has been determined with respect to each decision table 30, then the rule engine 64 outputs a "done" instruction 68 to the UI control 80. If the rule engine 64 does not output a "done" instruction 68 that means there are one or more topics or sub-topics that are not complete, which, as explained in more detail below presents interview questions to a user for answer. The TLA 60 identifies a decision table 30 corresponding to one of the non-complete topics or sub-topics and, using the rule engine 64, identifies one or more non-binding suggestions 66 to present to the UI control 80. The non-binding suggestions 66 may include a listing of compilation of one or more questions (e.g., $Q_1$-$Q_5$ as seen in FIG. 7) from the decision table 30. In some instances, the listing or compilation of questions may be ranked in order by rank. The ranking or listing may be weighted in order of importance, relevancy, confidence level, or the like. For example, a top ranked question may be a question that, based on the remaining rows (e.g., $R_1$-$R_5$) in a decision will most likely lead to a path to completion. As part of this ranking process, statistical information such as the STAT1, STAT2 percentages as illustrated in FIG. 5 may be used to augment or aid this ranking process. Questions may also be presented that are most likely to increase the confidence level of the calculated tax liability or refund amount. In this regard, for example, those questions that resolve data fields associated with low confidence values may, in some embodiments, be ranked higher. Predictive modeling based on statistical data 36 using any suitable data such as previously filed tax returns, demographic information, financial information and the like may be used as part of this ranking process.

The following pseudo code generally expresses how a rule engine 64 functions utilizing a fact cache based on the runtime canonical data 62 or the instantiated representation of the canonical tax schema 46 at runtime and generating non-binding suggestions 66 provided as an input a UI control 80. As described in U.S. application Ser. No. 14/097,057 previously incorporated herein by reference, data such as required inputs can be stored to a fact cache so that the needed inputs can be recalled at a later time, and to determine what is already known about variables, factors or requirements of various rules.:

Rule engine (64)/Tax Logic Agent (TLA) (60)
// initialization process
Load_Tax_Knowledge_Base;
Create_Fact_Cache; While (new_data_from_application)
Insert_data_into_fact_cache;
collection=Execute_Tax_Rules; // collection is all the fired rules and corresponding conditions
suggestions=Generate_suggestions (collection);
send_to_application(suggestions);

The TLA 60 may also receive or otherwise incorporate information from a statistical/life knowledge module 70. The statistical/life knowledge module 70 contains statistical or probabilistic data related to the taxpayer. For example, statistical/life knowledge module 70 may indicate that taxpayers residing within a particular zip code are more likely to be homeowners than renters. The TLA 60 may use this knowledge to weight particular topics or questions related to these topics. For example, in the example given above, questions about home mortgage interest may be promoted or otherwise given a higher weight. The statistical knowledge may apply in other ways as well. For example, tax forms often require a taxpayer to list his or her profession. These professions may be associated with transactions that may affect tax liability. For instance, a taxpayer may list his or her occupation as "teacher." The statistic/life knowledge module 70 may contain data that shows that a large percentage of teachers have retirement accounts and in particular 403(*b*) retirement accounts. This information may then be used by the TLA 60 when generating its suggestions 66. For example, rather than asking generically about retirement accounts, the suggestion 66 can be tailored directly to a question about 403(b) retirement accounts.

The data that is contained within the statistic/life knowledge module 70 may be obtained by analyzing aggregate tax data of a large body of taxpayers. For example, entities having access to tax filings may be able to mine their own proprietary data to establish connections and links between various taxpayer characteristics and tax topics. This information may be contained in a database or other repository that is accessed by the statistic/life knowledge module 70. This information may be periodically refreshed or updated to reflect the most up-to-date relationships. Generally, the data contained in the statistic/life knowledge module 70 is not specific to a particular tax payer but is rather generalized to characteristics shared across a number of tax payers although in other embodiments, the data may be more specific to an individual taxpayer.

Still referring to FIG. 7, the UI controller 80 encompasses a user interface manager 82 and a user interface presentation or user interface 84. The user interface presentation 84 is controlled by the interface manager 82 may manifest itself, typically, on a visual screen or display 104 that is presented on a computing device 102, 103 (seen, for example, in FIG. 13). The computing device 102 may include the display of a computer, laptop, tablet, mobile phone (e.g., Smartphone), or the like. Different user interface presentations 84 may be invoked using a UI generator 85 depending, for example, on the type of display 104 that is utilized by the computing device. For example, an interview screen with many questions or a significant amount of text may be appropriate for a computer, laptop, or tablet screen but such as presentation may be inappropriate for a mobile computing device such as a mobile phone or Smartphone. In this regard, different interface presentations 84 may be prepared for different types of computing devices 102. The nature of the interface presentation 84 may not only be tied to a particular computing device 102 but different users may be given different interface presentations 84. For example, a taxpayer that is over the age of 60 may be presented with an interview screen that has larger text or different visual cues than a younger user.

The user interface manager 82, as explained previously, receives non-binding suggestions from the TLA 60. The non-binding suggestions may include a single question or multiple questions that are suggested to be displayed to the taxpayer via the user interface presentation 84. The user interface manager 82, in one aspect of the invention, contains a suggestion resolution element 88, is responsible for resolving of how to respond to the incoming non-binding suggestions 66. For this purpose, the suggestion resolution element 88 may be programmed or configured internally. Alternatively, the suggestion resolution element 88 may access external interaction configuration files. Additional details regarding configuration files and their use may be found in U.S. patent application Ser. No. 14/206,834, which is incorporated by reference herein.

Configuration files specify whether, when and/or how non-binding suggestions are processed. For example, a configuration file may specify a particular priority or sequence of processing non-binding suggestions 66 such as now or immediate, in the current user interface presentation 84 (e.g., interview screen), in the next user interface presentation 84, in a subsequent user interface presentation 84, in a random sequence (e.g., as determined by a random number or sequence generator). As another example, this may involve classifying non-binding suggestions as being ignored. A configuration file may also specify content (e.g., text) of the user interface presentation 84 that is to be generated based at least in part upon a non-binding suggestion 66.

A user interface presentation 84 may be pre-programmed interview screens that can be selected and provided to the generator element 85 for providing the resulting user interface presentation 84 or content or sequence of user interface presentations 84 to the user. User interface presentations 84 may also include interview screen templates, which are blank or partially completed interview screens that can be utilized by the generation element 85 to construct a final user interface presentation 84 on-the-fly during runtime.

As seen in FIG. 7, the UI controller 80 interfaces with the shared data store 42 such that data that is entered by a user in response to the user interface presentation 84 can then be transferred or copied to the shared data store 42. The new or updated data is then reflected in the updated instantiated representation of the schema 44. Typically, although not exclusively, in response to a user interface presentation 84 that is generated (e.g., interview screen), a user inputs data to the tax preparation software 100 using an input device that is associated with the computing device 102, 103. For example, a taxpayer may use a mouse, finger tap, keyboard, stylus, voice entry, or the like to respond to questions. The taxpayer may also be asked not only to respond to questions but also to include dollar amounts, check or un-check boxes, select one or more options from a pull down menu, select radio buttons, or the like. Free form text entry may also be request of the taxpayer. For example, with regard to donated goods, the taxpayer may be prompted to explain what the donated good are and describe the same in sufficient detail to satisfy requirements set by a particular taxing authority.

Still referring to FIG. 7, in one aspect, the TLA 60 outputs a current tax result 65 which can be reflected on a display 104 of a computing device 102, 103. For example, the current tax result 65 may illustrate a tax due amount or a refund amount. The current tax results 65 may also illustrate various other intermediate calculations or operations used to calculate tax liability. For example, AGI or TI may be illustrated. Deductions (either itemized or standard) may be listed along with personal exemptions. Penalty or tax credits may also be displayed on the computing device 102, 103. This information may be displayed contemporaneously with other information, such as user input information, or user interview questions or prompts or even narrative explanations 116 as explained herein.

The TLA 60 also outputs a tax data that is used to generate the actual tax return (either electronic return or paper return). The return itself can be prepared by the TLA 60 or at the direction of the TLA 60 using, for example, the services engine 60 that is configured to perform a number of tasks or services for the taxpayer. For example, the services engine 90 can include a printing option 92. The printing option 92 may be used to print a copy of a tax return, tax return data, summaries of tax data, reports, tax forms and schedules, and the like. The services engine 90 may also electronically file 94 or e-file a tax return with a tax authority (e.g., federal or state tax authority). Whether a paper or electronic return is filed, data from the shared data store 42 required for particular tax forms, schedules, and the like is transferred over into the desired format. With respect to e-filed tax returns, the tax return may be filed using the MeF web-based system that allows electronic filing of tax returns through the Internet. Of course, other e-filing systems may also be used other than those that rely on the MeF standard. The services engine 90 may also make one or more recommendations 96 based on the run-time data 62 contained in the TLA 60. For instance, the services engine 90 may identify that a taxpayer has incurred penalties for underpayment of estimates taxes and may recommend to the taxpayer to increase his or her withholdings or estimated tax payments for the following tax year. As another example, the services engine 90 may find that a person did not contribute to a retirement plan and may recommend 96 that a taxpayer open an Individual Retirement Account (IRA) or look into contributions in an employer-sponsored retirement plan. The services engine 90 may also include a calculator 98 that can be used to calculate various intermediate calculations used as part of the overall tax calculation algorithm. For example, the calculator 98 can isolate earned income, investment income, deductions, credits, and the like. The calculator 98 can also be used to estimate tax liability based on certain changed assumptions (e.g., how would my taxes change if I was married and filed a joint return?). The calculator 98 may also be used to compare analyze differences between tax years.

By using calculation graphs 14 to drive tax calculations and tax operations, the year-over-year calculation graphs 14 can be used to readily identify differences and report the same to a user. Differences can be found using commonly used graph isomorphism algorithms over the two respective calculation graphs 14.

Still referring to FIG. 7, the system includes an explanation engine 110 that operates in connection with the tax preparation software 100 to generate a narrative explanation from the one or more explanations associated with a particular tax operation 29 (illustrated in FIGS. 6A and 6B). To generate the narrative explanation for a particular tax operation 29, the explanation engine 110 extracts the stored function 28 that is associated with the particular functional node 26. The stored function 28 is one function of a defined set and may be associated with a brief explanation. For example, a "cap" function may be associated with an explanation of "value exceeds cap." This brief explanation can be combined with a stored explanation or narrative that is associated with the particular functional node 26 within the calculation graph 14. For example, the functional node 26 paired with the stored "cap" function 28 gives a contextual tax explanation in that is more than merely "value exceeds cap." For instance, a pre-stored narrative associated with the particular functional node 26 having to do with the child tax credit within the calculation graph 14 may be a complete statement or sentence such as "You cannot claim a child tax credit because your income is too high." In other embodiments, the pre-stored narrative may be only a few words or a sentence fragment. In the above example, the pre-stored narrative may be "credit subject to income phase out" or "AGI too high." A particular functional node 26 and associated function 28 may have multiple pre-stored narratives. The particular narrative(s) that is/are associated with a particular functional node 26 and associated function 28 may be stored in entries 112 in a data store or database such as data store 42 of FIG. 7. For example, with reference to FIG. 7, data store 42 contains the pre-stored narratives that may be mapped or otherwise tagged to particular functional nodes 26 and associated functions 28 contained within the calculation graph(s) 14. The locations or addresses of the various functional nodes 26 and the associated functions 28 can be obtained using the calculation graphs 14.

Figure 8A:
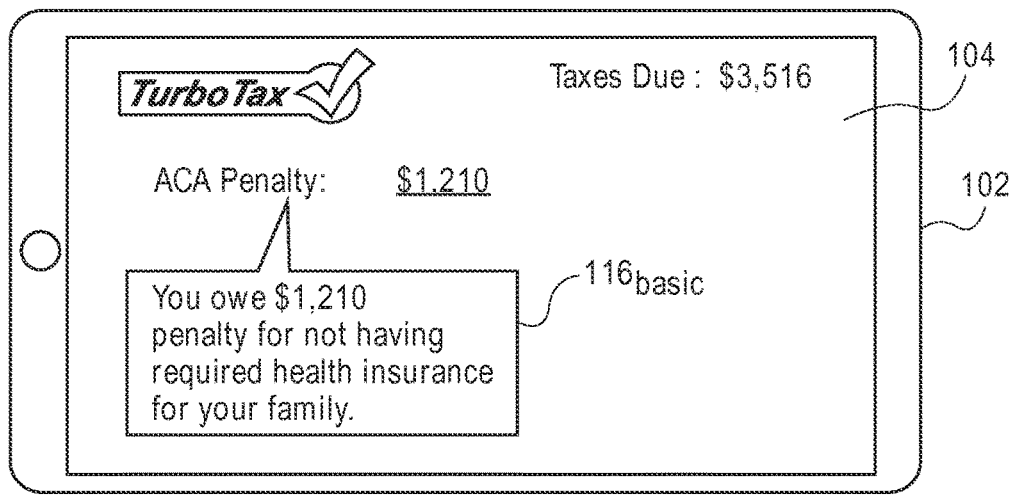
FIG. 8A illustrates a display of a computing device illustrating a narrative explanation according to one embodiment.
Figure 8B:
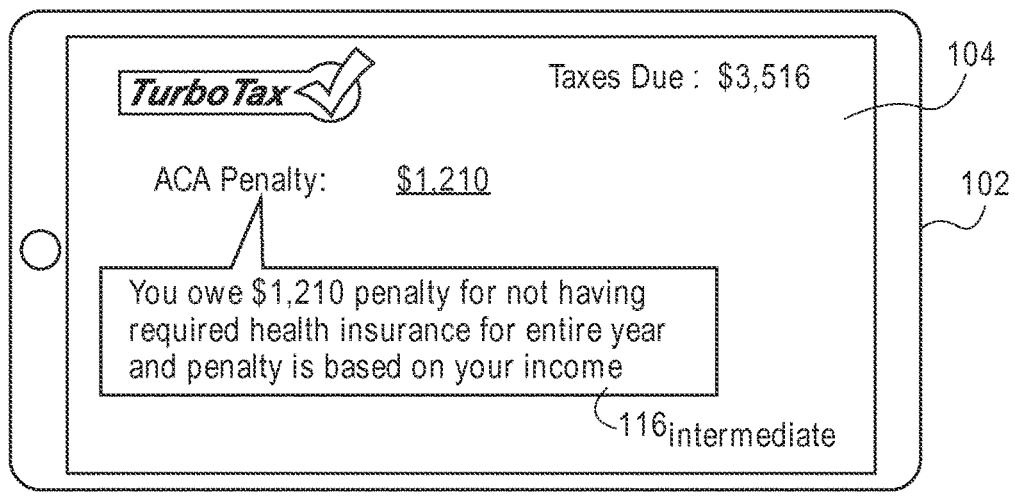
FIG. 8B illustrates a display of a computing device illustrating a narrative explanation according to another embodiment.
Figure 8C:
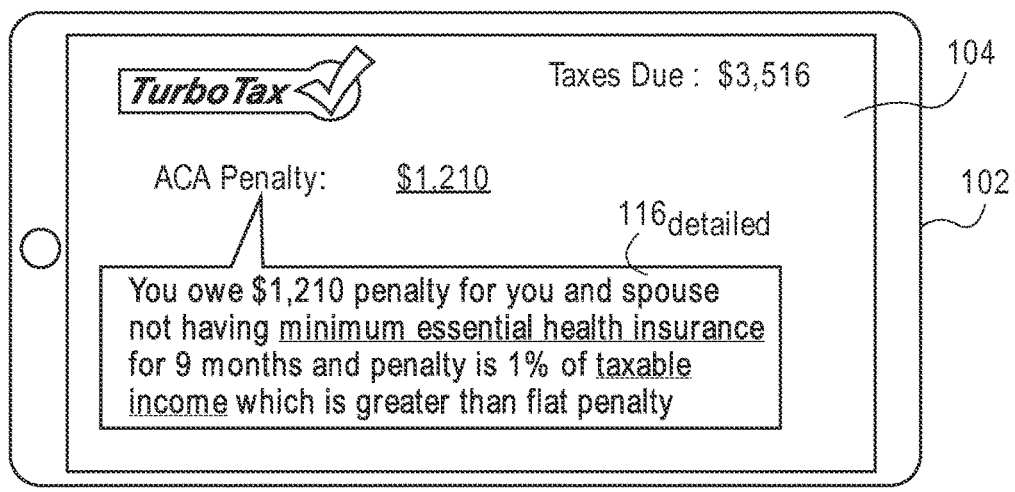
FIG. 8C illustrates a display of a computing device illustrating a narrative explanation according to another embodiment.

These stored entries 112 can be recalled or extracted by the explanation engine 110 and then displayed to a user on a display 104 of a computing device 102, 103. For example, explanation engine 110 may interface with the UI control 80 in two-way communication such that a user may be ask the tax preparation software 100 why a particular tax calculation, operation, or decision has been made by the system 40. For instance, the user may be presented with an on-screen link (FIGS. 10A, 10B, 11A, 11B, 12A, and 12B illustrate a hyperlink 120), button, or the like that can be selected by the user to explain to the user why a particular tax calculation, operation, or decision was made by the tax preparation software 100. For example, in the context of FIG. 6B described herein, a user may see an ACA penalty of $1,210.00 listed on the screen of the computing device 102, 103 while he or she is preparing the tax return for a prior year. FIGS. 8A-8C illustrate an example of such a screen shot. The taxpayer may be interested in why there such a penalty. As one example, the initial explanation provided to the user may be "you have an ACA penalty because you, your spouse, and your two child dependents did not have coverage during the 2014 calendar year and the penalty is based on your income." This explanation may be associated with, for example, function node 26 and function 28 pair B in FIG. 6B. In some instances, a user is able to further "drill down" with additional questions to gain additional explanatory detail. This additional level of detailed explanations is possible by retracing the calculation graph(s) 14 to identify a predecessor or upstream function node 26 and function 28. In the context of the example listed above, a user may not be satisfied and may want additional explanation. In this instance, for example, the word "income" may be highlighted or linked with a hyperlink. A user clicking on this would then be provided with additional explanation on the detail regarding the ACA penalty. In this example, the user may be provided with "Under the ACA your penalty is the greater of 1% of your taxable income or a fixed dollar amount based on your family circumstances. In your situation, the 1% of taxable income exceeded the fixed dollar amount." This particular explanation may be associated with the predecessor function node 26 and function 28 pair A in FIG. 6B. Additional details may be provided by further retracing, in a backwards fashion, the calculation graph 14.

With reference to FIG. 7, the explanation engine 110 may also automatically generate explanations that are then communicated to the user interface manager 80. The automatically generated explanations may be displayed on a display associated with the computing devices 102, 103. In some embodiments, the explanations may be contemporaneously displayed alongside other tax data and/or calculations. For example, as a user inputs his or her information into the tax preparation software 100 and calculations are automatically updated, explanations maybe automatically displayed to the user. These explanations maybe displayed in a side bar, window, panel, pop-up (e.g., mouse over), or the like that can be followed by the user. The explanations may also be fully or partially hidden from the user which can be selectively turned on or off as requested by the user.

In one aspect of the invention, the choice of what particular explanation will be displayed to a user may vary. For example, different explanations associated with the same function node 26 and function 28 pair may be selected by the explanation engine 110 for display to a user based on the user's experience level. A basic user may be given a general or summary explanation while a user with more sophistication may be given a more detailed explanation. A professional user such as a CPA or other tax specialist may be given even more detailed explanations. FIGS. 8A-8C illustrates three different explanations ($116_{basic}$, $116_{intermediate}$, $116_{detailed}$) that are displayed to different users that have various degrees of explanation. FIG. 8A illustrates a basic explanation $116_{basic}$. In this example, an explanation is provided by the taxpayer owes an ACA penalty of $1,210. FIG. 8B illustrates a more detailed explanation $116_{intermediate}$ of this same penalty. In the FIG. 8B example, the taxpayer is told additional reasons behind the penalty (i.e., required health insurance was not obtained for the entire tax year). In FIG. 8C, an even more detailed explanation $116_{detailed}$ is given which more closely tracks the actual function node 26 and function 28 that makes up the calculation graph 14. Note that in FIG. 8C various terms such as "minimum essential health insurance" which has a specific definition under U.S. tax code and regulations is linked so that the user can drill into even more detail. Likewise, taxable income is linked in this example, letting the user potentially drill even further into the calculation of the ACA penalty. While three such explanations 116 are illustrated in the context of FIGS. 8A-8C, additional levels of simplicity/complexity for the explanation can be used.

In some embodiments, the different levels of explanation may be tied to product types or codes. These may be associated with, for example, SKU product codes. For example, a free edition of the tax preparation software 100 may little or no explanations. In a more advanced edition (e.g., "Deluxe edition"), additional explanation is provided. Still more explanation may be provided in the more advanced editions of the tax preparation software 100 (e.g., "Premier edition"). Version of the tax preparation software 100 that are developed for accountants and CPAs may provide even more explanation.

In still other embodiments a user may be able to "unlock" additional or more detailed explanations by upgrading to a higher edition of tax preparation software 100. Alternatively, a user may unlock additional or more detailed explanations in an a la carte manner for payment of an additional fee. Such a fee can be paid through the tax preparation software 100 itself using known methods of payment.

Figure 9:
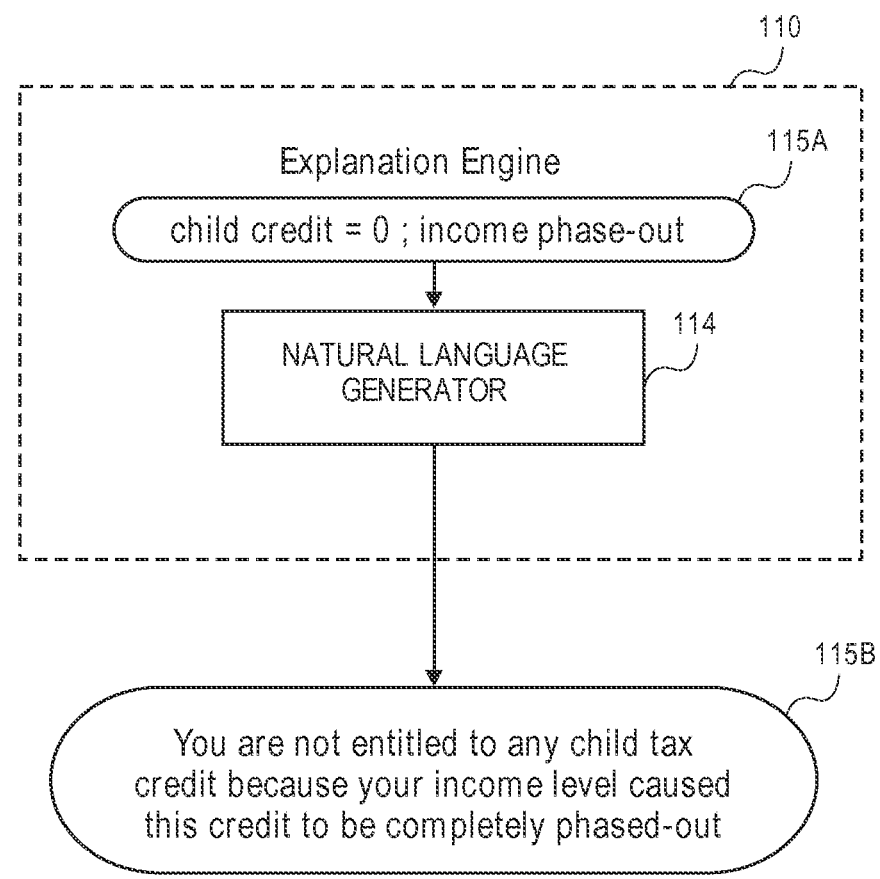
FIG. 9 illustrates an explanation engine that is part of the system for calculating taxes according to one embodiment. The explanation engine generates narrative explanations that can be displayed or otherwise presented to users to explain one or more tax calculations or operations that are performed by the tax preparation software.

FIG. 9 illustrates additional details of the explanation engine 110 according to an embodiment of the invention. In this embodiment, the explanation engine 110 includes a natural language generator 114 that converts fragments, expressions or partial declaratory statements into natural language expressions that are better understood by users. The natural language expressions may or may not be complete sentences but they provide additional contextual language to the more formulaic, raw explanations that may be tied directly to the explanation associated with a function node 26 and associated function 28. In the example of FIG. 9, a brief explanation 115A extracted by the explanation engine 110 which indicates that the child credit tax is zero due to phase out from income level is then subject to post-processing to convert the same into a more understandable sentence that can be presented to the user. In this example, the user is provided with a natural language explanation 115B that is more readily understood by users.

In one aspect of the invention, the natural language generator 114 may rely on artificial intelligence or machine learning such that results may be improved. For example, the explanation engine 110 may be triggered in response to a query that a user has typed into a free-form search box within the tax preparation software 100. The search that has been input within the search box can then be processed by the explanation engine 110 to determine what tax operation the user is inquiring about and then generate an explanatory response 115B.

FIGS. 10A, 10B, 11A, 11B, 12A, and 12B illustrate various embodiments of how a narrative explanation 116 may be displayed to a user on a display 104 that is associated with a computing device 102, 103. FIGS. 10A and 10B illustrate an exemplary screen shot of a display 104 that contains a narrative explanation 116 of a tax operation. In this particular example, the tax operation pertains to the ACA shared responsibility penalty. As seen in the screen shot on display 104, the narrative explanation 116 may be presented along with additional tax data 118 that generally relates to the specific tax operation. In this example, a separate window 119 contains tax data 118 that relates to the tax operation or topic that is germane to the narrative explanation 116 that is being displayed. In this example, the taxpayer's zip code, AGI, tax exempt interest amount, exemption status, and insurance coverage status are illustrated. It should be understood, however, that the specific tax data 118 that is displayed may vary and many include more or less information. In addition, the tax data 118 may be hidden from view in other embodiments. Likewise, the tax data 118 does not have to be displayed in a separate window 119 or other area on the display 104. For example, the tax data 118 could be on a ribbon or pop-up window.

As seen in FIG. 10A, the narrative explanation 116 includes a plurality of words wherein several words or phrases are hyperlinked 120. In this regard, the narrative explanation 116 is nested as one or more phrases can be further expanded as is illustrated below. In this example, the narrative explanation 116 tells the user why their shared responsibility penalty was $405. Specifically, the narrative explanation 116 explains that the shared responsibility penalty is $405 because there was a deficit in coverage that causes the ACA penalty to apply and there was not exemption. The narrative explanation 116 in this example includes three phrases or words ("deficit in coverage"; "ACA Penalty"; "exemption") that are hyperlinked 120. A user can select a hyperlink 120 associated with one of these phrases or words where an additional narrative explanation 116' is given as illustrated in FIG. 10B. FIG. 10B illustrates a view of the display 104 after a user has selected the "deficit in coverage" phrase in FIG. 10A. As seen in FIG. 10B, the user is presented with another narrative explanation 116' explaining additional details on why there was a deficit in coverage for the taxpayer. Here, the user is told that a deficit in coverage was present because the taxpayer did not enroll in a qualified insurance plan during the year. As seen in FIG. 10B, the hyperlink 120 for "deficit in coverage" may change appearances upon being selected. For example, the hyperlink 120 may go from a solid line to a dashed line to indicate that it has been selected. Of course, other changes in appearance such as size, shape, highlighting can be used. Alternatively, the word or phrase of the hyperlink 120 may change appearances after being selected. For example, the word or phrase may change color, font size, or be highlighted to illustrate that the additional explanation 116' pertains to that specific word or phrase.

FIGS. 11A and 11B illustrate how the initial narrative explanation 116 can be expanded further a plurality of times. In this example, the initial narrative explanation 116 includes the phrase "ACA Penalty." A user may select the hyperlink 120 associated with this phrase that brings up another narrative explanation 116a that provides additional explanatory detail on the ACA penalty. In this example, the additional narrative explanation 116a itself includes several words or phrases with hyperlinks 120. In this example, "calculated ACA penalty," "minimum penalty," and "maximum penalty" are phrases that contain respective hyperlinks 120 where even additional explanation can be found. As seen in FIG. 11B, for example, a user that selects the hyperlink 120 that is associated with "calculated ACA penalty" returns another narrative explanation 116b that explains how the amount of the calculated ACA penalty was derived. In this example, the penalty was calculated as 1% of taxable income.

FIGS. 12A and 12B illustrate the same initial narrative explanation 116 as found in FIGS. 10A and 11A but with the hyperlinks 120 associated with the word "exemption" being selected. As seen in FIG. 12A, in narrative explanation 116d, the user is given an explanation that no exemption applies because the taxpayer did not quality for any specified exemptions including the affordability exemption because the lowest cost plan, itself a defined phrase that has a hyperlink), is less than 8% of household income. FIG. 12B illustrates the same display 104 after a user has selected the hyperlink 120 that is associated with "lowest cost plan" which then displays that the lowest cost plan offered by the State in which the taxpayer resides is $250/month.

The narrative explanations 116 and their associated sub-explanations (e.g., 116', 116a, 116b, 116d, 116e) are constructed as an explanation tree with the root of the tree representing a particular tax topic or tax operation. In the example of FIGS. 10A, 10B, 11A, 11B, 12A, and 12B, the tax topic pertains to the ACA penalty. The explanation trees are readily constructed based on the function nodes 26 and associated functions 28 contained within the calculation graph 14. For example, one is able to "drill down" into more detailed explanations by walking up the directed graph that forms the calculation graph 14. For example, the initial explanation 116 that is displayed on the screen may be associated with node D of the calculation graph 14 of FIG. 6B. By selecting the ACA penalty hyperlink 120 as seen in FIGS. 11A and 11B, a predecessor node (e.g., node C) is used to generate the narrative explanation 116a. Yet another predecessor node (node A) is used to generate the narrative explanation of the calculated ACA penalty. In this manner, explanations can be presented to the user in a recursive manner by reversely traversing the calculation graph 14. Conversely, walking progressively down the calculation graph 14 shows how one node 26 affects other downstream nodes 26.

By encapsulating the tax code and regulations within calculation graphs 14 results in much improved testability and maintainability of the tax preparation software 100. Software bugs can be identified more easily when the calculation graphs 14 are used because such bugs can be traced more easily. In addition, updates to the calculation graphs 14 can be readily performed when tax code or regulations change with less effort.

Further, the degree of granularity in the narrative explanations 116 that are presented to the user can be controlled. As explained in the context of FIGS. 8A-8C different levels of details can be presented to the user. This can be used to tailor the tax preparation software 100 to provide scalable and personalized tax explanations to the user. The narrative explanations 116 can be quickly altered and updated as needed as well given that they are associated with the calculation graphs and are not hard coded throughout the underlying software code for the tax preparation software 100.

Note that one can traverse the calculation graph 14 in any topologically sorted order. This includes starting at a leaf or other input node and working forward through the calculation graph 14. Alternatively, one can start at the final or terminal node and work backwards. One can also start at in intermediate node and traverse through the directed graph in any order. By capturing the tax code and tax regulations in the calculation graph, targeted calculations can be done on various tax topics or sub-topics. For example, FIG. 6B demonstrates a very isolated example of this where a calculation graph 14 is used to determine the amount, if any, of the ACA shared responsibility penalty. Of course, there are many such calculation graphs 14 for the various topics or sub-topics that makeup the tax code. This has the added benefit that various tax topics can be isolated and examined separately in detail and can be used to explain intermediate operations and calculations that are used to generate a final tax liability or refund amount.

Further embodiments regarding how narrative explanations can be initiated, generated and presented when the tax return preparation application is operating in forms mode, as distinguished from interview mode, is described with reference to FIGS. 13-21.

Figure 13:
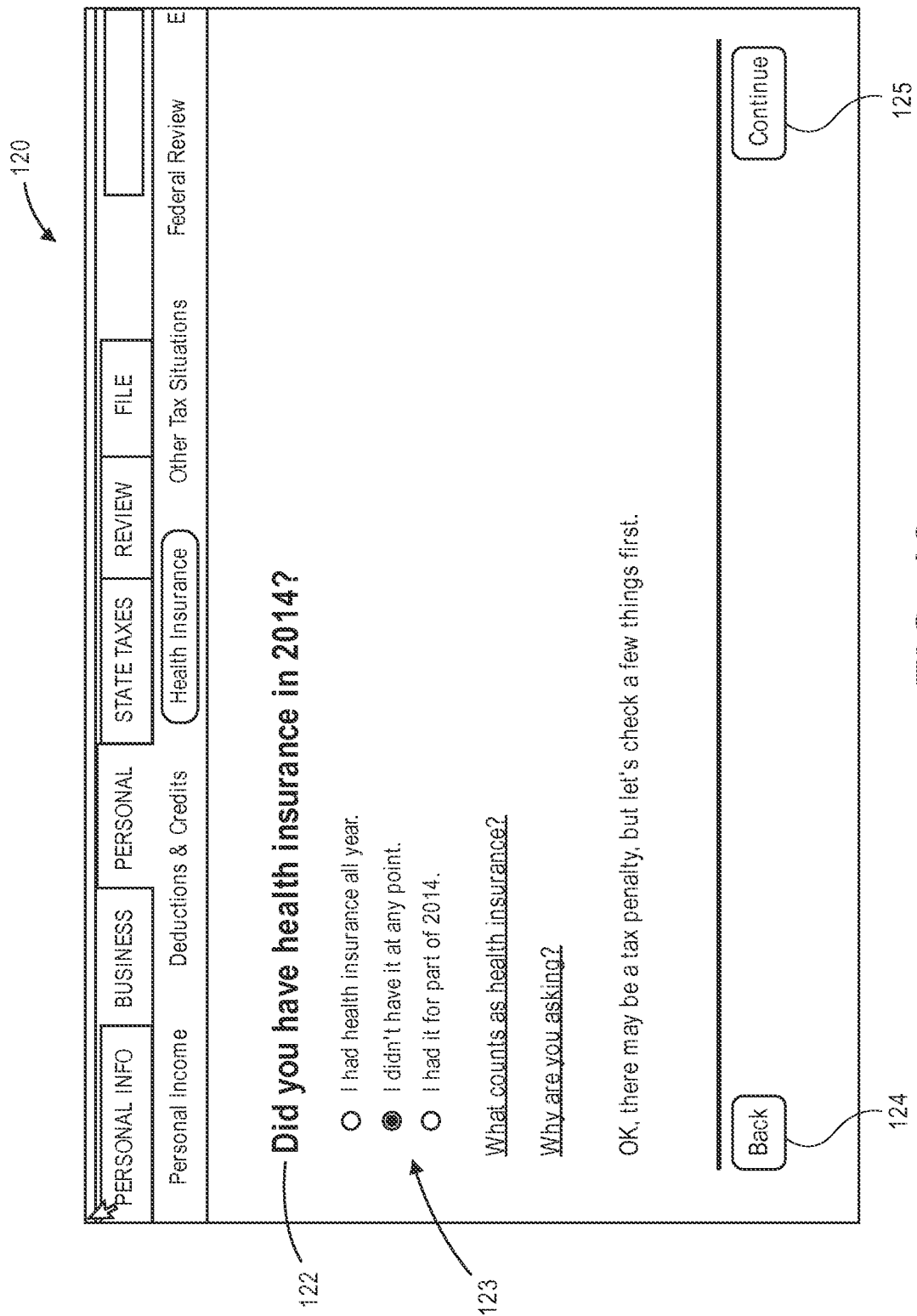
FIG. 13 illustrates an example of a screen presented to a user of a tax return preparation system operating in interview mode.

FIG. 13 illustrates an example of a screen 120 presented by a tax return preparation application while operating in interview mode. As generally illustrated in FIG. 13, the tax return preparation application specific interview screen 120 is one of multiple interview screens that leads the user through a series of questions 122 with response options 123 that the user can select or for which the user can enter data. The user can navigate back to a prior interview screen via the "Back" button 124 or advance to another interview screen or to a different topic with a different set of interview screens via the "Continue" button 125, until eventually the required data has been entered for preparation of a corresponding electronic form. Continuing with the example involving health insurance, the interview screen 120 shown in FIG. 13 and presented during interview mode operation (versus forms mode) includes questions 122 and answer 123 options that are selectable by the user, and involving health insurance.

In contrast to the information presented and interaction involving the screen 1300 presented in interview mode shown in FIG. 13, operating in "forms mode" involves a very different interface, presentation and user interaction. In forms mode, the user is presented with an electronic version 130 or rendering of a tax form as shown in FIG. 14. A user may switch between interview mode (using screens such as screens 120) and forms mode (using electronic versions 130 of forms) by selection of a menu item of the tax return preparation application, thus resulting in changing the presentation mode between those shown in FIGS. 13 and 14.

The exemplary electronic form 130 shown in FIG. 14 is IRS Form 8965, which also involves the user's health insurance during the prior tax year (and to which the interview screen 120 shown in FIG. 13 also applies). Thus, in interview mode, the user is not presented with the often cumbersome and complicated IRS tax form 130 as shown in FIG. 14 that includes various data inputs 132, results or calculations 134 and other summaries, line item descriptions or instructions 136 and calculations, and tables or graphs 138. Instead, in interview mode, the user is guided through a series of interview screens, one example of which is shown in FIG. 13, including questions that are intended to be easier and less intimidating than completing an electronic form as shown in FIG. 14. More specifically, as shown in FIG. 14, in contrast to the exemplary interview screen 1300 presented in FIG. 13, the electronic version 1400 of Form 8965 presented during forms mode includes a multitude of data input fields involving various multiplication and comparison line item descriptions and associated fields for data inputs and calculation results, as well as a table for individuals identified in the electronic tax return and indicating whether a person had insurance for a specified month (January-December).

One embodiment of the invention involves modifying or transforming an electronic version 1400 of a tax authority form as shown in FIG. 14 into a different form and to have capabilities and to provide for different users interactions that are not provided in an electronic version 1400 of a tax authority form. An example of an electronic form of a tax authority form as modified 140 is shown in FIG. 15.

Figure 15:
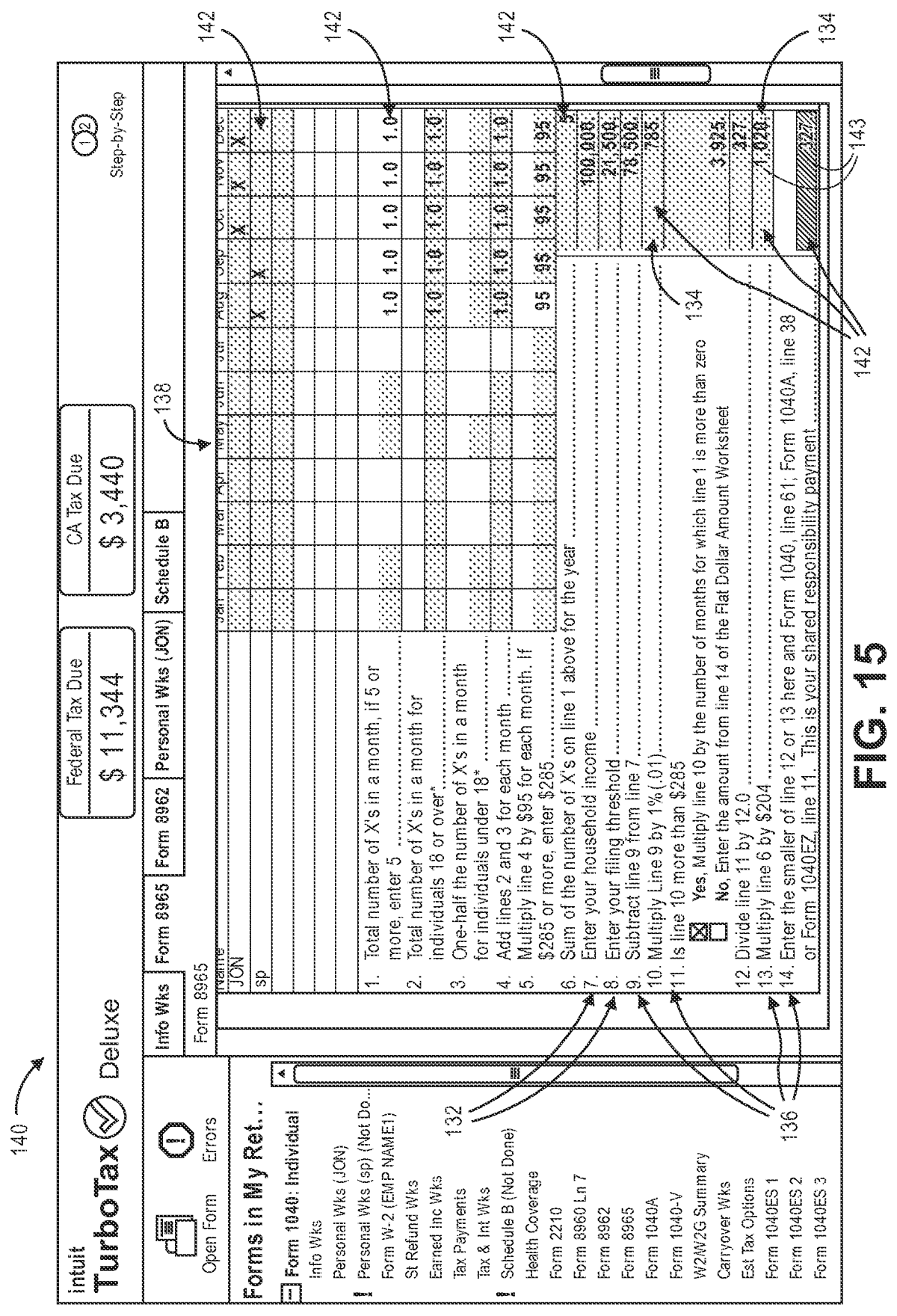

Referring to FIG. 15, with embodiments, the explanation engine 110 receives or generates an electronic version 130 of the tax authority form, and modifies 140 the electronic version 130 by incorporating interface elements 142 into the electronic version 130. The interface elements 142 are utilized to indicate fields of the modified electronic version 140 of the tax authority form for which explanations or "gists" 116 can be generated in response to a user's request during operation of the tax return preparation system in forms mode. In the embodiment illustrated in FIG. 15, the explanation engine 110 modifies 140 the electronic version 130 of the tax form to include interface elements 142 that are associated with respective fields 134.

According to embodiments, an interface element 142 may be or involve a distinguishing color, which identifies fields 134 for which an explanation 100 can be presented such that when the interface element 142 is selected, e.g., by the user clicking on an interface element 142 or by a mouse over function, an explanation 100 regarding the data 143 in the field 134 is presented to the user in response to the user input. For example, fields 134 for which explanations 110 are available and can be identified by interface elements 142 in the form of coloring those fields 134 "green" whereas other fields 134 for which explanations 110 are not available can remain uncolored or in their original color, or in a color that indicates that no explanation is available, such as "red." In the illustrated embodiment, certain fields 134 are modified by color whereas others are not. Further, in the illustrated embodiments, fields 134 that are modified by color include fields 134 that are populated with input data 143 ("i" indicating "input" data) such as data input by user, from prior tax return or imported from an electronic source and fields 134 that are populated with a calculation result 143$r$ ("r" indicating "result" data).

FIG. 15 also illustrates how certain fields 134 that are not involved in calculations, and that do not involve numerical data, may also be modified by an interface element 142 in the form of color to indicate that an explanation 100 is available for those fields 134. For example, in the insurance table 138 including rows for a person's name and columns for months of the year (January-December), the table 138 includes indicators 142, e.g., an "X," indicating when a certain person had insurance, and a field of the table 138 is blank when that person did not have insurance. Other indicators 242, such as binary indicators, may also be utilized, such as "Y" and "N" indicators, for example Thus, in this embodiment, color-based interface elements 242 may be used to indicate that populated and/or unpopulated fields 243 have an explanation 100 that can be presented to the user, and for populated fields, such fields 243 may include numerical data and different types of non-numerical data or indicators.

An electronic version 130 of a tax document may also be modified 140 with interface elements 142 in the form of a differentiating font attribute. For example, rather than a color-based interface element 142 as shown in FIG. 15, data 143 of fields 134, whether numerical or non-numerical data, for which explanations 110 are available can presented in a different font compared to data 143 of other fields 134 for which an explanation 100 is not available. Other font attributes may include font size, font color, or other distinguishing or emphasizing attributes such as underlining, bold, italics, or by adding an indicator such as an asterisk. Such attributes may be applied to the data 143 itself within a field 134 and/or for a line item description 136 associated with a field 134.

An interface element 142 can be selected or triggered for presentation of an explanation 100 in different ways including, for example, by a mouseover function applicable to a particular field 134 or based on a user clicking on an interface element within or adjacent to a field 134. For example, rather than clicking on a colored field in order to initiate an explanation 100, a separate interface indicator 142 may be positioned adjacent to a field 134 for which an explanation 100 is available and the adjacent interface element 142 can be selected by the user. In another embodiment, the line item description 136 or portion thereof n is encoded as an interface element 142 and may be illustrated with a distinguishing font feature such as font color, size or font type, or a combination thereof. Thus, according to one embodiment, an interface element 142 is embodied within a field 134 of the modified electronic version 140 of the tax document, whereas other embodiments may involve an adjacent interface element 142 or the line item description 136 or potion thereof being encoded as an interface indicator 142 that can be selected to initiate an explanation 100, or a combination of two or more thereof. Thus, the interface element 142 incorporated into and to modify an electronic version 140 of the tax document may be of or contained within a field 134 (e.g., a color indicator within a field), to the data 143 itself, a separate interface element 142 associated with or adjacent to an explainable field 134, or a line item description 136 or portion thereof. Moreover, embodiments can provide an option to the user to activate and deactivate interface elements 142 that indicate that an explanation 100 is available, e.g., if the modified electronic version 140 appears visually cluttered with too many interface elements 142 indicative of explanations 110. Thus, while it will be understood that different types of interface elements 142 may be utilized as explanation 100 indicators, reference is made to interface elements or indicators 142 in the form of color-coded fields 134 to indicate that an explanation 100 for that data or topic is available for presentation.

Figure 16:
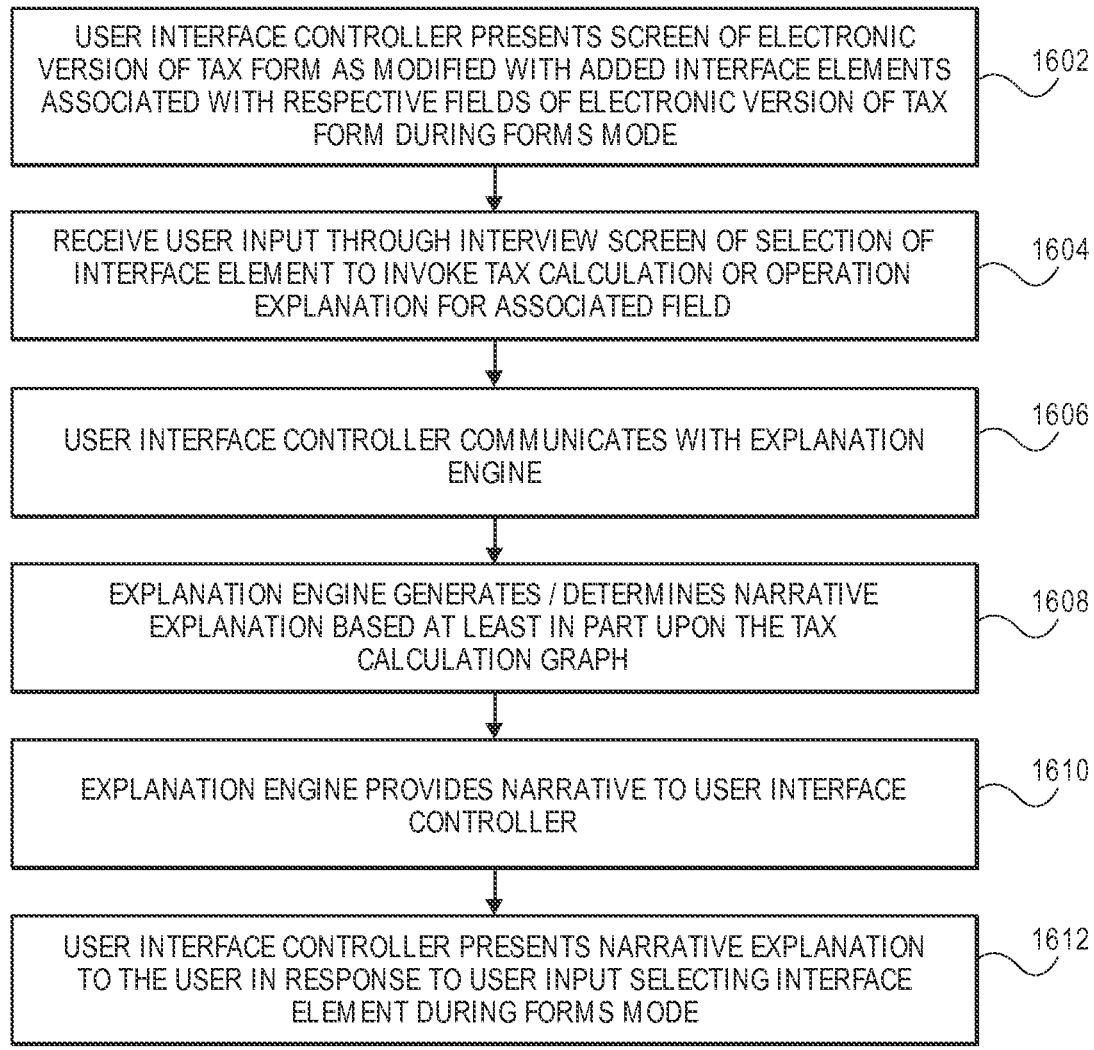
FIG. 16 is a flow diagram of one embodiment for modifying an electronic version of a tax authority form according to one embodiment.
Figure 17:
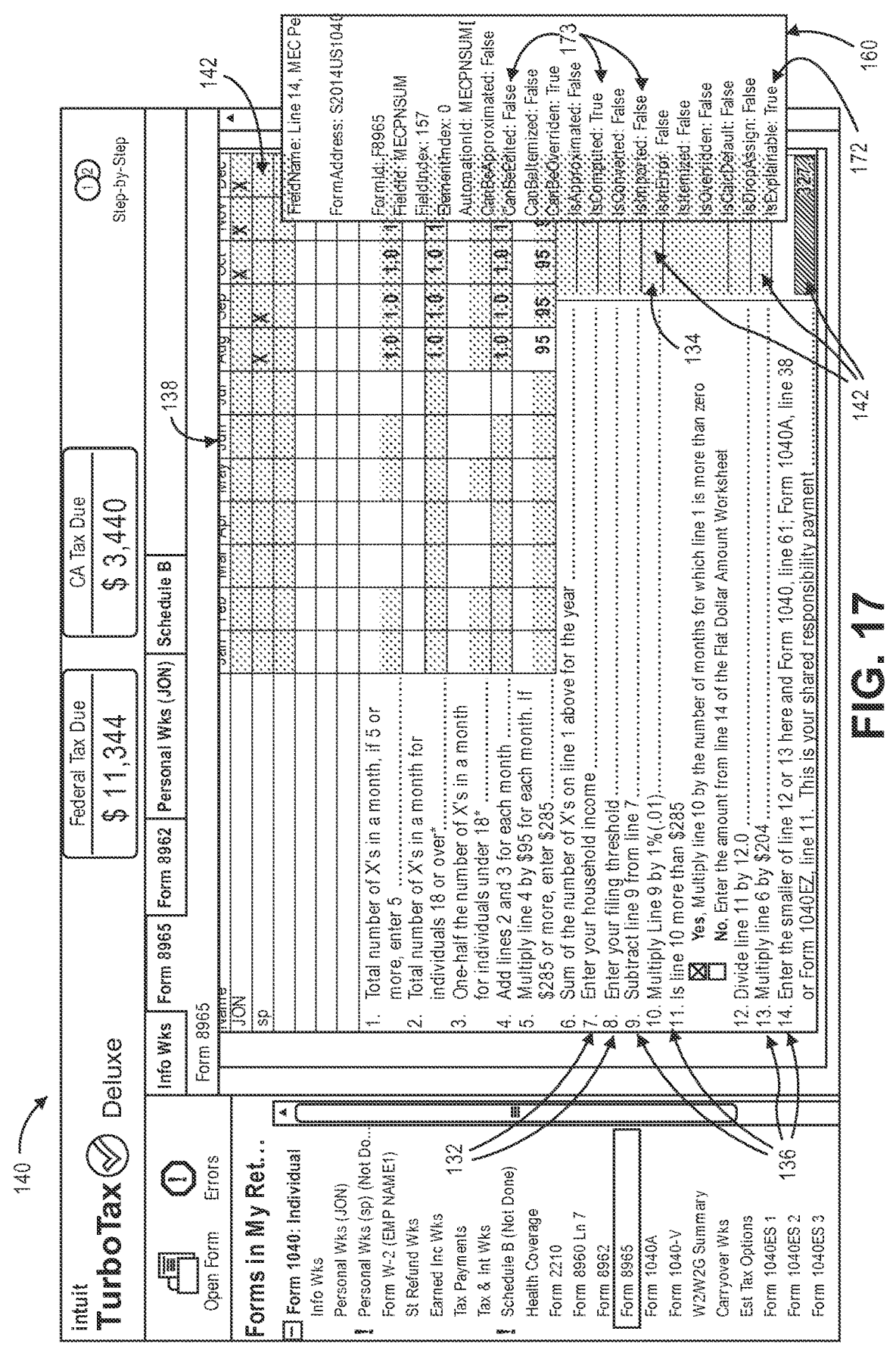

Thus, referring to FIG. 16 and with further reference to FIG. 17, at 152, during operation in forms mode, user interface controller 80 presents a screen 140 including an electronic version of tax form as modified with added interface elements 142 (e.g., a field 134 being shown as including a color-based interface element 142 as described above with reference to FIG. 15, and which is also illustrated in FIG. 17). At 154, user interface controller 80 receives user input through forms mode screen 140 that selects or activates an interface element 142 to invoke tax calculation or operation explanation 100 for associated field 134, and at 156, user interface controller 80 communicates with explanation engine 110 regarding the requested interface element 142.

For example, as shown in FIG. 17, in response to user input data received from user interface controller 80, explanation engine may read meta data table 160 associated with the selected field 143/selected interact element 142. The meta data table 160 may or may not be displayed to user or may be displayed in response to a request. In the illustrated embodiment, the metadata table 160 specifies various attributes about the corresponding field 134 including the identification 171 of the field 134 that has been selected and for which an explanation 100 is to be presented (FieldName: Line 14 . . . ), an indication 172 whether an explanation 100 is available for the field 134, i.e., whether an interface element 142 has been applied to the field 134 (IsExplanable: True), and various other attributes and rules 173 concerning data 142 in the field 143 such as whether the data 143 in the field 142 can be edited or overridden, and the source of the data, e.g., whether the data 143 was computed or imported. In the illustrated embodiment, the selected field 134/interface element 142 is indicated with a different shading or color to indicate that the field has been selected.

With continuing reference to FIG. 16, at 158, explanation engine 110 generates or determines a narrative explanation 100 based at least in part upon the tax calculation graph 14 from a location or node in the tax calculation graph 14 identified or referenced by the interface element data 142 and/or in the meta data table 160. Thus, there is a pointer or reference to a specified portion of a calculation graph 14 from which a narrative explanation 100 will be determined.

Figure 18A:
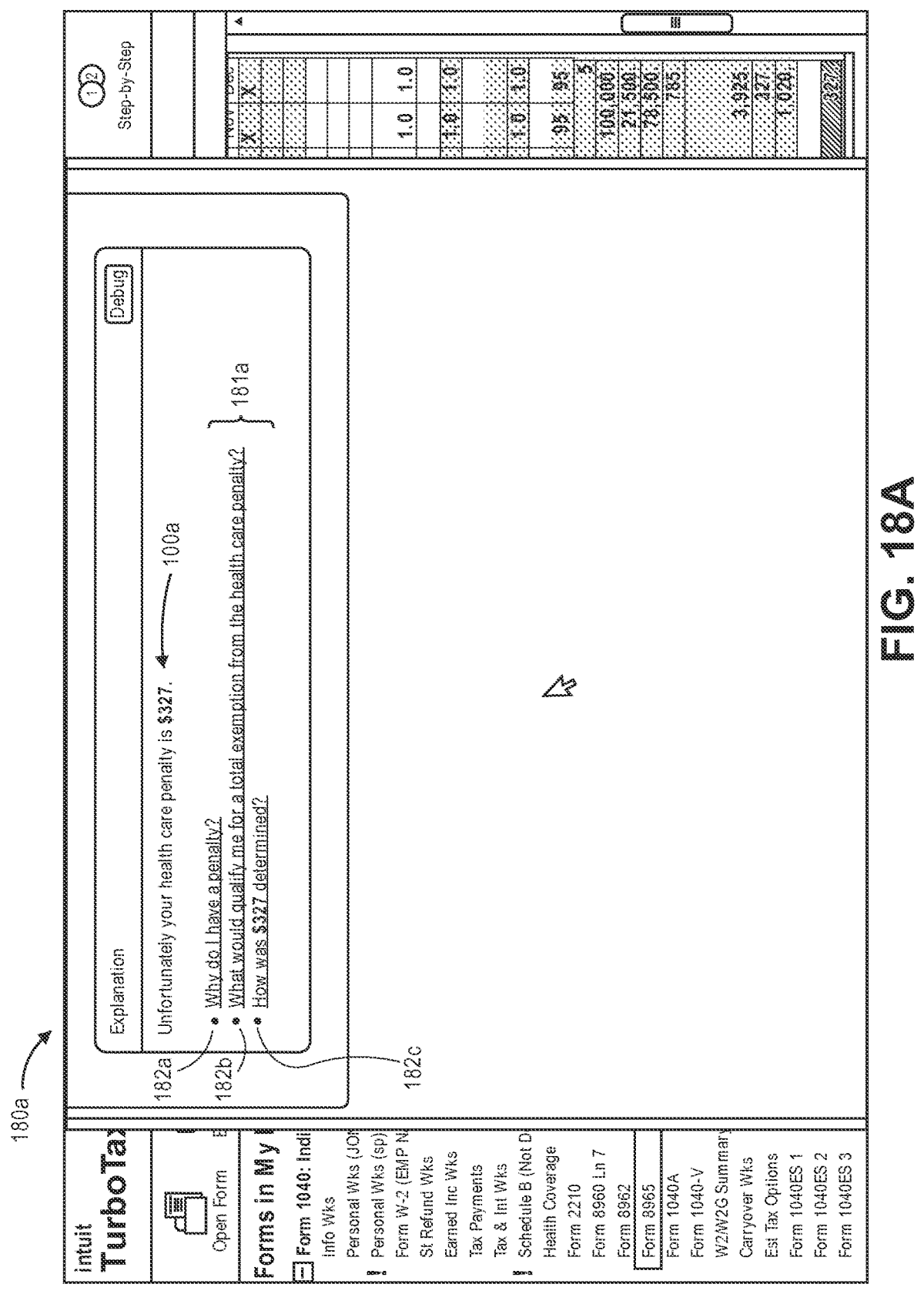

With continuing reference to FIG. 16 and with further reference to FIG. 18A, in response to the user selecting interface element 142 or Line 14 of Form 8965, the explanation engine 110 accesses calculation graph 14 and goes to the identified location thereof in order to determine explanation 100 or explanation segments determined by traversing the calculation graph 14. At 160, the explanation engine 110 provide the determined explanation 100 to the user interface controller 80 which, at 162, generates a screen 180 that includes an explanation 100a ("Unfortunately our health care penalty is $327") together with a first group 181a of referenced links 182a-c that can be selected by the user for further explanations 100 related to the explanation 100a regarding the health care penalty being $327.

In the illustrated embodiment, the links 182a-c (generally, 182) are for different questions the user may have regarding the explanation 100a such as "Why do I have a penalty?" 182a, "What would qualify me for a total exemption from the health care penalty?" 182b and "How was $327 [In line 14 of FIG. 17] determined?" 182c.

Figure 18B:
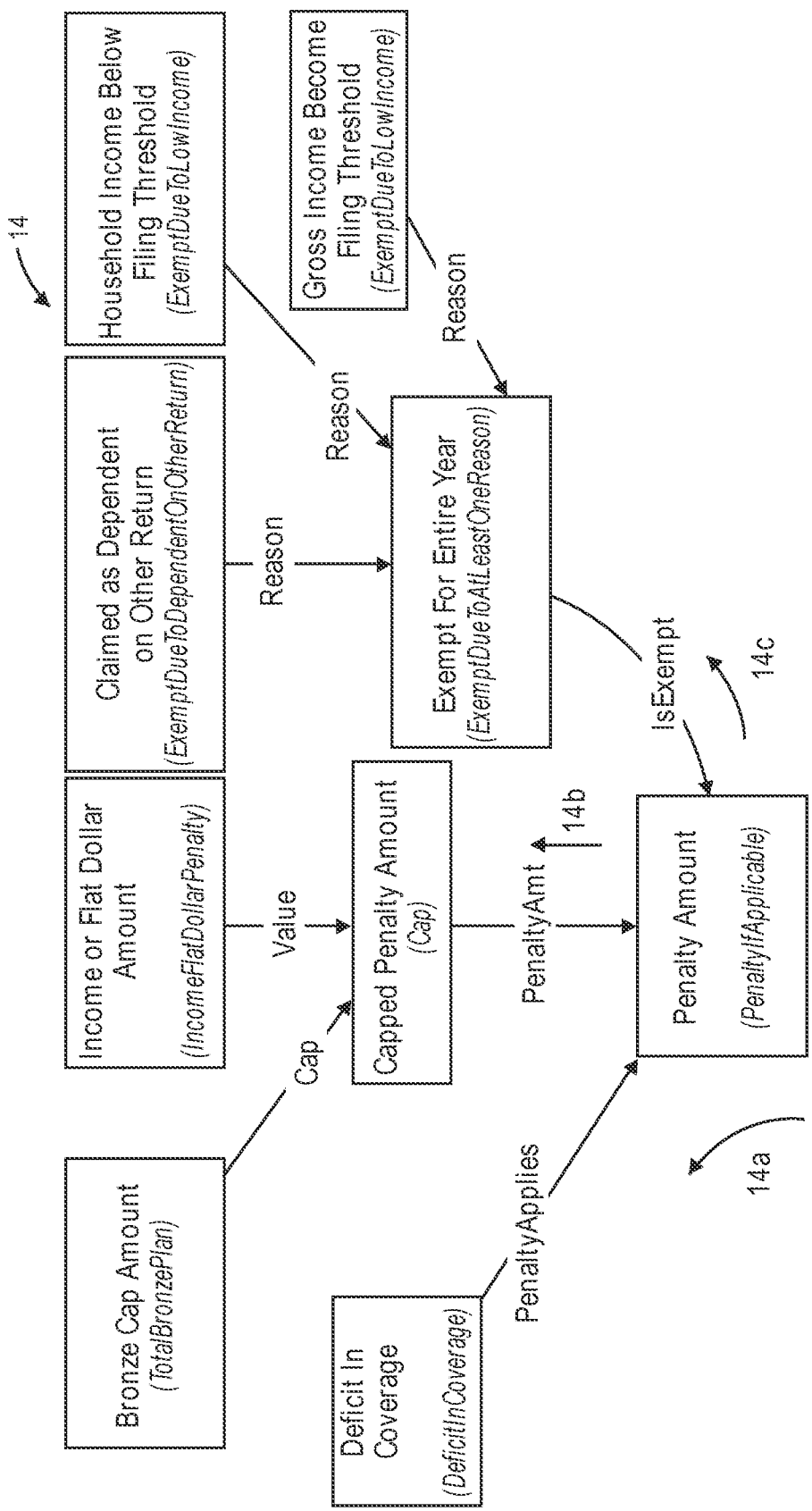
FIG. 18B illustrates a simplified example of a calculation graph including topics and explanations related to links shown in FIG. 18A FIGS. 19A-D illustrate how embodiments may be utilized for simultaneous presentation of an explanation, links and a table or other data structure with elements that can be selected to invoke an explanation.
Figure 20A:
FIGS. 20A-B illustrate how a series of explanations and links, originating from selection of an interface element during forms mode, can be presented to the user in a cascading, indented manner and how explanations and topics can be selectively collapsed.
Figure 20B:

FIG. 18B generally illustrates a simplified example of a calculation graph 14 related to the modified electronic version of the tax form 1500 and that may be used by explanation engine 110 to determine further explanations 100 in response to selection of links 182. A link 182a for the first question in the first group 181a may point or refer to a first node from which the calculation graph traversal begins and/or a terminating node that defines a traversal path or traversal direction, link 182b for a second question of the first group 181a may point to the same or other node and/or a termination node from that defines a different traversal path or direction, and so on. Thus, for each question, certain portions of the calculation graph 14 are traversed and associated explanations or explanation segments 110 (illustrated in parentheses in FIG. 18B) to formulate an explanation 100, as described above.

For example, in response to selection of link 182a for the question "Why do I have a penalty?" the explanation engine 110 may traverse a left portion 14a of the calculation graph 14 beginning with "PenaltyIfApplicable" and proceeding to "Penalty/Applies" due to "DeficitInCoverage." In response to selection of link 182b for the question "What would qualify me for a total exemption from the health care penalty?" the explanation engine 110 may traverse a right portion 14c of the calculation graph 14 concerning exemption and exemption reasons, and in response to selection of the link 182c for the question "How was $327 determined?" the explanation engine 110 may traverse a middle portion 14b of the calculation graph 14. Analysis or traversal of the calculation graph 14 may be performed by the explanation engine 110 in response to receiving data from the UI controller 80. According to another embodiment, the explanation engine 110 performs respective traversals of the calculation graph 14 and stores resulting explanations 100 in shared data store 42 or other data store such that when an explanation 100 is to be presented, a previously determined explanation 100 can be retrieved from a data store 42. In this embodiment, calculation graph 14 traversals and explanation 100 determinations can be repeated periodically or as runtime data 46 is updated. Further, as explained above, natural language processing may be utilized to generate a clearer narrative of the explanation 100 before the explanation is presented to the user by the user interface controller 80.

Figure 19A:
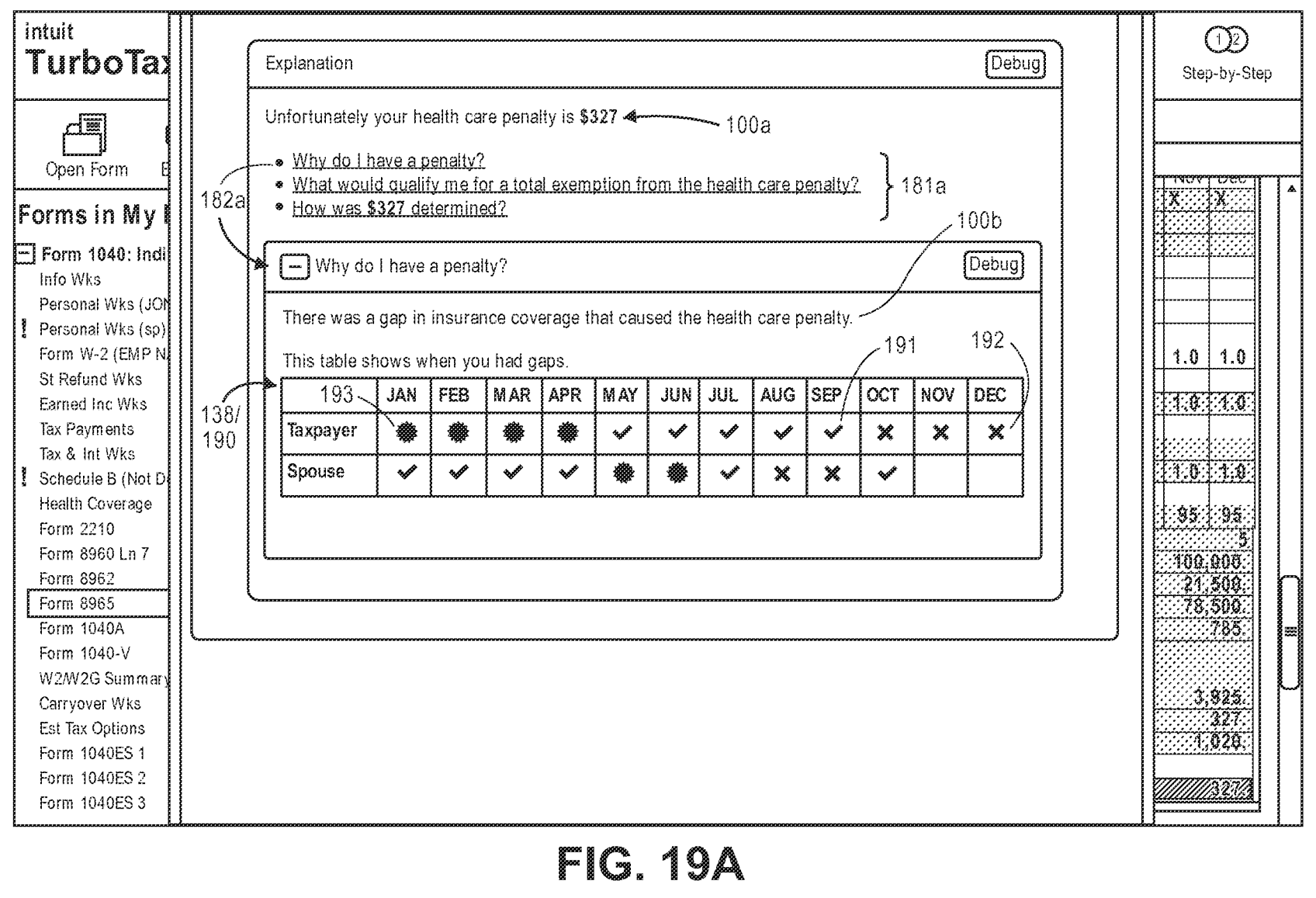

FIGS. 19A-F illustrate one embodiment in which a user has selected link 182a for the question "Why do I have a penalty" and in response, explanation engine 110 formulates a further explanation 100b regarding the penalty being caused by a gap in coverage. Further, in the illustrated embodiment, the explanation engine 110 may pull table 138 (as shown in FIG. 15) or generate a data structure 190 based thereon and the associated table 138 data and integrate that into a screen with explanations 100a, 100b as shown in FIG. 19A to supplement the explanation so that the explanation is better understood and to provide further interaction options for the user.

For example, in the illustrated embodiment, the user has selected the link 18sb for the quest "Why do I have a penalty' and in addition to presenting explanation 100b based on calculation graph 14 (e.g., as shown in FIG. 18B), the explanation 100 is presented together with table or data structure 138/190 (generally, table 190) showing when a taxpayer and spouse had coverage (indicated by "check") 191 and when the taxpayer and spouse did not have coverage (indicated by "X") 192, and when coverage gaps were permitted given the particular extensions provided by the law for that year (indicated by "*") 193.

Figure 19B:
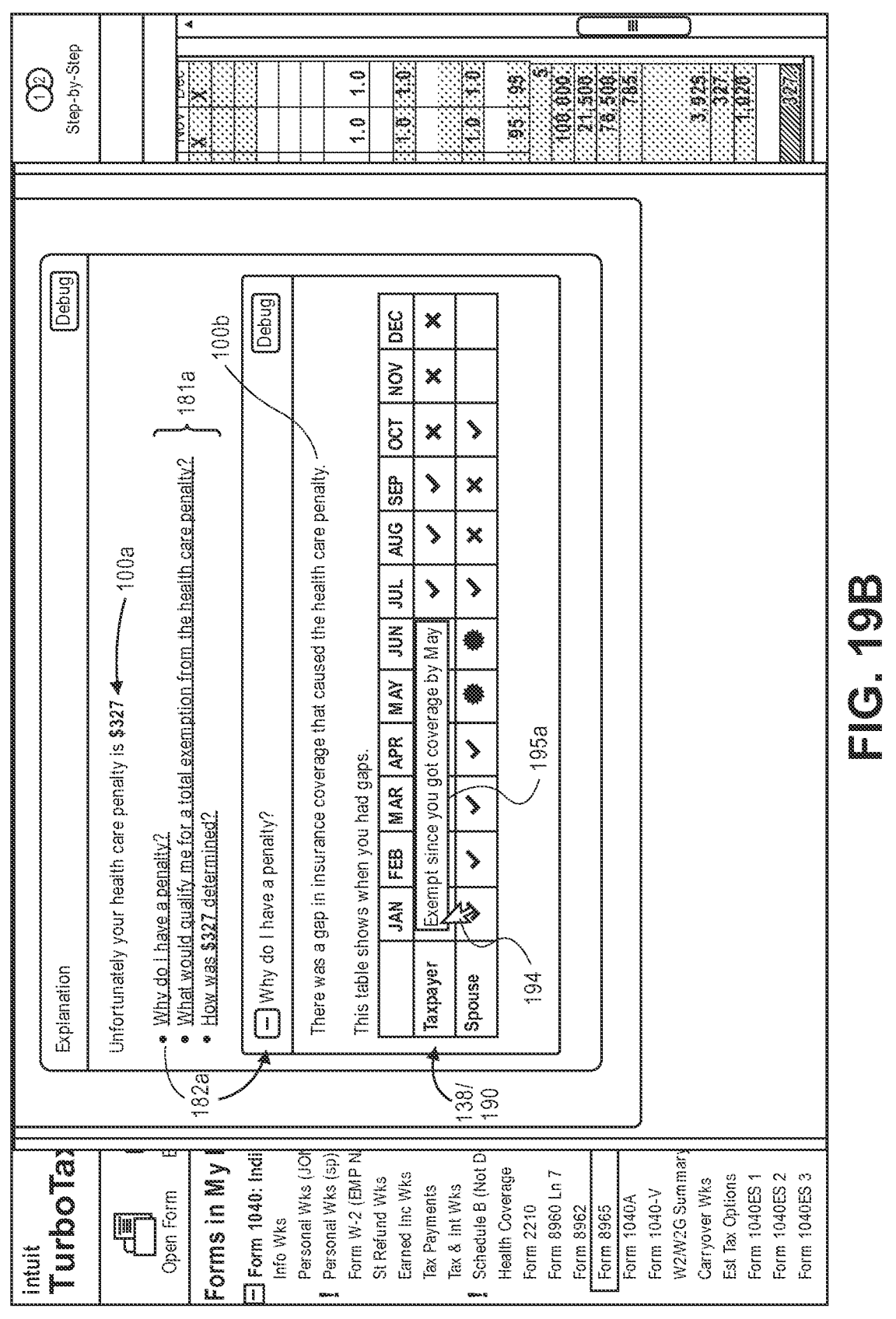

Referring to FIG. 19B, the table 138/190 itself may embody an interface element 142 such that when a user mouses over a particular field, e.g., for "Taxpayer" and "January" cells as illustrated, the explanation engine 110 may generate a response or explanation 195a that is based on the data that has been entered into corresponding cell of the table 190. In the illustrated example, the explanation provided 195 is the taxpayer was "Exempt since you got coverage in May."

Thus, in addition to incorporating a table 190 into an explanation page based on calculation graph 14 traversal, other explanations 195 may be generated. These other explanations may also be based on the calculation graph 14 and presented to supplement the provided calculation graph 14 based explanations 100a, 100b. In another embodiment, explanations 195 may be pre-determined and encoded and retrieved in response to certain data being entered, rather than being based on calculation graph 14 traversal. Thus, certain embodiments may generate explanations 100/195 in different ways.

Further, while such screens and explanations as shown in FIGS. 18A, 19A-B (and other figures including 19C-20B) are presented in a mode other than "forms mode," the initial explanation 100a is invoked from user interaction with an interface element 142 of the modified version of the electronic form 1500 while in forms mode, and further explanations 100/195 as shown in FIGS. 19A-B and other figures, may be presented after the system has transitioned away from forms mode.

Figure 19C:
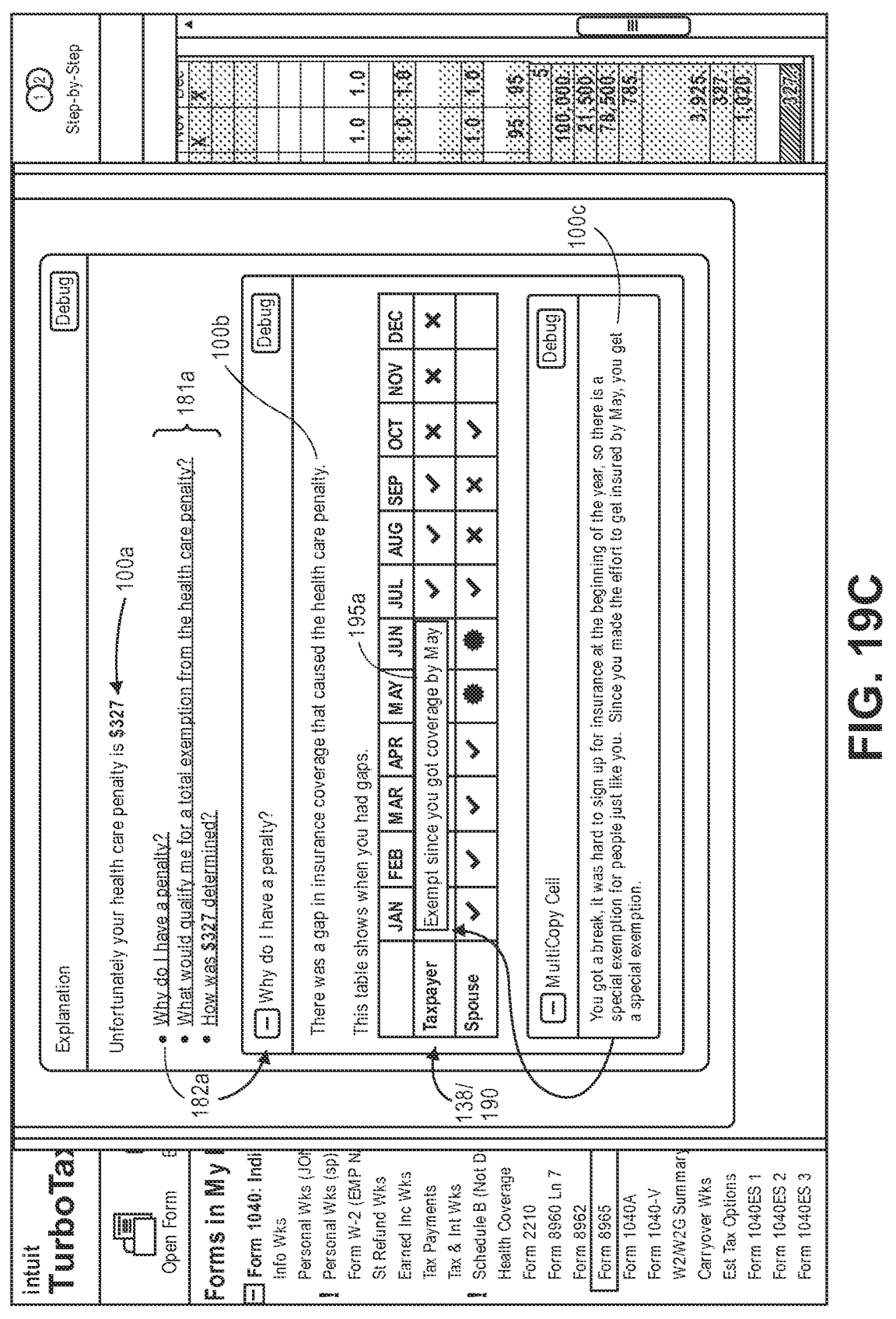

Referring to FIG. 19C, and continuing with the above example shown in FIGS. 19A-B, a separate, more detailed explanation 100c may be presented in response to selection of a particular table 190 cell entry, such as clicking on the cell for the month of January for taxpayer, or selecting a group of table 190 cells. Clicking a cell of table 190 is similar to clicking a link 182 of the group of links 181a, and such explanations are designated by "100" whereas explanations displayed in conjunction with table 190 are designated by "195."

Figure 19D:
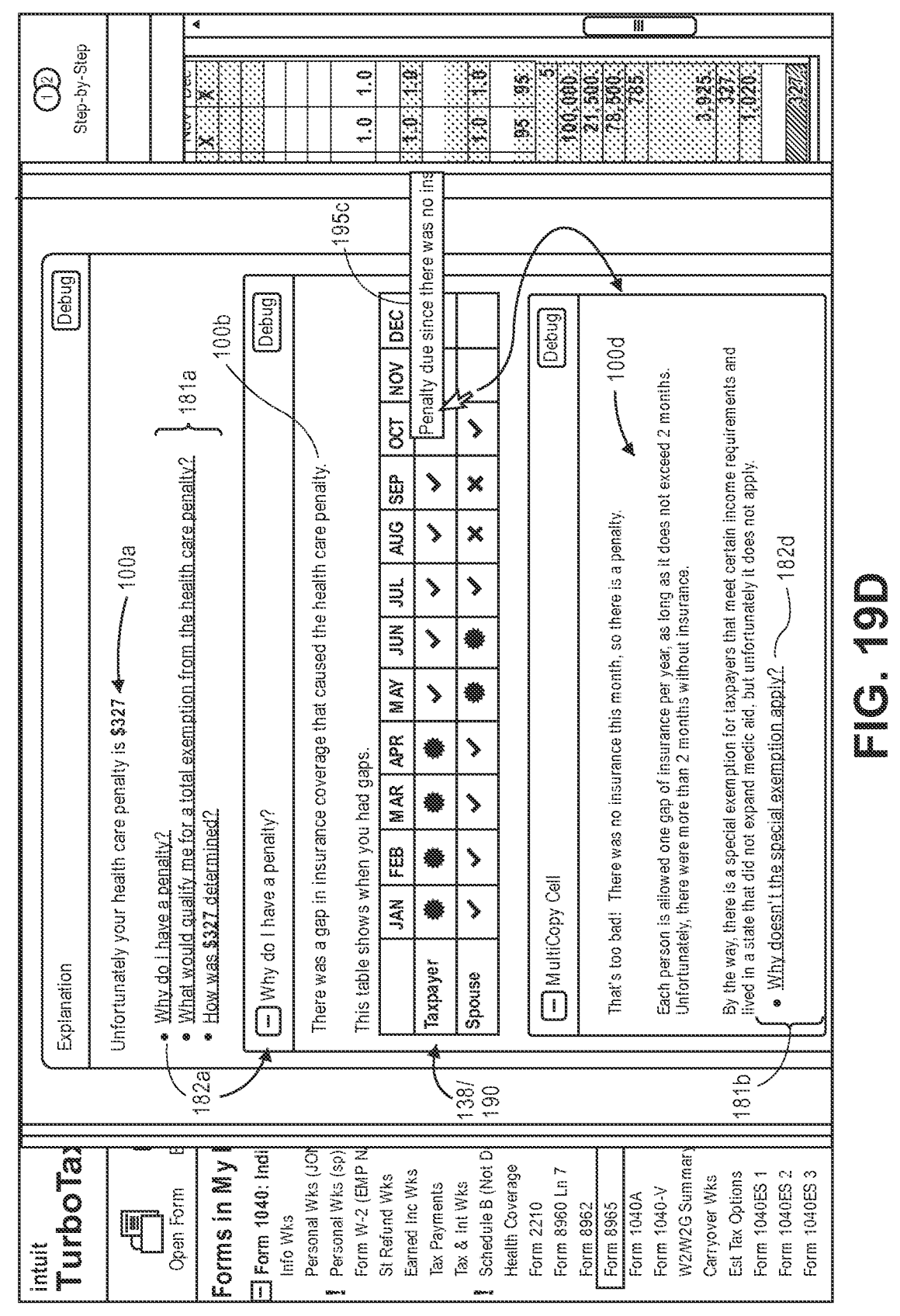

FIG. 19C-D further illustrates how a user can navigate cells of table 190 indicating whether or not the taxpayer or spouse had health insurance and the resulting explanations 195b-c/100c-d that are presented. In the illustrated example, as shown in FIG. 19C, the user mouses over the coverage cell for Taxyper in May, with the resulting explanation 195b of "Exempt since you got coverage by May" and a more detailed explanation 100c below which may be invoked, for example, by the user clicking on that cell rather than mousing over the cell. Referring to FIG. 19D, as yet another example, when the user mouses over the table for Taxpayer coverage in November, the resulting explanation 195c is "Penalty due . . . " and a more detailed explanation 100d below provides further details why a penalty is due as a result of having a gap in insurance coverage for 2 or more months. FIG. 19D also illustrates a second group 181b of links (including one link 182d), which may also be selected for further information/drilling down to more details regarding why a penalty is due.

While FIGS. 19A-D illustrate an example in which three links 182a-c are provided and that can be selected by a user for presentation of an explanation 100/195, it will be understood that the explanations 100/195 can be presented directly without requiring the user to select a link 182 or that other numbers of links 182 for other questions may be presented, and that the manner in which embodiments are implemented may depend on the number of possible answers or explanations 100 available which, in turn, is based on how a calculation graph 14 related to the field 134 associated a selected interface element 142 is structured. Accordingly, it will be understood that FIGS. 19A-D are provided for purposes of illustration and explanation, not limitation.

Referring to FIGS. 20A-D, when screens such as those shown in FIGS. 19A-D are displayed, the user may request to drill down for a more detailed explanation 100. These requests are communicated by the UI controller 80 to the explanation engine 110, which performs further traversal of the tax calculation graph 14 for additional explanations 100 and for generation of additional links 182. As the user continues to select links 182 to drill further down for more details, additional groups of links 181 or explanations 100 are presented in a cascading, indented manner as the drill down occurs as shown in FIGS. 20A-D. For example, selecting link 182b of the first group 181 results in an explanation 100e and a third group 181c of links 182e-g, and if the user selects link 182f of the third group 181c, the user can then drill down for a more detailed explanation 100f with additional drill down options with links 182h-i of the fourth group 181d, and so on as the user drills down to further details by selecting links 182 and resulting respective explanations 100 e due to respective additional traversals of calculation graph 14. If the user wishes to collapse the series of displayed links 182 or groups 181, the user may select one of the "−" symbols 2000a-f to close or collapse the underlying links 182 and explanations 100 from that point while maintaining the explanations 100 and links 182 above that point.

According to one embodiment, as described above and with reference to FIGS. 19A-20B, hyperlinks 182 are links to other hyperlinks 182 and/or explanations 100. According to another embodiment, a link 182 or a portion of an explanation 100 may serve as a link to direct the user to a field 134 that is the source of the data 143 that is the subject of the link 182 or explanation 100 to allow the user to view, change or delete the data, which then allows the user to view the resulting changes in other tax data and how links 182 and/or explanations 100 change as a result of the changed data 143. For example, an explanation 100 regarding whether the taxpayer qualifies for certain deduction based on an age of the taxpayer, e.g., over 65. The "65" portion of the explanation 100 may be a link 182 which, when selected by the user, directs the user to the field 134 that is the source of the "65 years old" data 143. Thus, while certain examples of embodiments are provided above in terms of explanations 100 with links 182 to further explanations 100 (and/or additional links), other embodiments may involve a portion of an explanation 100 serving as a link that points or refers to a field 134 that is the source of the data 143 resulting in the explanation 100 and to allow the user to view, change or delete the data 143.

Figure 21:
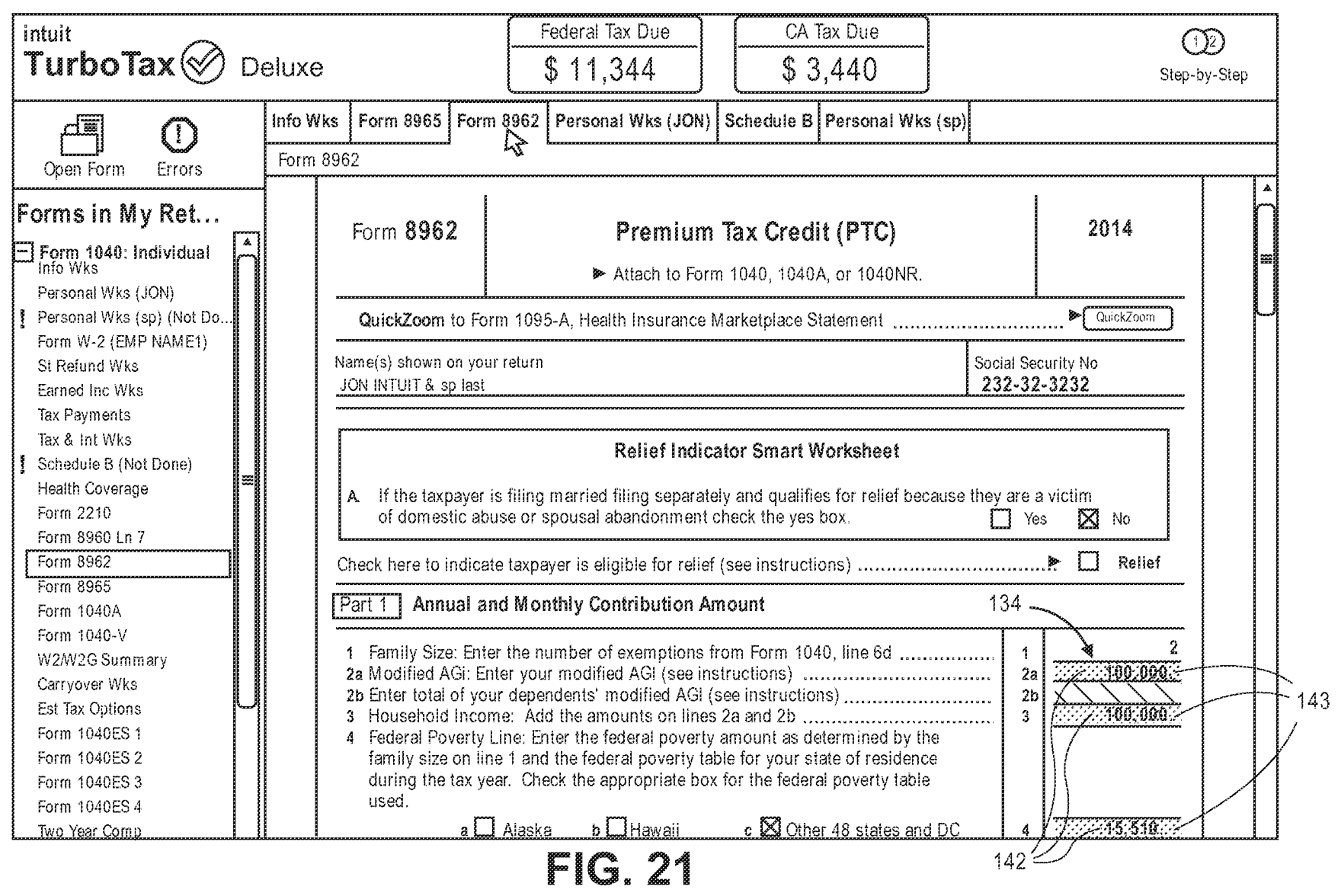

With continuing reference to FIG. 15 and with further reference to FIG. 21, the same explanation 100 (or explanations 100/links 182) may be invoked for presentation from different sections of different modified electronic versions of tax forms. For example, FIG. 15 shows a modified version 140 of an electronic version of Form 8965 that includes an interface element 142 such as a color indicator that an explanation 100 can be invoked for various fields 134, including the field 134 populated with data 143 of $100,000, for Line 7 (Enter your household income). FIG. 21 shows a modified version 140 of an electronic version of a different tax authority form, namely, Form 8962. The electronic version of this other form is also modified to include an interface element 142, such as a color indicator, that an explanation 100 can be invoked for various fields 134, including the field 134 that is populated with data 143 of $100,000 for Line 3 (Household Income). Thus, in the example shown in FIGS. 15 and 21, both modified versions of the different electronic forms involve a field 143 for household income such that the same explanation 100/links 182 are presented to the user when the user selects the interface element 142 associated with the household income fields (both of which hare populated with the same data of $100,000 in the illustrated example).

Referring to system diagrams 22-23, a user initiates the tax preparation software 100 on a computing device 102, 103 as seen, for example, in FIG. 22. The tax preparation software 100 may reside on the actual computing device 102 that the user interfaces with or, alternatively, the tax preparation software 100 may reside on a remote computing device 103 such as a server or the like as illustrated. In such an instances, the computing device 102 that is utilized by the user or tax payer communicates via the remote computing device 103 using an application 105 contained on the computing device 102. The tax preparation software 100 may also be run using conventional Internet browser software. Communication between the computing device 102 and the remote computing device 103 may occur over a wide area network such as the Internet. Communication may also occur over a private communication network (e.g., mobile phone network).

A user initiating the tax preparation software 100, as explained herein may import tax related information form one or more data sources 48. Tax data may also be input manually with user input 48a. The tax calculation engine 50 computes one or more tax calculations dynamically based on the then available data at any given instance within the schema 44 in the shared data store 42. In some instances, estimates or educated guesses may be made for missing data. Details regarding how such estimates or educated guesses are done maybe found in U.S. patent application Ser. No. 14/448,986 which is incorporated by reference as if set forth fully herein. As the tax preparation software 100 is calculating or otherwise performing tax operations, the explanation engine 110 is executing or made available to execute and provide to the user one or more narrative explanations via an interview screen 107 regarding calculations or operations being performed as referenced by particular functional nodes 26 and functions 28 contained within the calculation graph 14. As noted herein, in some instances, the narrative explanations are provided automatically to the UI control 80. In other instances, explanations are provided by the explanation engine 110 upon request of a user. For example, a user may request explanations on an as-needed basis by interfacing with the tax preparation software 100.

Figure 23:
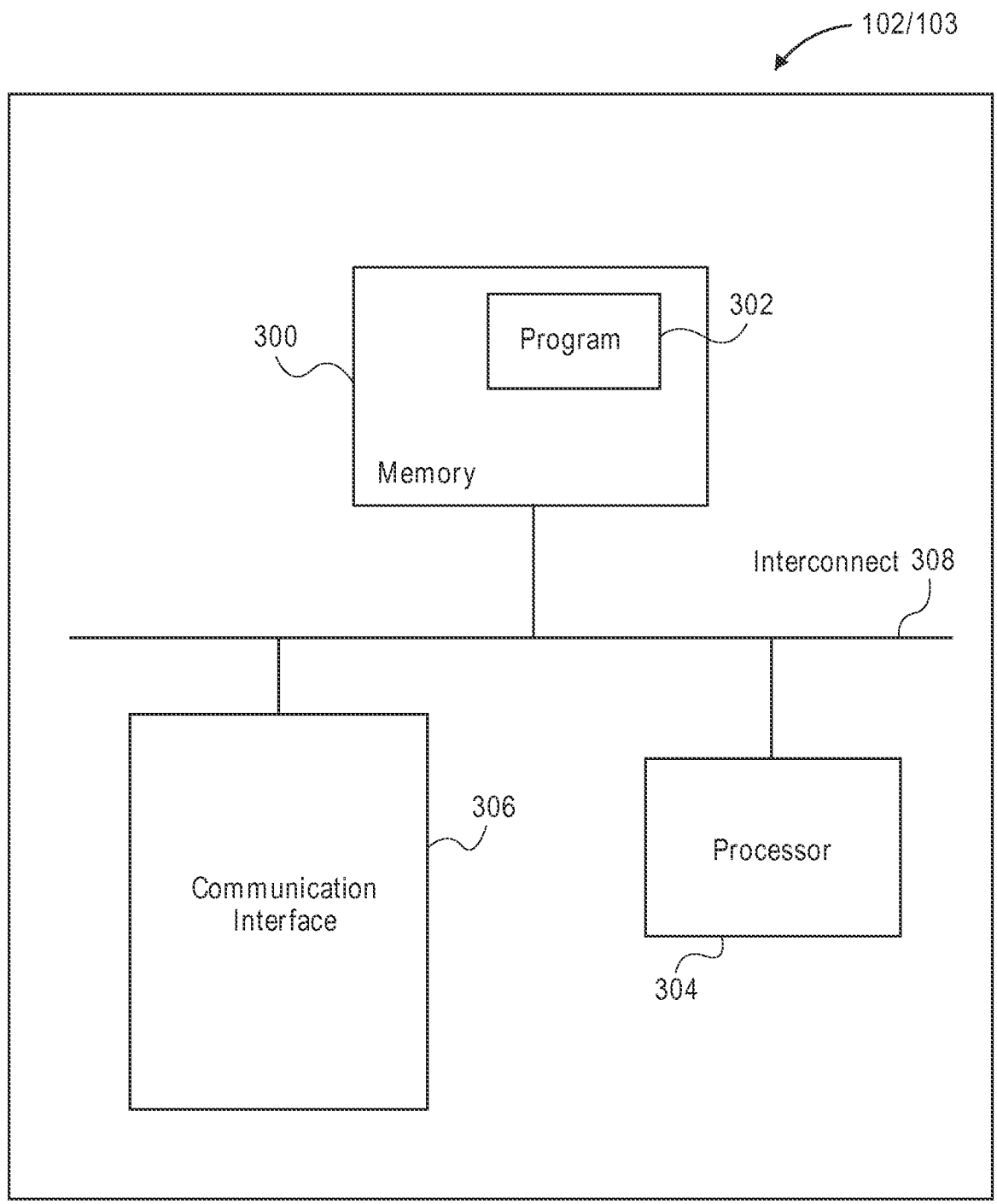
FIG. 23 illustrates generally the components of a computing device that may be utilized to execute the software for preparing a tax return and invoking tax-related explanations based thereon according to one embodiment.

FIG. 23 generally illustrates components of a computing device 102, 103 that may be utilized to execute the software for modifying electronic versions of tax authority forms and providing interface elements for invoking explanations during forms mode operation of a tax return preparation application 100. The components of the computing device 102, 103 include a memory 300, program instructions 302, a processor or controller 304 to execute program instructions 302, a network or communications interface 306, e.g., for communications with a network or interconnect 308 between such components. The computing device 102, 103 may include a server, a personal computer, laptop, tablet, mobile phone, or other portable electronic device. The memory 300 may be or include one or more of cache, RAM, ROM, SRAM, DRAM, RDRAM, EEPROM and other types of volatile or non-volatile memory capable of storing data. The processor unit 304 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 308 may include a system bus, LDT, PCI, ISA, or other types of buses, and the communications or network interface may, for example, be an Ethernet interface, a Frame Relay interface, or other interface. The interface 306 may be configured to enable a system component to communicate with other system components across a network which may be a wireless or various other networks. It should be noted that one or more components of the computing device 102, 103 may be located remotely and accessed via a network. Accordingly, the system configuration illustrated in FIG. 23 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 304 performs steps or executes program instructions 302 within memory 300 and/or embodied on the carrier to implement method embodiments.

Embodiments, however, are not so limited and implementation of embodiments may vary depending on the platform utilized. Accordingly, embodiments are intended to exemplify alternatives, modifications, and equivalents that may fall within the scope of the claims.

For example, while certain embodiments have been described in the context of preparation of an electronic tax return, embodiments may also be utilized independently of a tax return such as in connection with a tax calculator or a calculator for one or more tax topics or electronic versions of tax forms and documents.

Additionally, where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially. Thus, the methods shown in various flow diagrams are not intended to be limited to a particular sequential order, unless otherwise stated or required.

What is claimed is:

1. A computer-implemented method, comprising:
   reading, by a calculation engine of a computerized tax return preparation application operable in multiple presentation modes comprising computer-executable instructions executed by a computing device, from a shared data store of the computerized tax return preparation application, runtime data of an electronic tax return being prepared by a user of the computerized tax return preparation application;
   populating, by the calculation engine, a directed graph structure of the computerized tax return preparation, the directed graph structure semantically describing data dependent tax operations and comprising leaf nodes populated with specific runtime data, function nodes associated with input nodes, functions, and result nodes,
   wherein pre-determined explanations are associated with the function nodes and functions, inputs to a function comprise runtime data of associated leaf nodes, and a result node is populated with a calculation result generated by execution of the function;
   constructing, by an explanation engine of the computerized tax return preparation application and in communication with the calculation engine, a narrative explanation concerning the calculation result based at least in part upon the explanation engine:
      traversing at least a portion of the directed graph structure and determining an explanation associated with the traversed function nodes and functions, determining the explanation including recursively traversing at least a portion of the graph structure in response to receiving selected field data from a user interface controller process,
      recursively traversing at least a portion of the graph structure to determine multiple explanation segments,
      executing a natural language processing algorithm on the narrative explanation segments, and
      generating, by the natural language processing algorithm, the narrative explanation for presentation to the user;
   performing the user interface controller process including presenting, to the user, an electronic version of a tax form of a tax authority that has been modified by inclusion of interface elements associated with fields of the electronic version of the tax form, and receiving, through the interview screen, user input regarding selection of an interface element to invoke presentation of at least one of the explanations associated with traversed function nodes and functions related to a tax calculation or operation for the respective field;

communicating, by the explanation engine, the narrative explanation to a user interface controller of the computerized tax return application that is also in communication with the shared data store;

presenting, by the user interface controller and through a display of the computing device and to the user, a computer generated interface comprising the calculation result and the narrative explanation associated with the calculation result;

receiving, by the user interface controller, further user input requesting to drill down into a more detailed narrative explanation than the narrative explanation provided after the presenting; and in response to the further user input, presenting at least one additional narrative explanation, the presenting of the at least one additional narrative explanation including:

communicating the request to drill down to the explanation engine, recursively traversing, by the explanation engine, the graph structure to determine the at least one additional narrative explanation, and communicating the at least one additional narrative explanation to the user interface controller for presentation to the user.

2. The method claim 1, wherein a field for which an explanation is available being is displayed in a pre-determined color on the electronic version of the tax form.

3. The method of claim 2, wherein a second field for which an explanation is not available is displayed on the electronic version of the tax form in a second pre-determined color that is different than the first pre-determined color.

4. The method of claim 1, wherein a data element in a field is displayed with a pre-determined font attribute on the electronic version of the tax form.

5. The method of claim 4, the font attribute including at least one of font type, font size, font color, bolding, italics, and underlining.

6. The method of claim 1, wherein a data element in a field is displayed with visual emphasis on the electronic version of the tax form.

7. The method of claim 1, wherein a field is displayed on the electronic version of the tax form with a mouse over function.

8. The method of claim 1, wherein the narrative explanation is determined and presented in response to user selection of an interface element associated with a field populated with a result of a calculation that was performed by the tax return preparation system.

9. The method of claim 1, wherein the narrative explanation is determined and presented in response to user selection of an interface element associated with a field populated with data provided by the user.

10. The method of claim 1, wherein the narrative explanation is determined and presented in response to user selection of an interface element associated with a field populated with data imported from an electronic source.

11. The method of claim 1, wherein the narrative explanation is determined and presented in response to user selection of an interface element associated with a field populated with data of a prior year electronic tax return.

12. The method of claim 1, wherein the narrative explanation is determined and presented in response to user selection of an interface element associated with an unpopulated field.

13. The method of claim 1, wherein the narrative explanation is presented in response to user selection of an interface element associated with a field populated with non-numerical data.

14. The method of claim 13, wherein the narrative explanation is presented in response to user selection of an interface element associated with a field including a non-numerical binary indicator.

15. The method of claim 14, wherein the narrative explanation is presented in response to user selection of an interface element of a graph or chart data structure including a plurality of non-numerical binary indicators.

16. The method of claim 1, wherein the interface controller process further includes: receiving, through the interview screen, a user request requesting change of presentation mode from forms mode to interview mode; and in response to the user request, changing the presentation from forms mode to interview mode such that the modified version of the electronic version of the tax form is no longer displayed to the user.

17. The method of claim 1 wherein a user interface element is associated with a field of a modified electronic version of a first tax form and a field of a modified electronic version of a second tax form such that when in forms mode, the same explanation is provided in response to user selection of the interface element in the modified electronic version of the first tax form and in response to user selection of the interface element in the modified electronic version of second tax form.

18. The method of claim 1, the graph structure semantically describing data dependent tax operations comprising functional nodes connected to input nodes by one of a plurality of functions, wherein tax calculations or operations are associated with explanations in the graph structure.

19. The method of claim 1, further comprising:
recursively traversing various paths within the tax calculation graph to determine the narrative explanations;
storing the explanations to a data store referenced by data of fields of the modified electronic version of the electronic tax form; and
in response to receiving the user input, looking up a narrative explanation associated with the selected field.

20. The method of claim 1, wherein the narrative explanation is displayed together with a numerical tax calculation.

21. The method of claim 1, wherein the same or similar functional node is found in a plurality of locations within the graph structure.

22. The method of claim 1, further comprising presenting a hyperlink to a source of the data in the field associated with the interface element.

23. The method of claim 1, wherein multiple narrative explanations based on the traversing of the graph structure are presented to the user and can be collapsed to a root explanation in response to user input.

24. The method of claim 1, wherein modifying the electronic version of the tax form comprises modifying a static electronic version of the tax form into an active electronic version of the tax form with which the user can interact and that is operable to present an explanation.

25. A computing system, operable in multiple presentation modes, comprising:
a shared data store of a computerized tax return preparation application configured to store runtime data of an electronic tax return;
a user interface controller of the computerized tax return preparation application that is in communication with the shared data store and comprises computer-executable instructions executable by a processor of a computing device, the user interface controller, while operating in a forms mode of the multiple presentation modes, being configured to generate user interface screens presentable to a user of the computerized tax return preparation application through a display of the computing device and to present to the user an electronic version of a tax form of a tax authority that has been modified by inclusion of interface elements associated with fields of the electronic version of the tax form; and a directed graph structure of the computerized tax return preparation application associated with runtime data of the electronic tax return, the directed graph structure semantically describing data dependent tax operations and comprising leaf nodes that are populated with specific runtime data, function nodes associated with input nodes, functions, and result nodes, wherein inputs to a function of the directed graph structure comprise data of associated leaf nodes, a result node comprises a calculation result generated by execution of the function, and pre-determined explanations are associated with function nodes and functions;

a calculation engine of the computerized tax return preparation application, the calculation engine being configured to read, from the shared data store, runtime data of the electronic tax return being prepared by a user of the computerized tax return preparation application, populate leaf nodes with the runtime data, provide data of leaf nodes as inputs to a function of the directed graph structure, execute the function to generate a calculation result, and populate a result node with the calculation result; and an explanation engine of the computerized tax return preparation application configured to:

construct a narrative explanation concerning the calculation result based at least in part upon traversing at least a portion of the directed graph structure, constructing the explanation including recursively traversing at least a portion of the recursive graph structure in response to receiving selected field data from the user interface controller, recursively traversing at least a portion of the graph structure to determine multiple explanation segments, executing a natural language processing algorithm on the narrative explanation segments, and generating, by the natural language processing algorithm, the narrative explanation for presentation to the user, and communicate the narrative explanation to the user interface controller;

and the user interface controller being further configured to:

present, through the display, a computer-generated interface comprising the calculation result and the narrative explanation, receive further user input requesting to drill down into a more detailed narrative explanation than the narrative explanation provided after the presenting, and in response to the further user input, presenting at least one additional narrative explanation, the presenting of the at least one additional narrative explanation including:

communicating the request to drill down to the explanation engine, recursively traversing, by the explanation engine, the graph structure to determine the at least one additional narrative explanation, and communicating the at least one additional narrative explanation to the user interface controller for presentation to the user.

26. The system of claim 25, wherein the explanation engine comprises a natural language generator operable by the processor to transform an explanation into the narrative explanation using natural language.

* * * * *